US012612477B2

(12) United States Patent
Sato et al.

(10) Patent No.: US 12,612,477 B2
(45) Date of Patent: Apr. 28, 2026

(54) METHOD FOR PRODUCING FLUOROPOLYMER, POLYTETRAFLUOROETHYLENE COMPOSITION, AND POLYTETRAFLUOROETHYLENE POWDER

(71) Applicant: DAIKIN INDUSTRIES, LTD., Osaka (JP)

(72) Inventors: Hiroyuki Sato, Osaka (JP); Taketo Kato, Osaka (JP); Kenji Ichikawa, Osaka (JP); Yohei Fujimoto, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 1136 days.

(21) Appl. No.: 17/628,807

(22) PCT Filed: Jul. 27, 2020

(86) PCT No.: PCT/JP2020/028764

§ 371 (c)(1),
(2) Date: Jan. 20, 2022

(87) PCT Pub. No.: WO2021/015291

PCT Pub. Date: Jan. 28, 2021

(65) Prior Publication Data

US 2022/0275119 A1 Sep. 1, 2022

(30) Foreign Application Priority Data

Jul. 23, 2019 (JP) ................................. 2019-135724

(51) Int. Cl.
*C08F 114/26* (2006.01)
*C08K 3/08* (2006.01)
*C08K 5/01* (2006.01)

(52) U.S. Cl.
CPC .............. *C08F 114/26* (2013.01); *C08K 3/08* (2013.01); *C08K 5/01* (2013.01)

(58) Field of Classification Search
CPC .......... C08F 114/26; C08F 2/20; C08F 14/26; C08F 4/40; C08F 214/26; C08F 214/28; C08K 3/08; C08K 5/01; C08J 3/16; C08J 2327/18
See application file for complete search history.

(56) References Cited

U.S. PATENT DOCUMENTS

| | | | | |
|---|---|---|---|---|
| 4,766,188 A | | 8/1988 | Attwood et al. | |
| 4,921,922 A | | 5/1990 | Attwood et al. | |
| 5,153,285 A | * | 10/1992 | Felix | C08F 14/26 526/236 |
| 2002/0161149 A1 | * | 10/2002 | Kobayashi | C08F 214/26 521/142 |
| 2005/0107518 A1 | | 5/2005 | Zipplies et al. | |
| 2006/0128872 A1 | | 6/2006 | Zipplies et al. | |
| 2006/0276574 A1 | | 12/2006 | Hoshikawa et al. | |
| 2008/0114121 A1 | | 5/2008 | Brothers et al. | |
| 2010/0160490 A1 | * | 6/2010 | Leffew | C08F 14/26 523/201 |
| 2012/0116003 A1 | | 5/2012 | Brothers et al. | |
| 2012/0116015 A1 | | 5/2012 | Brothers et al. | |
| 2012/0116017 A1 | | 5/2012 | Brothers et al. | |
| 2013/0345368 A1 | * | 12/2013 | Brothers | C08F 6/28 525/388 |
| 2014/0018499 A1 | | 1/2014 | Brothers et al. | |
| 2015/0299341 A1 | | 10/2015 | Nanba | |
| 2016/0122509 A1 | | 5/2016 | Brothers et al. | |
| 2017/0073435 A1 | | 3/2017 | Brothers et al. | |
| 2020/0216583 A1 | | 7/2020 | Higuchi et al. | |
| 2020/0291141 A1 | | 9/2020 | Brothers et al. | |
| 2021/0095054 A1 | | 4/2021 | Yoshida et al. | |
| 2021/0108008 A1 | | 4/2021 | Kato et al. | |
| 2021/0115224 A1 | | 4/2021 | Kato et al. | |
| 2021/0221992 A1 | | 7/2021 | Kato et al. | |
| 2022/0169830 A1 | | 6/2022 | Kato et al. | |
| 2023/0101829 A1 | | 3/2023 | Kato et al. | |

FOREIGN PATENT DOCUMENTS

| | | | |
|---|---|---|---|
| CN | 102264777 | A | 11/2011 |
| CN | 103201300 | A | 7/2013 |
| CN | 107868162 | A | 4/2018 |
| JP | 63-137906 | A | 6/1988 |
| JP | 2007-16209 | A | 1/2007 |
| JP | 2007-511657 | A | 5/2007 |
| JP | 2012-513530 | A | 6/2012 |
| JP | 2013-542308 | A | 11/2013 |
| JP | 2013-542309 | A | 11/2013 |
| JP | 2013-542310 | A | 11/2013 |

(Continued)

OTHER PUBLICATIONS

International Preliminary Report on Patentability dated Jan. 25, 2022 with a Translation of the Written Opinion of the International Searching Authority in Application No. PCT/JP2020/028764.
Communication issued Jun. 21, 2023 in European Application No. 20844000.8.
Database CA [Online], Xiaolong Su et al., "Method for preparing high-molecular-weight polytetrafluoroethylene dispersion resins", XP002808126; Database accession No. 2018:670276 CAPLUS (3 pages).
Extended European Search Report issued Sep. 22, 2023 in Application No. 20844000.8.
International Search Report for PCT/JP2020/028764, dated Oct. 20, 2020.

*Primary Examiner* — Doris L Lee
(74) *Attorney, Agent, or Firm* — Sughrue Mion, PLLC

(57) ABSTRACT

Provided is a method for producing a fluoropolymer, including a polymerization step of polymerizing a fluoromonomer in an aqueous medium having a pH of 4.0 or more in the presence of a hydrocarbon surfactant and a polymerization initiator to obtain a fluoropolymer.

9 Claims, No Drawings

(56) References Cited

FOREIGN PATENT DOCUMENTS

| | | | | |
|---|---|---|---|---|
| JP | 2014-240475 | A | 12/2014 | |
| WO | WO-2008033721 | A1 * | 3/2008 | .............. C08F 14/18 |
| WO | 2012/064841 | A1 | 5/2012 | |
| WO | 2012/064846 | A1 | 5/2012 | |
| WO | 2013/169581 | A1 | 11/2013 | |
| WO | 2014/084397 | A1 | 6/2014 | |
| WO | 2018/181898 | A1 | 10/2018 | |
| WO | 2018/181904 | A1 | 10/2018 | |
| WO | 2019/065644 | A1 | 4/2019 | |
| WO | 2019/172382 | A1 | 9/2019 | |
| WO | 2020/022355 | A1 | 1/2020 | |

* cited by examiner

METHOD FOR PRODUCING FLUOROPOLYMER, POLYTETRAFLUOROETHYLENE COMPOSITION, AND POLYTETRAFLUOROETHYLENE POWDER

CROSS REFERENCE TO RELATED APPLICATIONS

This application is a National Stage of International Application No. PCT/JP2020/028764 filed Jul. 27, 2020, claiming priority based on Patent Japanese Application No. 2019-135724 filed Jul. 23, 2019.

TECHNICAL FIELD

The present disclosure relates to a method for producing a fluoropolymer, a polytetrafluoroethylene composition and a polytetrafluoroethylene powder.

BACKGROUND ART

Fluorine-containing anion surfactants have been used in production of fluoropolymers by emulsion polymerization. Recently, it has been proposed to use hydrocarbon surfactants instead of the fluorine-containing anion surfactant, and various studies have been conducted.

Patent Document 1 discloses a method for polymerizing a fluoromonomer to form a dispersion of fluoropolymer particles in an aqueous medium in a polymerization reactor, the method comprising an initial period and a stabilization period subsequent to the initial period, wherein the initial period comprises: preparing an initial dispersion of fluoropolymer particles in the aqueous medium in the polymerization reactor, and the stabilization period comprises: polymerizing fluoromonomer in the polymerization reactor, and adding hydrocarbon-containing surfactant to the polymerization reactor, wherein during the stabilization period no fluorosurfactant is added.

Patent Document 2 discloses a method for polymerizing fluoromonomer to form a dispersion of fluoropolymer particles in an aqueous medium in a polymerization reactor, the method comprising an initial period which comprises adding to the polymerization reactor: (α) an aqueous medium, (b) a water-soluble hydrocarbon-containing compound, (c) a degradation agent, (d) a fluoromonomer, and (e) a polymerization initiator, wherein during the initial period no fluorosurfactant is added, and wherein the degradation agent is added prior to the polymerization initiator.

Patent Document 3 discloses a method for polymerizing fluoromonomer to form a dispersion of fluoropolymer particles in an aqueous medium in a polymerization reactor, which comprises adding, to the polymerization reactor, an aqueous medium, a polymerization initiator, a fluoromonomer, and a hydrocarbon-containing surfactant, and passivating the hydrocarbon-containing surfactant.

Patent Document 4 discloses a method for reducing thermally induced discoloration of a fluoropolymer resin, the fluoropolymer resin produced by polymerizing a fluoromonomer in an aqueous dispersion medium to form an aqueous fluoropolymer dispersion and isolating the fluoropolymer from the aqueous medium by separating the fluoropolymer resin in a wet form from the aqueous medium and drying to produce the fluoropolymer resin in a dry form, the method comprising: exposing the fluoropolymer resin in a wet or dry form to an oxidizing agent.

Further, Patent Document 5 discloses a modified polytetrafluoroethylene that can be produced without using a fluorosurfactant. Specifically, disclosed is a modified polytetrafluoroethylene which comprises a polymer having a unit based on tetrafluoroethylene and a polymer having a unit based on a monomer represented by the following formula, wherein the content of the unit based on the monomer represented by following formula is 10 to 500 ppm by mass based on the total units of the modified polytetrafluoroethylene and the standard specific gravity is 2.155 to 2.175, $CH_2{=}CR^{1z}\text{-}L\text{-}R^{2z}$ Formula wherein $R^{1z}$ represents a hydrogen atom or an alkyl group; L represents a single bond, —CO—O—*, —O—CO—*, or —O—; * represents a bonding position with the $R^{2z}$; and $R^{2z}$ represents a hydrogen atom, an alkyl group, or a nitrile group.

RELATED ART

Patent Documents

Patent Document 1: National Publication of International Patent Application No. 2013-542308
Patent Document 2: National Publication of International Patent Application No. 2013-542309
Patent Document 3: National Publication of International Patent Application No. 2013-542310
Patent Document 4: International Publication No. WO2013/169581
Patent Document 5: International Publication No. WO2019/065644

SUMMARY OF THE INVENTION

Problem to be Solved by the Invention

The present disclosure provides a production method capable of obtaining a high-molecular-weight fluoropolymer.

Means for Solving the Problem

The present disclosure provides a method for producing a fluoropolymer (hereinafter also referred to as "first production method of the present disclosure"), including a polymerization step of polymerizing a fluoromonomer in an aqueous medium having a pH of 4.0 or more in the presence of a hydrocarbon surfactant and a polymerization initiator to obtain a fluoropolymer.

The present disclosure also provides a method for producing a fluoropolymer (hereinafter also referred to as "second production method of the present disclosure"), including a polymerization step of polymerizing a fluoromonomer in an aqueous medium in the presence of an anionic hydrocarbon surfactant and a polymerization initiator to obtain a fluoropolymer, wherein the hydrocarbon surfactant contains a salt of the hydrocarbon surfactant.

The polymerization step is preferably performed substantially in the absence of the hydrocarbon surfactant in the form of an organic acid.

The hydrocarbon surfactant is preferably a carboxylic acid type.

The polymerization initiator is preferably a redox initiator, and the redox initiator is preferably a combination of an oxidizing agent which is a salt and a reducing agent which is a salt.

The redox initiator is preferably at least one selected from the group consisting of potassium permanganate/ammonium oxalate, potassium bromate/ammonium sulfite, and ammonium cerium nitrate/ammonium oxalate.

The polymerization step preferably includes an addition step of adding a composition containing a hydrocarbon surfactant after the initiation of the polymerization.

The composition is preferably an aqueous solution having a pH of 5.0 or more.

The hydrocarbon surfactant contained in the composition is preferably a carboxylic acid type.

In the polymerization step, the fluoromonomer is preferably polymerized substantially in the absence of a fluorine-containing surfactant.

The fluoropolymer is preferably a polytetrafluoroethylene.

The polytetrafluoroethylene is preferably stretchable.

The present disclosure also provides a polytetrafluoroethylene composition comprising a polytetrafluoroethylene and at least one atom selected from the group consisting of manganese, bromine, and cerium, and being substantially free from a fluorine-containing surfactant.

The at least one atom selected from the group consisting of manganese, bromine, and cerium is preferably manganese.

The polytetrafluoroethylene composition of the present disclosure preferably has a content of the manganese of 0.1% by mass or less.

The present disclosure also provides a polytetrafluoroethylene powder having a breaking strength of 29.0N or more measured under the following condition (X) of a stretched beading produced under the following condition (A) after a heat treatment at a temperature of 240° C., and substantially free from a fluorine-containing surfactant:

Condition (A):

to 100 g of a polytetrafluoroethylene powder, 21.7 g of a lubricant is added and mixed for 3 minutes in a glass bottle at room temperature; then, the glass bottle is left to stand at room temperature (25° C.) for at least 1 hour before extrusion to obtain a lubricated resin; the lubricated resin is paste extruded at a reduction ratio of 100:1 at room temperature through an orifice (diameter 2.5 mm, land length 11 mm, entrance angle 30°) into a uniform beading; the extrusion speed is 20 inch/min;

the polytetrafluoroethylene extruded beading containing the lubricant obtained by paste extrusion is dried at 230° C. for 30 minutes to remove the lubricant from the beading and thereby to obtain a dried polytetrafluoroethylene extruded beading; next, the dried polytetrafluoroethylene extruded beading is cut in an appropriate length and clamped at each end leaving a space of 1.5 inch between clamps, and heated to 300° C. in an air circulation furnace; and then, the clamps are moved apart from each other at 1,000%/sec until the separation distance corresponds to 2,400% to perform the stretching test and obtain a stretched beading, Condition (X):

the breaking strength of the stretched body is determined by clamping the stretched beading by movable jaws having a gauge length of 5.0 cm and performing a tensile test at 25° C. at a rate of 300 mm/min, in which the strength at the time of breaking is taken as the breaking strength.

The present disclosure further provides a polytetrafluoroethylene powder having a breaking strength of 22.0N or more measured under the following condition (X) of a stretched beading produced under the following condition (B) after a heat treatment at a temperature of 240° C., and substantially free from a fluorine-containing surfactant:

Condition (B):

to 100 g of a polytetrafluoroethylene powder, 21.7 g of a lubricant is added and mixed for 3 minutes in a glass bottle at room temperature; then, the glass bottle is left to stand at room temperature (25° C.) for at least 1 hour before extrusion to obtain a lubricated resin; the lubricated resin is paste extruded at a reduction ratio of 100:1 at room temperature through an orifice (diameter 2.5 mm, land length 11 mm, entrance angle 30°) into a uniform beading; the extrusion speed is 20 inch/min;

the polytetrafluoroethylene extruded beading containing the lubricant obtained by paste extrusion is dried at 230° C. for 30 minutes to remove the lubricant from the beading and thereby to obtain a dried polytetrafluoroethylene extruded beading; next, the dried polytetrafluoroethylene extruded beading is cut in an appropriate length and clamped at each end leaving a space of 2.0 inch between clamps, and heated to 300° C. in an air circulation furnace; and then, the clamps are moved apart from each other at 100%/sec until the separation distance corresponds to 2,400% to perform the stretching test and obtain a stretched beading, Condition (X):

the breaking strength of the stretched body is determined by clamping the stretched beading by movable jaws having a gauge length of 5.0 cm and performing a tensile test at 25° C. at a rate of 300 mm/min, in which the strength at the time of breaking is taken as the breaking strength.

The present disclosure also provides a polytetrafluoroethylene powder having a breaking strength of 34.0N or more measured under the following condition (X) of a stretched beading produced under the following condition (A), and substantially free from a fluorine-containing surfactant:

Condition (A):

to 100 g of a polytetrafluoroethylene powder, 21.7 g of a lubricant is added and mixed for 3 minutes in a glass bottle at room temperature; then, the glass bottle is left to stand at room temperature (25° C.) for at least 1 hour before extrusion to obtain a lubricated resin; the lubricated resin is paste extruded at a reduction ratio of 100:1 at room temperature through an orifice (diameter 2.5 mm, land length 11 mm, entrance angle 30°) into a uniform beading; the extrusion speed is 20 inch/min;

the polytetrafluoroethylene extruded beading containing the lubricant obtained by paste extrusion is dried at 230° C. for 30 minutes to remove the lubricant from the beading and thereby to obtain a dried polytetrafluoroethylene extruded beading; next, the dried polytetrafluoroethylene extruded beading is cut in an appropriate length and clamped at each end leaving a space of 1.5 inch between clamps, and heated to 300° C. in an air circulation furnace; and then, the clamps are moved apart from each other at 1,000%/sec until the separation distance corresponds to 2,400% to perform the stretching test and obtain a stretched beading, Condition (X):

the breaking strength of the stretched body is determined by clamping the stretched beading by movable jaws having a gauge length of 5.0 cm and performing a tensile test at 25° C. at a rate of 300 mm/min, in which the strength at the time of breaking is taken as the breaking strength.

The present disclosure further provides a polytetrafluoroethylene powder having a breaking strength of 29.0N or more measured under the following condition (X) of a stretched beading produced under the following condition (B), and substantially free from a fluorine-containing surfactant:

Condition (B):

to 100 g of a polytetrafluoroethylene powder, 21.7 g of a lubricant is added and mixed for 3 minutes in a glass bottle at room temperature; then, the glass bottle is left to stand at room temperature (25° C.) for at least 1 hour before extrusion to obtain a lubricated resin; the lubricated resin is paste extruded at a reduction ratio of 100:1 at room temperature through an orifice (diameter 2.5 mm, land length 11 mm, entrance angle 30°) into a uniform beading; the extrusion speed is 20 inch/min;

the polytetrafluoroethylene extruded beading containing the lubricant obtained by paste extrusion is dried at 230° C. for 30 minutes to remove the lubricant from the beading and thereby to obtain a dried polytetrafluoroethylene extruded beading; next, the dried polytetrafluoroethylene extruded beading is cut in an appropriate length and clamped at each end leaving a space of 2.0 inch between clamps, and heated to 300° C. in an air circulation furnace; and then, the clamps are moved apart from each other at 100%/sec until the separation distance corresponds to 2,400% to perform the stretching test and obtain a stretched beading, Condition (X):

the breaking strength of the stretched body is determined by clamping the stretched beading by movable jaws having a gauge length of 5.0 cm and performing a tensile test at 25° C. at a rate of 300 mm/min, in which the strength at the time of breaking is taken as the breaking strength.

Effects of Invention

The production method of the present disclosure allows to obtain a high-molecular-weight fluoropolymer.

DESCRIPTION OF EMBODIMENTS

Before describing the present disclosure in detail, some terms used herein are defined or described below.

The fluororesin as used herein means a partially crystalline fluoropolymer which is a fluoroplastic. The fluororesin has a melting point and has thermoplasticity, and may be either melt-fabricable or non melt-processible.

The melt-fabricable as used herein means that a polymer has an ability to be processed in a molten state using a conventional processing device such as an extruder or an injection molding machine. Thus, a melt-fabricable fluororesin usually has a melt flow rate of 0.01 to 500 g/10 min as measured by the measurement method to be described later.

The fluoroelastomer as used herein means an amorphous fluoropolymer. The term "amorphous" means that a fluoropolymer has a melting peak (ΔH) of 4.5 J/g or lower determined by differential scanning calorimetry (DSC)(temperature-increasing temperature: 10° C./min) or differential thermal analysis (DTA)(temperature-increasing rate: 10° C./min). The fluoroelastomer exhibits elastomeric characteristics when crosslinked. The elastomeric characteristics mean that a polymer has an ability to be stretched and to retain its original length when the force required to stretch the polymer is no longer applied.

The partially fluorinated elastomer as used herein means a fluoropolymer containing a fluoromonomer unit, having a perfluoromonomer unit content of less than 90 mol % based on all polymerized units, having a glass transition temperature of 20° C. or lower, and having a melting peak (ΔH) of 4.5 J/g or lower.

As used herein, the term "perfluororubber (perfluoroelastomer)" refers to a fluoropolymer having a perfluoromonomer unit content of 90 mol % or more based on all polymerized units, having a glass transition temperature of 20° C. or lower and a melting peak (ΔH) of 4.5 J/g or less, and further having a concentration of fluorine atoms contained in the fluoropolymer of 71% by mass or more. The fluorine atom concentration in the fluoropolymer as used herein is the concentration (% by mass) of the fluorine atoms contained in the fluoropolymer calculated based on the type and content of each monomer constituting the fluoropolymer.

The perfluoromonomer as used herein means a monomer free from a carbon-hydrogen bond in the molecule. The perfluoromonomer may be a monomer containing carbon atoms and fluorine atoms in which some of the fluorine atoms bonded to any of the carbon atoms are replaced with chlorine atoms, and may be a monomer containing a nitrogen atom, an oxygen atom, a sulfur atom, a phosphorus atom, a boron atom, or a silicon atom in addition to the carbon atoms. The perfluoromonomer is preferably a monomer in which all hydrogen atoms are replaced with fluorine atoms. The perfluoromonomer does not encompass a monomer that provides a crosslinking site.

The monomer that provides a crosslinking site is a monomer (cure-site monomer) having a crosslinkable group that provides the fluoropolymer with a crosslinking site for forming a crosslink with the curing agent.

The polytetrafluoroethylene (PTFE) as used herein is preferably a fluoropolymer having a tetrafluoroethylene content of 99.0% by mass or more based on all polymerized units.

The fluororesin other than polytetrafluoroethylene and the fluoroelastomer as used herein are each preferably a fluoropolymer having a tetrafluoroethylene content of less than 99.0% by mass based on all polymerized units.

The content of each monomer constituting the fluoropolymer can be calculated herein by any appropriate combination of NMR, FT-IR, elemental analysis, and X-ray fluorescence analysis in accordance with the type of the monomer.

The term "organic group" as used herein, unless otherwise specified, means a group containing one or more carbon atoms or a group obtainable by removing one hydrogen atom from an organic compound.

Examples of the "Organic Group" Include:

an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents,
a cyano group,
a formyl group,
RaO—,
RaCO—,
$RaSO_2$—, RaCOO—,
RaNRaCO—,
RaCONRa—,
RaOCO—,
$RaOSO_2$—, and
$RaNRbSO_2$—,
wherein each $R^a$ is independently
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or
a heteroaryl group optionally having one or more substituents, and
each Rb is independently H or an alkyl group optionally having one or more substituents.

The organic group is preferably an alkyl group optionally having one or more substituents.

The term "substituent" as used herein, unless otherwise specified, means a substitutable group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, and a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, preferably 1 to 4 carbon atoms in total, such as methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbonylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbonylamino groups having 7 to 11 carbon atoms in total, and heterocyclic carbamoylamino groups having 3 to 10 carbon atoms in total, such as a carbamoylamino group, a methylcarbamoylamino group, a N,N-dimethylcarbamoylamino group, a phenylcarbamoylimino group, and a 4-pyridinecarbamoylamino group.

The ranges expressed by the endpoints as used herein each include all numerical values within the range (for example, the range of 1 to 10 includes 1.4, 1.9, 2.33, 5.75, 9.98, and the like).

The phrase "at least one" as used herein includes all numerical values equal to or greater than 1 (e.g., at least 2, at least 4, at least 6, at least 8, at least 10, at least 25, at least 50, at least 100, and the like).

As used herein, ppm and ppb mean values obtained in terms of mass unless otherwise specified.

Hereinafter, the production method of the present disclosure will be described in detail.

The first production method of the present disclosure includes a polymerization step of polymerizing a fluoromonomer in an aqueous medium having a pH of 4.0 or more in the presence of a hydrocarbon surfactant and a polymerization initiator to obtain a fluoropolymer.

Conventionally, the pH of the aqueous medium used in the polymerization was less than 4.0 because an acidic polymerization initiator was used in the polymerization step for producing a fluoropolymer. As a result of diligent studies by the present disclosers, surprisingly, it has been found that by setting the pH of the aqueous medium used in polymerization to 4.0 or more, the stability of polymerization is improved and a fluoropolymer having a high molecular weight can be produced.

In the first production method of the present disclosure, a fluoromonomer is polymerized in an aqueous medium having a pH of 4.0 or more. The pH may be 4.0 or more, preferably more than 4.0, more preferably 4.5 or more, still more preferably 5.0 or more, further preferably 5.5 or more, still further preferably more than 6.0 or more, particularly preferably 6.5 or more, particularly preferably 7.0 or more, particularly preferably 7.5 or more, and particularly preferably 8.0 or more. The upper limit value of the pH is not limited, but may be, for example, 13.0 or less. From the viewpoint of corrosion of the polymerization tank, it is preferably 12.0 or less, more preferably 11.5 or less, and still more preferably 11.0 or less. The pH can be measured with a pH meter.

In the first production method of the present disclosure, the method of adjusting the pH of the aqueous medium to 4.0 or more is not limited, but the pH can be made 4.0 or more by using, for example, an alkaline aqueous solution, an alkaline aqueous dispersion, or a pH adjuster, but the method is not limited.

Further, even in a case where a polymerization initiator that shows acidity when dissolved in an aqueous medium is used, the pH can be adjusted to 4.0 or more by further adding an alkaline compound such as sodium hydroxide. The alkali compound may be any compound which dissolves in water and ionizes to produce $OH^-$, and examples thereof include, but not limited to, a hydroxide of an alkali metal such as sodium hydroxide or potassium hydroxide; a hydroxide of alkaline earth metals; ammonia; and amines. The polymerization step may include a step of adding an alkaline compound to an aqueous medium.

In the first production method of the present disclosure, the pH of the aqueous medium may be 4.0 or more during the entire period of the polymerization step. Further, the pH may be 4.0 or more in the middle of the polymerization step, or the pH may be 4.0 or more in the latter half of the polymerization step. Further, the pH may be 4.0 or more in the middle and the latter half of the polymerization step.

For example, in the polymerization step, the pH of the aqueous medium is preferably 4.0 or more when the polymer solid concentration is 3% by mass or more. In other words, the first production method of the present disclosure preferably includes a polymerization step of polymerizing a fluoromonomer in an aqueous medium in the presence of a hydrocarbon surfactant and a polymerization initiator to obtain a fluoropolymer, and the aqueous medium preferably has a pH of 4.0 or more when the polymer solid concentration is 3% by mass or more. The aqueous medium more preferably has a pH of 4.0 or more when the polymer solid concentration is 5% by mass or more, still more preferably has a pH of 4.0 or more when the polymer solid concentration is 8% by mass or more, further preferably has a pH of 4.0 or more when the polymer solid concentration is 10% by mass or more, still further preferably has a pH of 4.0 or more when the polymer solid concentration is 15% by mass or more, particularly preferably has a pH of 4.0 or more when the polymer solid concentration is 18% by mass or more, more preferably has a pH of 4.0 or more when the polymer solid concentration is 20% by mass or more, and still more preferably has a pH of 4.0 or more when the polymer solid concentration is 25% by mass or more.

Further, in the polymerization step, the pH of the aqueous medium is preferably maintained at 4.0 or more from the time when the polymer solid concentration becomes 25% by mass to the completion of polymerization, more preferably maintained at 4.0 or more from the time when the polymer solid concentration becomes 20% by mass to the completion of polymerization, still more preferably maintained at 4.0 or more from the time when the polymer solid concentration becomes 18% by mass to the completion of polymerization, further preferably maintained at 4.0 or more from the time when the polymer solid concentration becomes 15% by mass to the completion of polymerization, still further preferably maintained at 4.0 or more from the time when the polymer solid concentration becomes 10% by mass to the completion of polymerization, particularly preferably maintained at 4.0 or more from the time when the polymer solid concentration becomes 8% by mass to the completion of polymerization, more preferably maintained at 4.0 or more from the time when the polymer solid concentration becomes 5% by mass to the completion of polymerization, and still more preferably maintained at 4.0 or more from the time when the polymer solid concentration becomes 3% by mass to the completion of polymerization.

In the polymerization step, the pH of the aqueous medium is also preferably 4.0 or more when the polymer solid concentration is less than 15% by mass. In the polymerization step, the pH of the aqueous medium is more preferably 4.0 or more when the polymer solid concentration is 3% by mass or more and less than 15% by mass, the pH of the aqueous medium is more preferably 4.0 or more when the polymer solid concentration is 5% by mass or more and less than 15% by mass, the pH of the aqueous medium is still more preferably 4.0 or more when the polymer solid concentration is 8% by mass or more and less than 15% by mass, and the pH of the aqueous medium is further preferably 4.0 or more when the polymer solid concentration is 10% by mass or more and less than 15% by mass.

In the polymerization step, the pH of the aqueous medium is preferably maintained at 4.0 or more while the polymer solid concentration is 10% by mass or more and up to 15% by mass, the pH of the aqueous medium is more preferably maintained at 4.0 or more while the polymer solid concentration is at 8% by mass or more and up to 15% by mass, and the pH of the aqueous medium is further preferably maintained at 4.0 or more while polymer solid concentration is 5% by mass or more and up to 15% by mass.

The pH of the aqueous medium is preferably more than 4.0 in any case, more preferably 4.5 or more, still more preferably 5.0 or more, further preferably 5.5 or more, still further preferably 6.0 or more, particularly preferably 6.5 or more, more preferably 7.0 or more, still more preferably 7.5 or more, and further preferably 8.0 or more.

In the polymerization step, the pH of the aqueous medium is preferably 4.0 or more during a period of 60% or more (preferably 70% or more, more preferably 80% or more, still more preferably 90% or more, further preferably 95% or more, still further preferably 99% or more, particularly preferably 100%) from the time of the initiation of the polymerization to the time when the polymer solid concentration is 3% by mass (preferably 5% by mass, more preferably 8% by mass, still more preferably 10% by mass, further preferably 15% by mass, still further preferably 18% by mass, yet still further preferably 20% by mass, particularly preferably 25% by mass).

In the polymerization step, the pH of the aqueous medium is preferably 4.0 or more during a period of 60% or more (preferably 70% or more, more preferably 80% or more, still more preferably 90% or more, further preferably 95% or more, still further preferably 99% or more, particularly preferably 100%) from the time when the polymer solid concentration is 10% by mass (preferably 8% by mass, more preferably 5% by mass, still more preferably 3% by mass, further preferably polymerization initiation) to the time when the polymer solid concentration is 15% by mass.

In the polymerization step, the pH of the aqueous medium is preferably 4.0 or more during a period of 60% or more (preferably 70% or more, more preferably 80% or more, still more preferably 90% or more, further preferably 95% or more, still further preferably 99% or more, particularly preferably 100%) from the time when the polymer solid concentration is 15% by mass to the time when the polymer solid concentration is 18% by mass (preferably 20% by mass, more preferably 25% by mass).

In the polymerization step, the pH of the aqueous medium is preferably 4.0 or more during a period of 60% or more (preferably 70% or more, more preferably 80% or more, still more preferably 90% or more, further preferably 95% or more, more preferably 99% or more, particularly preferably 100%) from the time when the polymer solid concentration is 25% by mass (preferably 20% by mass, more preferably 18% by mass, still more preferably 15% by mass, further preferably 10% by mass, still further preferably 8% by mass, particularly preferably 5% by mass, more preferably 3% by mass, and still more preferably polymerization initiation) to the time when the polymerization is completed.

The pH of the aqueous medium is preferably more than 4.0 in any case, more preferably 4.5 or more, still more preferably 5.0 or more, further preferably 5.5 or more, still further preferably 6.0 or more, particularly preferably 6.5 or more, more preferably 7.0 or more, still more preferably 7.5 or more, and further preferably 8.0 or more.

In the first production method of the present disclosure, the hydrocarbon surfactant is preferably an anionic hydrocarbon surfactant, and more preferably a carboxylic acid-type hydrocarbon surfactant.

The second production method of the present disclosure preferably includes a polymerization step of polymerizing a fluoromonomer in an aqueous medium in the presence of an anionic hydrocarbon surfactant and a polymerization initiator to obtain a fluoropolymer, in which the hydrocarbon surfactant contains a salt of the hydrocarbon surfactant. In other words, at least a part of the anionic hydrocarbon surfactant in the polymerization step is in the form of a salt.

As a result of diligent studies by the present disclosers, surprisingly, it has been found that by containing a salt of an anionic hydrocarbon surfactant, the stability of polymerization is improved and fluoropolymer having a high molecular weight can be produced.

The anionic hydrocarbon surfactant will be described later.

It can be confirmed by measuring the conductivity that the anionic hydrocarbon surfactant contains a salt of the hydrocarbon surfactant.

In the second production method of the present disclosure, the anionic hydrocarbon surfactant preferably has a salt concentration of 50% by mass or more, more preferably 60% by mass or more, still more preferably 70% by mass or more, further preferably 80% by mass or more, still further preferably 90% by mass or more, and particularly preferably 95% by mass or more, based on the total mass of the anionic hydrocarbon surfactant.

The ratio of the salt can be measured by the solution concentration and the conductivity.

In the second production method of the present disclosure, the hydrocarbon surfactant is more preferably a carboxylic acid-type hydrocarbon surfactant.

In the salt of an anionic hydrocarbon surfactant, the cation (excluding a hydrogen atom) that replaces the hydrogen atom of the acid is, for example, a metal atom, $NR^y_4$ (each $R^y$ may be the same or different and is H or an organic group), imidazolium optionally having a substituent, pyridinium optionally having a substituent, or phosphonium optionally having a substituent. The $R^Y$ is preferably H or an alkyl group, more preferably H or an alkyl group having 1 to 10 carbon atoms, and still more preferably H or an alkyl group having 1 to 4 carbon atoms.

The cation in the salt of the anionic hydrocarbon surfactant is preferably a metal atom or $NR^y_4$, more preferably $NR^y4$, and still more preferably $NH_4$.

Since the conductivity varies greatly depending on the temperature, the conductivity is measured using a thermostatic bath while keeping the sample liquid temperature at 25° C. and the cell temperature of the pH meter at the same temperature.

In the first and second production methods of the present disclosure, the polymerization step is preferably performed substantially in the absence of the hydrocarbon surfactant in the form of an organic acid. By polymerizing substantially in the absence of the hydrocarbon surfactant in the form of an organic acid, the stability of the polymerization is further improved and a high-molecular-weight fluoropolymer can be obtained.

Substantially in the absence of the hydrocarbon surfactant in the form of an organic acid, the concentration of the organic acid is preferably 1.0% by mass or less, more preferably 0.5% by mass or less, still more preferably 0.1% by mass or less, still further preferably 0.05% by mass or less, and particularly preferably 0.01% by mass or less, based on the mass of the resulting aqueous dispersion.

As used herein, the term "organic acid" means an organic compound that exhibits acidity. Examples of the organic acid include a carboxylic acid having a —COOH group, and a sulfonic acid having a —$SO_3H$ group, and preferred is a carboxylic acid from the viewpoint that the pH of an aqueous solution containing the organic acid can be easily adjusted.

Further, "form of an organic acid" is a form in which H is not free from the acidic group contained in the organic acid (for example, —COOH group, —$SO_3H$ group)

Further, in the case of the first production method of the present disclosure, the hydrocarbon surfactant is preferably an anionic hydrocarbon surfactant.

The term "production method of the present disclosure" as used herein, unless otherwise specified, includes both the first production method and the second production method. Further, the term "polymerization step", unless otherwise specified, includes both the polymerization step in the first production method and the polymerization step in the second production method.

In the polymerization step, the amount of the hydrocarbon surfactant at the initiation of the polymerization is preferably more than 50 ppm based on the aqueous medium. The amount of the hydrocarbon surfactant at the initiation of the polymerization is preferably 60 ppm or more, more preferably 70 ppm or more, still more preferably 80 ppm or more, and further preferably 100 ppm or more. The upper limit thereof is preferably, but not limited to, 10,000 ppm, and more preferably 5,000 ppm, for example. When the amount of the hydrocarbon surfactant at the initiation of polymerization is in the above range, an aqueous dispersion having a smaller average primary particle size and superior stability can be obtained and a fluoropolymer having a higher molecular weight can be obtained.

It can be said that the polymerization started when the gas fluoromonomer in the reactor became a fluoropolymer and the pressure drop in the reactor occurred. U.S. Pat. No. 3,391,099 (Punderson) discloses a dispersion polymerization of tetrafluoroethylene in an aqueous medium comprising two separate steps of a polymerization process comprising: first the formation of a polymer nucleus as a nucleation site, and then the growth step comprising polymerization of the established particles. The polymerization is usually initiated when both the monomer to be polymerized and the polymerization initiator are charged in the reactor. Further, in the present disclosure, an additive related to the formation of a nucleation site is referred to as a nucleating agent.

The polymerization step preferably includes an addition step of adding a composition containing a hydrocarbon surfactant after the initiation of the polymerization. By the addition step, the stability of polymerization is further improved, and a higher-molecular-weight fluoropolymer can be obtained.

The hydrocarbon surfactant may be, for example, in the form of a solid (for example, powder of a hydrocarbon surfactant) or in the form of a liquid.

The composition may be any one containing a hydrocarbon surfactant, may be composed of only a hydrocarbon surfactant, or may be a solution or dispersion of a hydrocarbon surfactant containing a hydrocarbon surfactant and a liquid medium. Therefore, the addition step can also be said to be a step of adding a hydrocarbon surfactant alone or a composition containing the hydrocarbon surfactant after the initiation of polymerization.

The hydrocarbon surfactant is not limited to one type, and may be a mixture of two or more types.

The liquid medium may be either an aqueous medium or an organic solvent, or may be a combination of an aqueous medium and an organic solvent.

Specific examples of the composition include an aqueous solution in which a hydrocarbon surfactant is dissolved in an aqueous medium and an aqueous dispersion in which a hydrocarbon surfactant is dispersed in an aqueous medium.

The hydrocarbon surfactant added in the addition step is preferably 0.0001 to 10% by mass based on the aqueous medium. It is more preferably 0.001% by mass or more, still more preferably 0.01% by mass or more, and particularly preferably 0.05% by mass or more based on the aqueous medium. Further, it is more preferably 5% by mass or less, still more preferably 3% by mass or less, and particularly preferably 1% by mass or less based on the aqueous medium.

Since the stability of polymerization is improved and a higher-molecular-weight fluoropolymer can be obtained, the composition is preferably an aqueous solution containing a hydrocarbon surfactant and having a pH of 5.0 or more.

The pH of the aqueous solution is more preferably 6.0 or more, still more preferably 6.5 or more, further preferably 7.0 or more, still further preferably 7.5 or more, and particularly preferably 8.0 or more. The upper limit of pH is not limited, but may be 12.0 or less, or may be 11.0 or less.

The hydrocarbon surfactant in the addition step is preferably an anionic hydrocarbon surfactant, and more preferably a carboxylic acid-type hydrocarbon surfactant.

The anionic hydrocarbon surfactant and the carboxylic acid-type hydrocarbon surfactant are not limited, but for example, the anionic hydrocarbon surfactants and the carboxylic acid-type hydrocarbon surfactants exemplified as the hydrocarbon surfactants described later can be preferably used.

The polymerization step may further include a step of continuously adding a hydrocarbon surfactant. Adding the hydrocarbon surfactant continuously means, for example, adding the hydrocarbon surfactant not all at once, but adding over time and without interruption or adding in portions.

In the step of continuously adding the hydrocarbon surfactant in the polymerization step, the hydrocarbon surfactant is preferably started to be added to the aqueous medium when the concentration of fluoropolymer formed in the aqueous medium is less than 0.60% by mass. Further, the hydrocarbon surfactant is more preferably started to be added when the concentration is 0.50% by mass or less, still more preferably started to be added when the concentration is 0.36% by mass or less, further preferably started to be added when the concentration is 0.30% by mass or less, still further preferably started to be added when the concentration is 0.20% by mass or less, particularly preferably started to be added when the concentration is 0.10% by mass or less, and most preferably started to be added when the polymerization is initiated. The concentration is based on the total amount of the aqueous medium and the fluoropolymer.

In a case where "when the hydrocarbon surfactant is started to be added to the aqueous medium when the concentration of fluoropolymer formed in the aqueous medium is less than 0.60% by mass", at least a part of the hydrocarbon surfactant continuously added may be added when the concentration of the fluoropolymer is less than 0.60% by mass, and may be continuously added even after the concentration becomes 0.60% by mass or more.

By including the above steps, an aqueous dispersion having a smaller average primary particle size and superior stability can be obtained and a fluoropolymer having a higher molecular weight can be obtained.

In the step of continuously adding the hydrocarbon surfactant, the amount of the hydrocarbon surfactant added is preferably 0.0001 to 10% by mass based on 100% by mass of the aqueous medium. The lower limit thereof is more preferably 0.001% by mass, still more preferably 0.01% by mass while the upper limit thereof is more preferably 5% by mass, still more preferably 1% by mass.

In the polymerization step, the total amount of the hydrocarbon surfactant added is preferably 0.001 to 10% by mass based on 100% by mass of the aqueous medium. The lower limit thereof is more preferably 0.01% by mass, while the upper limit thereof is more preferably 1% by mass.

The total amount is a total of the amount of the hydrocarbon surfactant at the initiation of polymerization and the amount of the hydrocarbon surfactant added after the initiation of polymerization, and does not include the amount of the hydrocarbon surfactant added after the completion of polymerization.

The polymerization step may be performed by charging a polymerization reactor with an aqueous medium, the hydrocarbon surfactant, a monomer, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the hydrocarbon surfactant may additionally be added depending on the purpose. The hydrocarbon surfactant may be added after the polymerization reaction is initiated.

The polymerization temperature and the polymerization pressure in the polymerization step are determined as appropriate in accordance with the types of the monomers used, the molecular weight of the target fluoropolymer, and the reaction rate.

For example, the polymerization temperature is preferably 10 to 150° C. The polymerization temperature is more preferably 30° C. or higher, and still more preferably 50° C. or higher. Further, the polymerization temperature is more preferably 120° C. or lower, and still more preferably 100° C. or lower.

The polymerization pressure is preferably 0.05 to 10 MPaG. The polymerization pressure is more preferably 0.3 MPaG or more, and still more preferably 0.5 MPaG or more. Further, the polymerization pressure is more preferably 5.0 MPaG or lower, still more preferably 3.0 MPaG or lower. In particular, from the viewpoint of improving the yield of PTFE, the polymerization pressure is preferably 1.0 MPaG or higher, more preferably 1.2 MPaG or higher, still more preferably 1.5 MPaG or higher, still further preferably 1.8 MPaG or higher, and particularly preferably 2.0 MPaG or higher.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization.

The polymerization initiator to be used may be an oil-soluble radical polymerization initiator, a water-soluble radical polymerization initiator, or a redox initiator.

The concentration of the polymerization initiator is appropriately determined depending on the types of the monomers, the molecular weight of the target fluoropolymer, and the reaction rate.

The polymerization initiator may be added in any amount, and the initiator in an amount that does not significantly decrease the polymerization rate (e.g., several parts per million in water) or more may be added at once in the initial stage of polymerization, or may be added successively or continuously. The upper limit thereof falls within a range where the reaction temperature is allowed to increase while the polymerization reaction heat is removed through the device surfaces. The upper limit thereof is more preferably within a range where the polymerization reaction heat can be removed through the device surfaces.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-co-chloro-decafluorohexanoyl-peroxide, ω-hydrododecafluoroheptanoyl-perfluorobutyryl-peroxide, di(dichloropentafluorobutanoyl) peroxide, di(trichlorooctafluorohexanoyl)peroxide, di(tetrachloroundecafluorooctanoyl)peroxide, di(pentachlorotetradecafluorodecanoyl) peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid and percarbonic acid; organic peroxides such as disuccinic acid peroxide and diglutaric acid peroxide; and t-butyl permaleate and t-butyl hydroperoxide. A reducing agent such as sulfites may be contained together, and the use amount thereof may be 0.1 to 20 times that of peroxide.

In the production method of the present disclosure, the polymerization initiator is preferably a redox initiator, and more preferably a redox initiator in which an oxidizing agent and a reducing agent are combined.

Examples of the oxidizing agent include persulfates such as ammonium persulfate and potassium persulfate; organic peroxides such as disuccinic acid peroxide and diglutaric acid peroxide; permanganic acid, permanganates such as ammonium permanganate, alkali metal salts of permanganate (potassium permanganate or the like), and alkali earth metal salts of permanganate; manganese triacetate ($C_6H_9MnO_6$); cerium (IV) salts such as cerium ammonium nitrate and cerium ammonium sulfate; and bromic acid or salts thereof such as bromic acid, ammonium bromate, alkali metal salts of bromate, and alkaline earth metal salts of bromate.

Examples of the reducing agent include dicarboxylic acids such as oxalic acid, malonic acid, succinic acid, and glutaric acid or salts thereof; bromic acid or salts thereof; and diimines. The dicarboxylic acid or a salt thereof is preferably oxalic acid or a salt thereof. The bromic acid or a salt thereof is preferably potassium bromate.

In order to increase the decomposition rate of the initiator, the combination of the redox initiator may preferably contain a copper salt or an iron salt. An example of the copper salt is copper(II) sulfate and an example of the iron salt is iron (II) sulfate.

In the redox initiator, the oxidizing agent is preferably a permanganic acid or a salt thereof, persulfate, manganese triacetate, a cerium (IV) salt, or bromic acid or a salt thereof, and the reducing agent is preferably a dicarboxylic acid or a salt thereof or diimine.

The oxidizing agent is more preferably a permanganic acid or a salt thereof, persulfate, or bromic acid or a salt thereof, and the reducing agent is more preferably a dicarboxylic acid or a salt thereof.

Examples of the redox initiator include combinations of potassium permanganate/oxalic acid, potassium permanganate/ammonium oxalate, manganese triacetate/oxalic acid, manganese triacetate/ammonium oxalate, ammonium cerium nitrate/oxalic acid, and ammonium cerium nitrate/ammonium oxalate.

In the case of using a redox initiator, either an oxidizing agent or a reducing agent may be charged into a polymerization tank in advance, followed by adding the other continuously or intermittently thereto to initiate the polymerization. For example, in the case of potassium permanganate/ammonium oxalate, preferably, ammonium oxalate is charged into a polymerization tank and potassium permanganate is continuously added thereto.

When the term "potassium permanganate/ammonium oxalate" is used in the redox initiator of the present specification, it means a combination of potassium permanganate and ammonium oxalate. The same applies to other compounds.

The redox initiator used is preferably an oxidizing agent or a reducing agent capable of adjusting the pH of the redox initiator aqueous solution to 4.0 or more. The redox initiator aqueous solution means a 0.50% by mass aqueous solution of an oxidizing agent or a 0.50% by mass aqueous solution of a reducing agent.

That is, at least one of the 0.50% by mass aqueous solution of the oxidizing agent and the 0.50% by mass aqueous solution of the reducing agent may have a pH of 4.0 or more, and it is preferable that both the 0.50% by mass aqueous solution of the oxidizing agent and the 0.50% by mass aqueous solution of the reducing agent have a pH of 4.0 or more.

The pH of the redox initiator aqueous solution (0.50% by mass aqueous solution of oxidizing agent or 0.50% by mass aqueous solution of reducing agent) is more preferably 5.0 or more, and still more preferably 5.5 or more, and particularly preferably 6.0 or more.

The redox initiator is particularly preferably a combination of an oxidizing agent which is a salt and a reducing agent which is a salt.

For example, the oxidizing agent which is a salt is more preferably at least one selected from the group consisting of a persulfate, a permanganate, a cerium (IV) salt and a bromate, still more preferably the permanganate, and particularly preferably potassium permanganate.

Further, the reducing agent which is a salt is more preferably at least one selected from the group consisting of oxalate, malonate, succinate, glutarate, and bromate, and still more preferably oxalate, and particularly preferably ammonium oxalate.

Specifically, the redox initiator is preferably at least one selected from the group consisting of potassium permanganate/ammonium oxalate, potassium bromate/ammonium sulfite, manganese triacetate/ammonium oxalate, and ammonium cerium nitrate/ammonium oxalate, preferably at least one selected from the group consisting of potassium permanganate/ammonium oxalate, potassium bromate/ammonium sulfite, and ammonium cerium nitrate/ammonium oxalate.

By using a redox initiator in the polymerization step, the molecular weight of the obtained fluoropolymer can be increased. Therefore, when the fluoropolymer is PTFE, the SSG can be made small and stretchable.

Further, by using the redox initiator in the polymerization step, the number of fluoropolymer particles generated in the aqueous dispersion can be increased. Further, the yield of fluoropolymer can also be increased.

When a redox initiator is used, the oxidizing agent and the reducing agent may be added all at once at the initial stage of polymerization, or the reducing agent may be added all at once at the initial stage of polymerization and the oxidizing agent may be added continuously, or the oxidizing agent may be added all at once at the initial stage of polymerization and the reducing agent may be added continuously, or both the oxidizing agent and the reducing agent may be added continuously.

When a redox initiator is used as the polymerization initiator, the amount of the oxidizing agent added to the aqueous medium is preferably 5 to 10,000 ppm, more preferably 10 to 1,000 ppm, and the amount of the reducing agent added is preferably 5 to 10,000 ppm, more preferably from 10 to 1,000 ppm.

When a redox initiator is used in the polymerization step, the polymerization temperature is preferably 100° C. or lower, more preferably 95° C. or lower, and still more preferably 90° C. or lower. The polymerization temperature is preferably 10° C. or higher, more preferably 20° C. or higher, and still more preferably 30° C. or higher.

Fluoropolymers in the case of using the redox initiator are not limited, and the redox initiator can be suitably used for the production of (I) non melt-processible fluororesins, including TFE polymers (PTFE); (II) melt-fabricable fluororesins, including ethylene/TFE copolymers (ETFE), TFE/HFP copolymers (FEP), TFE/perfluoro(alkyl vinyl ether) copolymers (e.g., PFA, MFA), TFE/VDF copolymers, and electrolyte polymer precursors; and (III) fluoroelastomer, including TFE/propylene copolymers, TFE/propylene/third monomer copolymers (the third monomer is VDF, HFP, CTFE, fluoroalkyl vinyl ethers, or the like), copolymers of TFE and fluoroalkyl vinyl ethers; HFP/ethylene copolymers, HFP/ethylene/TFE copolymers; PVDF; thermoplastic elastomers such as VDF/HFP copolymers, HFP/ethylene copolymers, and VDF/TFE/HFP copolymers; and fluorine-containing segmented polymers described in Japanese Patent Publication No. 61-49327. Among them, it is suitable for the production of PTFE, FEP, PFA or fluoroelastomer, and especially suitable for the production of PTFE.

The polymerization step may further polymerize the fluoromonomer in the presence of a nucleating agent.

The nucleating agent is preferably at least one selected from the group consisting of, for example, a fluoropolyether, a nonionic surfactant, and a chain transfer agent.

In this case, in the first production method of the present disclosure, the polymerization step may be a step of polymerizing a fluoromonomer in an aqueous medium having a pH of 4.0 or more in the presence of a hydrocarbon surfactant (excluding nonionic surfactants), a nucleating agent, and a polymerization initiator to obtain a fluoropolymer.

In the second production method of the present disclosure, the polymerization step may be a step of polymerizing a fluoromonomer in an aqueous medium in the presence of an anionic hydrocarbon surfactant, a nucleating agent, and a polymerization initiator to obtain a fluoropolymer.

The fluoropolyether is preferably perfluoropolyether.

The fluoropolyether preferably has a repeating unit represented by the formulas (1a) to (1d):

$$(-CFCF_3-CF_2-O-)_n \quad (1a)$$

$$(-CF_2-CF_2-CF_2-O-)_n \quad (1b)$$

$$(-CF_2-CF_2-O-)_n-(-CF_2-O-)_m \quad (1c)$$

$$(-CF_2-CFCF_3-O-)_n-(-CF_2-O-)_m \quad (1d)$$

wherein m and n are integers of 1 or more.

The fluoropolyether is preferably fluoropolyetheric acid or a salt thereof, and the fluoropolyetheric acid is preferably a carboxylic acid, a sulfonic acid, a sulfonamide, or a phosphonic acid, and more preferably a carboxylic acid. Among the fluoropolyetheric acid or a salt thereof, a salt of fluoropolyetheric acid is preferable, an ammonium salt of fluoropolyetheric acid is more preferable, and an ammonium salt of fluoropolyethercarboxylic acid is still more preferable.

The fluoropolyetheric acid or a salt thereof can have any chain structure in which oxygen atoms in the main chain of the molecule are separated by saturated fluorocarbon groups having 1 to 3 carbon atoms. Two or more types of fluorocarbon groups can be present in the molecule.

The fluoropolyether acid or its salt is preferably a compound represented by the following formula or a salt thereof:

$$CF_3-CF_2-CF_2-O(-CFCF_3-CF_2-O-)_nCFCF_3-COOH, CF_3-CF_2-CF_2-O(-CF_2-CF_2-CF_2-O-)_n-CF_2-CF_2OOH, \text{ or } HOOC-CF_2-O(-CF_2-CF_2-O-)_n-(-CF_2-O-)_mCF_2COOH,$$

wherein m and n are as described above.

These structures are described in J. Appl. Polymer Sci., 57, 797(1995) examined by Kasai. As disclosed herein, such fluoropolyethers can have a carboxylic acid group or a salt thereof at one end or both ends. Similarly, such fluoropolyethers may have a sulfonic acid or phosphonic acid group or a salt thereof at one end or both ends. In addition, fluoropolyethers having acid functional groups at both ends may have different groups at each end. Regarding monofunctional fluoropolyether, the other end of the molecule is usually perfluorinated, but may contain a hydrogen or chlorine atom.

Fluoropolyethers having acid groups at one or both ends have at least two ether oxygens, preferably at least four ether oxygens, and still more preferably at least six ether oxygens. Preferably, at least one fluorocarbon group separating ether oxygens, more preferably at least two of such fluorocarbon groups, has 2 or 3 carbon atoms. Still more preferably, at least 50% of the fluorocarbon groups separating ether oxygens has 2 or 3 carbon atoms. Also preferably, the fluoropolyether has at least 15 carbon atoms in total, and for example, a preferable minimum value of n or n+m in the repeating unit structure is preferably at least 5. Two or more fluoropolyethers having an acid group at one end or both ends can be used in the methods according to the present disclosure. Typically, fluoropolyethers may contain a plurality of compounds in varying proportions within the molecular weight range relative to the average molecular weight, unless special care is taken in the production of a single specific fluoropolyether compound.

The fluoropolyether preferably has a number-average molecular weight of 800 g/mol or more. The fluoropolyether acid or a salt thereof preferably has a number-average molecular weight of less than 6,000 g/mol, because the fluoropolyether acid or a salt thereof may be difficult to disperse in an aqueous medium. The fluoropolyether acid or a salt thereof more preferably has a number-average molecular weight of 800 to 3,500 g/mol, and still more preferably 1,000 to 2,500 g/mol.

The amount of the fluoropolyether is preferably 5 to 3,000 ppm, more preferably 5 to 2,000 ppm, the lower limit thereof is still more preferably 10 ppm, and the upper limit thereof is still more preferably 100 ppm based on the aqueous medium.

Examples of the nonionic surfactant as the nucleating agent include nonionic surfactants as a hydrocarbon surfactant described later, and preferred is a fluorine-free nonionic surfactant. Examples of the nonionic surfactant include a compound represented by the following general formula (i):

$$R^{3z}—O\text{-}A^1\text{-}H \quad (i)$$

wherein $R^{3z}$ is a linear or branched primary or secondary alkyl group having 8 to 18 carbon atoms, and $A^1$ is a polyoxyalkylene chain.

$R^{3z}$ preferably has 10 to 16, more preferably 12 to 16 carbon atoms. When $R^{3z}$ has 18 or less carbon atoms, the aqueous dispersion tends to have good dispersion stability. Further, when $R^{3z}$ has more than 18 carbon atoms, it is difficult to handle due to its high flowing temperature. When $R^{3z}$ has less than 8 carbon atoms, the surface tension of the aqueous dispersion becomes high, so that the permeability and wettability are likely to decrease.

The polyoxyalkylene chain may be composed of oxyethylene and oxypropylene. The polyoxyalkylene chain is preferably a polyoxyalkylene chain composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average number of repeating oxypropylene groups is more than 0, the oxyethylene groups and oxypropylene groups in the polyoxyalkylene chain may be arranged in blocks or randomly.

From the viewpoint of viscosity and stability of the aqueous dispersion, a polyoxyalkylene chain composed of an average repeating number of 7 to 12 oxyethylene groups and an average repeating number of 0 to 2 oxypropylene groups is preferred. In particular, when $A^1$ has 0.5 to 1.5 oxypropylene groups on average, low foaming properties are good, which is preferable.

More preferably, $R^{3z}$ is (R')(R")HC—, where R' and R" are the same or different linear, branched, or cyclic alkyl groups, and the total amount of carbon atoms is at least 5, preferably 7 to 17. Preferably, at least one of R' or R" is a branched or cyclic hydrocarbon group.

Specific examples of the compound represented by the general formula (i)(polyoxyethylene alkyl ether) include $C_{13}H_{27}—O—(C_2H_4O)_{10}—H$, $C_{13}H_{27}—O—(C_2H_4O)_8—H$, $C_{12}H_{25}—O—(C_2H_4O)_{10}—H$, $C_{10}H_{21}CH(CH_3)CH_2—O—(C_2H_4O)_9—H$, $C_{13}H_{27}—O—(C_2H_4O)_9—(CH(CH_3)CH_2O)—H$, $C_{16}H_{33}—O—(C_2H_4O)_{10}—H$, and $HC(C_5H_{11})(C_7H_{15})—O—(C_2H_4O)_9—H$. Examples of commercially available products of the compound represented by the general formula (i) (polyoxyethylene alkyl ether) include Genapol X080 (product name, manufactured by Clariant), NOIGEN TDS series (manufactured by DKS Co., Ltd.) exemplified by NOIGEN TDS-80 (trade name), LEOCOL TD series (manufactured by Lion Corp.) exemplified by LEOCOL TD-90 (trade name), LIONOL® TD series (manufactured by Lion Corp.), T-Det A series (manufactured by Harcros Chemicals Inc.) exemplified by T-Det A 138 (trade name), and TERGITOL®15 S series (manufactured by Dow Chemical Co., Ltd.).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, manufactured by Dow Chemical Co., Ltd.).

The hydrophobic group of the nonionic surfactant may be any of an alkylphenol group, a linear alkyl group, and a branched alkyl group.

Examples of the polyoxyethylene alkylphenyl ether-based nonionic compound include, for example, a compound represented by the following general formula (ii):

$$R^{4z}—C_6H_4—O\text{-}A^2\text{-}H \quad (ii)$$

wherein $R^{4z}$ is a linear or branched primary or secondary alkyl group having 4 to 12 carbon atoms, and $A^2$ is a polyoxyalkylene chain. Specific examples of the polyoxyethylene alkylphenyl ether-based nonionic compound include Triton® X-100 (trade name, manufactured by Dow Chemical Co., Ltd.).

Examples of the nonionic surfactant also include polyol compounds. Specific examples thereof include those described in International Publication No. WO2011/014715.

Typical examples of the polyol compound include compounds having one or more sugar units as a polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of a hydroxy group (and/or hydroxyalkyl group) bonded to the carbon ring atoms has been substituted by the long chain residues such that an ether or ester bond is created between the long chain residue and the sugar moiety.

The sugar-based polyol may contain a single sugar unit or a plurality of sugar units. The single sugar unit or the plurality of sugar units may be modified with long chain moieties as described above. Specific examples of sugar-based polyol compounds include glycosides, sugar esters, sorbitan esters, and mixtures and combinations thereof.

A preferred type of polyol compounds is alkyl or modified alkyl glucosides. These types of surfactants contain at least one glucose moiety. Examples of alkyl or modified alkyl glucosides include compounds represented by the formula:

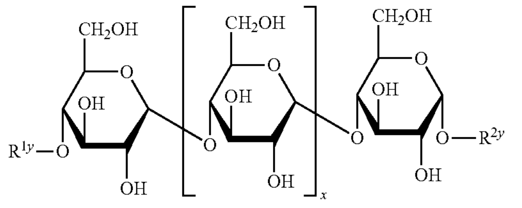

wherein x represents 0, 1, 2, 3, 4, or 5 and $R^{1y}$ and $R^{2y}$ each independently represent H or a long chain unit containing at least 6 carbon atoms, with the proviso that at least one of $R^{1y}$ and $R^{2y}$ is not H. Typical examples of $R^{1y}$ and $R^{2y}$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalyzed reactions of glucose, starch, or n-butyl glucoside with aliphatic alcohols which typically yields a mixture of various alkyl glucosides (Alkyl polygylcoside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF Corporation as Pluronic® R series, tridecyl alcohol alkoxylates supplied from BASF Corporation as Iconol® TDA series, and hydrocarbon-containing siloxane surfactants.

The amount of the nonionic surfactant is preferably 0.1 to 0.0000001% by mass, more preferably 0.01 to 0.000001% by mass, based on the aqueous medium.

Examples of the chain transfer agent include esters such as dimethyl malonate, diethyl malonate, methyl acetate, ethyl acetate, butyl acetate, and dimethyl succinate, as well as isopentane, methane, ethane, propane, isobutane, methanol, ethanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the general formula:

$R^aI_xBr_y$ wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, CFBrClCFClBr, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Among these, at least one selected from the group consisting of alkanes and alcohols is preferable from the viewpoints of polymerization reactivity, crosslinkablility, availability, and the like. The alkane preferably has 1 to 6, more preferably 1 to 5 carbon atoms. The alcohol preferably has 1 to 5 carbon atoms, and more preferably 1 to 4 carbon atoms. The chain transfer agent is particularly preferably at least one selected from the group consisting of methane, ethane, propane, isobutane, methanol, ethanol, propanol, and isopropanol.

The amount of the chain transfer agent is preferably 0.001 to 10,000 ppm based on the aqueous medium. The amount of the chain transfer agent is more preferably 0.01 ppm or more, still more preferably 0.05 ppm or more, and particularly preferably 0.1 ppm or more based on the aqueous medium. The amount of the chain transfer agent is more preferably 1,000 ppm or less, still more preferably 500 ppm or less, and particularly preferably 100 ppm or less based on the aqueous medium.

The chain transfer agent may be added to the reaction vessel at once before initiation of the polymerization, may be added at once after initiation of the polymerization, may be added in multiple portions during the polymerization, or may be added continuously during the polymerization.

Also, in the production method of the present disclosure, in addition to the hydrocarbon surfactant, polymerization initiator, nucleating agent used as necessary, and the like, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aids may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the aqueous emulsion containing the fluoropolymer such as PTFE emulsion after polymerization of the fluoromonomer such as TFE, and does not serve as a contaminating component.

The fluoromonomer used in the polymerization step preferably has at least one double bond.

The fluoromonomer is preferably at least one selected from the group consisting of tetrafluoroethylene (TFE), hexafluoropropylene (HFP), chlorotrifluoroethylene (CTFE), vinyl fluoride, vinylidene fluoride (VDF), trifluoroethylene, fluoroalkylvinyl ether, fluoroalkylethylene, fluoroalkylallyl ether, trifluoropropylene, pentafluoropropylene, trifluorobutene, tetrafluoroisobutene, hexafluoroisobutene, fluoromonomers represented by the general formula (100): $CHX^{101}{=}CX^{102}Rf^{101}$ (wherein one of $X^{101}$ and $X^{102}$ is H and the other is F, and $Rf^{101}$ is a linear or branched fluoroalkyl group having 1 to 12 carbon atoms), fluorinated vinyl heterocyclic compounds, and monomers providing a crosslinking site.

The fluoroalkyl vinyl ether is preferably at least one selected from the group consisting of:

a fluoromonomer represented by the general formula (110): $CF_2{=}CF{-}ORf^{111}$ wherein $Rf^{111}$ represents a perfluoroorganic group;

a fluoromonomer represented by the general formula (120): $CF_2{=}CF{-}OCH_2{-}Rf^{121}$ wherein $Rf^{121}$ represents a perfluoroalkyl group having 1 to 5 carbon atoms;

a fluoromonomer represented by the general formula (130): $CF_2{=}CFOCF_2ORf^{131}$ wherein $Rf^{131}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms;

a fluoromonomer represented by the general formula (140): $CF_2{=}CFO(CF_2CF(Y^{141})O)_m(CF_2)_nF$ wherein Y141 represents a fluorine atom or a trifluoromethyl group; m is an integer of 1 to 4; and n is an integer of 1 to 4; and a fluoromonomer represented by the general formula (150): $CF_2{=}CF{-}O{-}(CF_2CFY^{151}\text{-}O)_n{-}(CFY^{152})_m\text{-}A^{151}$ wherein $Y^{151}$ represents a fluorine atom, a chlorine atom, a $-SO_2F$ group, or a perfluoroalkyl group; the perfluoroalkyl group optionally containing ether oxygen and a $-SO_2F$ group; n represents an integer of 0 to 3; n $Y^{151}$s are the same as or different from each other; $Y^{152}$ represents a fluorine atom, a chlorine atom, or a $-SO_2F$ group; m represents an integer of 1 to 5; m $Y^{152}$s are the same as or different from each other; $A^{151}$ represents $-SO_2X^{151}$, $-COZ^{151}$, or $-POZ^{152}Z^{153}$; $X^{151}$ represents F, Cl, Br, I, $-OR^{151}$, or $-NR^{152}R^{153}$; $Z^{151}$, $Z^{152}$, and $Z^{153}$ are the same as or different from each other, and each represent $-NR^{154}R^{155}$ or $-OR^{156}$; $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom.

The "perfluoroorganic group" as used herein means an organic group in which all hydrogen atoms bonded to the carbon atoms are replaced with fluorine atoms. The perfluoroorganic group optionally has ether oxygen.

Examples of the fluoromonomer represented by the general formula (110) include a fluoromonomer in which $Rf^{111}$ is a perfluoroalkyl group having 1 to 10 carbon atoms. The perfluoroalkyl group preferably has 1 to 5 carbon atoms.

Examples of the perfluoroorganic group in the general formula (110) include a perfluoromethyl group, a perfluoroethyl group, a perfluoropropyl group, a perfluorobutyl group, a perfluoropentyl group, and a perfluorohexyl group.

Examples of the fluoromonomer represented by the general formula (110) further include those represented by the general formula (110) in which $Rf^{111}$ is a perfluoro(alkoxyalkyl) group having 4 to 9 carbon atoms; those in which $Rf^{111}$ is a group represented by the following formula:

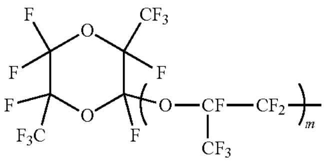

wherein m represents 0 or an integer of 1 to 4; and those in which $Rf^{111}$ is a group represented by the following formula:

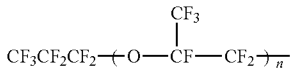

wherein n is an integer of 1 to 4.

Of these, the fluoromonomer represented by the general formula (110) is preferably a fluoromonomer represented by the general formula (160): $CF_2{=}CF{-}ORf^{161}$ wherein $Rf^{161}$ represents a perfluoroalkyl group having 1 to 10 carbon atoms. $Rf^{161}$ is preferably a perfluoroalkyl group having 1 to 5 carbon atoms.

The fluoroalkyl vinyl ether is preferably at least one selected from the group consisting of fluoromonomers represented by the general formulas (160), (130), and (140).

The fluoromonomer represented by the general formula (160) is preferably at least one selected from the group consisting of perfluoro(methyl vinyl ether), perfluoro(ethyl vinyl ether), and perfluoro(propyl vinyl ether), and is more preferably at least one selected from the group consisting of perfluoro(methyl vinyl ether) and perfluoro(propyl vinyl ether).

The fluoromonomer represented by the general formula (130) is preferably at least one selected from the group consisting of $CF_2{=}CFOCF_2OCF_3$, $CF_2{=}CFOCF_2OCF_2CF_3$, and $CF_2{=}CFOCF_2OCF_2CF_2OCF_3$.

The fluoromonomer represented by the general formula (140) is preferably at least one selected from the group consisting of $CF_2{=}CFOCF_2CF(CF_3)O(CF_2)_3F$, $CF_2{=}CFO(CF_2CF(CF_3)O)_2(CF_2)_3F$, and $CF_2{=}CFO(CF_2CF(CF_3)O)_2(CF_2)_2F$.

The fluoromonomer represented by the general formula (150) is preferably at least one selected from the group consisting of $CF_2{=}CFOCF_2CF_2SO_2F$, $CF_2{=}CFOCF_2CF(CF_3)OCF_2CF_2SO_2F$, $CF_2{=}CFOCF_2CF(CF_2CF_2SO_2F)OCF_2CF_2SO_2F$, and $CF_2{=}CFOCF_2CF(SO_2F)_2$.

The fluoromonomer represented by the general formula (100) is preferably a fluoromonomer in which $Rf^{101}$ is a linear fluoroalkyl group, and more preferably a fluoromonomer in which $Rf^{101}$ is a linear perfluoroalkyl group. $Rf^{101}$ preferably has 1 to 6 carbon atoms. Examples of the fluoromonomer represented by the general formula (100) include $CH_2{=}CFCF_3$, $CH_2{=}CFCF_2CF_3$, $CH_2{=}CFCF_2CF_2CF_3$, $CH_2{=}CFCF_2CF_2CF_2H$, $CH_2{=}CFCF_2CF_2CF_2CF_3$, $CHF{=}CHCF_3$(E-form), and $CHF{=}CHCF_3$(Z-form), among which preferred is 2,3,3,3-tetrafluoropropylene represented by $CH_2{=}CFCF_3$.

The fluoroalkyl ethylene is preferably a fluoroalkyl ethylene represented by the general formula (170): $CH_2{=}CH{-}(CF_2)_n{-}X^{171}$ (wherein $X^{171}$ is H or F; and n is an integer of 3 to 10), and more preferably at least one selected from the group consisting of $CH_2{=}CH{-}C_4F_9$ and $CH_2{=}CH{-}C_6F_{13}$.

An example of the fluoroalkylallyl ether is a fluoromonomer represented by the general formula (180): $CF_2{=}CF{-}CF_2{-}ORf^{111}$ wherein $Rf^{111}$ represents a perfluoroorganic group. $Rf^{111}$ of the general formula (180) is the same as $Rf^{111}$ of the general formula (110). $Rf^{111}$ is preferably a perfluoroalkyl group having 1 to 10 carbon atoms or a perfluoroalkoxyalkyl group having 1 to 10 carbon atoms. The fluoroalkylallyl ether represented by the general formula (180) is preferably at least one selected from the group consisting of $CF_2{=}CF{-}CF_2{-}O{-}CF_3$, $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, more preferably at least one selected from the group consisting of $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, and still more preferably $CF_2{=}CF{-}CF_2{-}O{-}CF_2CF_2CF_3$.

An example of the fluorinated vinyl heterocyclic compound is a fluorinated vinyl heterocyclic compound represented by the general formula (230):

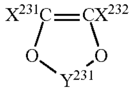

wherein $X^{231}$ and $X^{232}$ are each independently F, Cl, a methoxy group, or a fluorinated methoxy group; and $Y^{231}$ is represented by the following formula $Y^{232}$ or $Y^{233}$:

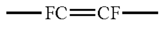
($Y^{232}$)

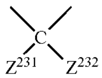
($Y^{233}$)

wherein $Z^{231}$ and $Z^{232}$ are each independently F or a fluorinated alkyl group having 1 to 3 carbon atoms.

The monomer providing a crosslinking site is preferably at least one selected from the group consisting of:

a fluoromonomer represented by the general formula (180): $CX^{181}{}_2{=}CX^{182}\text{-}Rf^{181}CHR^{181}X^{183}$ wherein $X^{181}$ and $X^{182}$ are each independently a hydrogen atom, a fluorine atom, or $CH_3$, and $Rf^{181}$ is a fluoroalkylene group, a perfluoroalkylene group, a fluoro (poly)oxyalkylene group or a perfluoro(poly)oxyalkylene group, $R^{181}$ is a hydrogen atom or $CH_3$, and $X^{183}$ is an iodine atom or a bromine atom;

a fluoromonomer represented by the general formula (190): $CX^{191}{}_2{=}CX^{192}\text{-}Rf^{191}X^{193}$ wherein $X^{191}$ and $X^{192}$ are each independently a hydrogen atom, a fluorine atom, or $CH_3$, and $Rf^{191}$ is a fluoroalkylene group, a perfluoroalkylene group, a fluoropolyoxyalkylene group or a perfluoropolyoxyalkylene group, and $X^{193}$ is an iodine atom or a bromine atom;

a fluoromonomer represented by the general formula (200): $CF_2{=}CFO(CF_2CF(CF_3)O)_m(CF_2)_n{-}X^{201}$ wherein m is an integer of 0 to 5; n is an integer of 1 to 3; and $X^{201}$ is a cyano group, a carboxyl group, an alkoxycarbonyl group, an iodine atom, a bromine atom, or $-CH_2I$;

a fluoromonomer represented by the general formula (210): $CH_2{=}CFCF_2O(CF(CF_3)CF_2O)_m(CF(CF_3))_n{-}X^{211}$ wherein m is an integer of 0 to 5; n is an integer of 1 to 3; and $X^{211}$ is a cyano group, a carboxyl group, an alkoxycarbonyl group, an iodine atom, a bromine atom, or $-CH_2OH$; and a monomer represented by the general formula (220): $CR^{221}R^{222}{=}CR^{223}\text{-}Z^{221}\text{-}CR^{224}{=}CR^{225}R^{226}$ wherein $R^{221}$, $R^{222}$, $R^{223}$, $R^{224}$, $R^{225}$, and $R^{226}$ are the same as or different from each other, and are each a hydrogen atom or an alkyl group having 1 to 5 carbon atoms; $Z^{221}$ is a linear or branched alkylene group having 1 to 18 carbon atoms and optionally having an oxygen atom, a cycloalkylene group having 3 to 18 carbon atoms, an at least partially fluorinated alkylene or oxyalkylene group having 1 to 10 carbon atoms, or a (per)fluoropolyoxyalkylene group which is represented by the following formula:

$$(Q)_p\text{-}CF_2O{-}(CF_2CF_2O)_m(CF_2O)_n{-}CF_2\text{-}(Q)_p{-}$$

(wherein Q is an alkylene group or an oxyalkylene group; p is 0 or 1; and m/n is 0.2 to 5) and which has a molecular weight of 500 to 10,000.

$X^{183}$ and $X^{193}$ are each preferably an iodine atom. $Rf^{181}$ and $Rf^{191}$ are each preferably a perfluoroalkylene group having 1 to 5 carbon atoms. $R^{181}$ is preferably a hydrogen atom. $X^{201}$ is preferably a cyano group, an alkoxycarbonyl group, an iodine atom, a bromine atom, or $-CH_2I$. $X^{211}$ is preferably a cyano group, an alkoxycarbonyl group, an iodine atom, a bromine atom, or $-CH_2OH$.

The monomer that provides a crosslinking site is preferably at least one selected from the group consisting of $CF_2{=}CFOCF_2CF(CF_3)OCF_2CF_2CN$, $CF_2{=}CFOCF_2CF(CF_3)OCF_2CF_2COOH$, $CF_2{=}CFOCF_2CF(CF_3)OCF_2CF_2CH_2I$, $CF_2{=}CFOCF_2CF_2CH_2I$, $CH_2{=}CFCF_2OCF(CF_3)CF_2OCF(CF_3)CN$, $CH_2{=}CFCF_2OCF(CF_3)CF_2OCF(CF_3)COOH$, $CH_2{=}CFCF_2OCF(CF_3)CF_2OCF(CF_3)CH_2OH$, $CH_2{=}CHCF_2CF_2I$, $CH_2{=}CH(CF_2)_2CH{=}CH_2$, $CH_2{=}CH(CF_2)_6CH{=}CH_2$, and $CF_2{=}CFO(CF_2)_5CN$, and is more preferably at least one selected from the group consisting of $CF_2{=}CFOCF_2CF(CF_3)OCF_2CF_2CN$ and $CF_2{=}CFOCF_2CF_2CH_2I$.

In the polymerization step, the fluoromonomer may be polymerized with a fluorine-free monomer. An example of the fluorine-free monomer is a hydrocarbon monomer reactive with the fluoromonomer. Examples of the hydrocarbon monomer include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, monochlorovinyl acetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may also be a functional group-containing hydrocarbon monomer (excluding the monomer providing a crosslinking site). Examples of the functional group-containing hydrocarbon monomer include hydroxy alkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-free monomers having carboxyl groups such as itaconic acid, succinic acid, succinic anhydride, fumaric acid, fumaric anhydride, crotonic acid, maleic acid, maleic anhydride, and perfluorobutenoic acid; fluorine-free monomers having a glycidyl group such as glycidyl vinyl ether and glycidyl allyl ether; fluorine-free monomers having an amino group such as aminoalkyl vinyl ether and aminoalkyl allyl ether; and fluorine-free monomers having an amide group such as (meth)acrylamide and methylol acrylamide.

In the polymerization step, desired fluoropolymer particles can be obtained by polymerizing one or two or more of the fluoromonomers.

The hydrocarbon surfactant may be, for example, those disclosed in National Publication of International Patent Application No. 2013-542308, National Publication of International Patent Application No. 2013-542309, and National Publication of International Patent Application No. 2013-542310.

The hydrocarbon surfactant may be a surfactant having a hydrophilic moiety and a hydrophobic moiety on the same molecule. These may be cationic, nonionic or anionic.

Cationic hydrocarbon surfactants usually have a positively charged hydrophilic moiety such as alkylated ammonium halide such as alkylated ammonium bromide and a hydrophobic moiety such as long chain fatty acids.

Anionic hydrocarbon surfactants usually have a hydrophilic moiety such as a carboxylate, a sulfonate or a sulfate and a hydrophobic moiety that is a long chain hydrocarbon moiety such as alkyl.

Nonionic hydrocarbon surfactants are usually free from charged groups and have hydrophobic moieties that are long chain hydrocarbons. The hydrophilic moiety of the nonionic hydrocarbon surfactant contains water-soluble functional groups such as chains of ethylene ether derived from polymerization with ethylene oxide.

Examples of nonionic hydrocarbon surfactants Polyoxyethylene alkyl ether, polyoxyethylene alkyl phenyl ether, polyoxyethylene alkyl ester, sorbitan alkyl ester, polyoxyethylene sorbitan alkyl ester, glycerol ester, and derivatives thereof.

Specific examples of polyoxyethylene alkyl ethers: polyoxyethylene lauryl ether, polyoxyethylene cetyl ether, polyoxyethylene stearyl ether, polyoxyethylene oleyl ether, polyoxyethylene behenyl ether, and the like.

Specific examples of polyoxyethylene alkyl phenyl ether: polyoxyethylene nonylphenyl ether, polyoxyethylene octylphenyl ether, and the like.

Specific examples of polyoxyethylene alkyl esters: polyethylene glycol monolaurylate, polyethylene glycol monooleate, polyethylene glycol monostearate, and the like.

Specific examples of sorbitan alkyl ester: polyoxyethylene sorbitan monolaurate, polyoxyethylene sorbitan monopalmitate, polyoxyethylene sorbitan monostearate, polyoxyethylene sorbitan monooleate, and the like.

Specific examples of polyoxyethylene sorbitan alkyl ester: polyoxyethylene sorbitan monolaurate, polyoxyethylene sorbitan monopalmitate, polyoxyethylene sorbitan monostearate, and the like.

Specific examples of glycerol ester: glycerol monomyristate, glycerol monostearate, glycerol monooleate, and the like.

Specific examples of the above derivatives: polyoxyethylene alkylamine, polyoxyethylene alkylphenyl-formaldehyde condensate, polyoxyethylene alkyl ether phosphate, and the like.

The ethers and esters may have an HLB value of 10 to 18.

Examples of nonionic hydrocarbon surfactants include Triton® X series (X15, X45, X100, etc.), Tergitol®$_{15}$—S series, Tergitol® TMN series (TMN-6, TMN-10, TMN-100, etc.), and Tergitol® L series manufactured by Dow Chemical Company, and Pluronic® R series (31R1, 17R2, 10R5, 25R4(m to 22, n to 23), and Iconol® TDA series (TDA-6, TDA-9, TDA-10) manufactured by BASF Corporation.

Examples of the anionic hydrocarbon surfactant include Versatic®$_{10}$ manufactured by Resolution Performance Products, and Avanel S series (S-70, S-74, etc.) manufactured by BASF Corporation.

The hydrocarbon surfactant is preferably an anionic hydrocarbon surfactant.

Examples of the anionic hydrocarbon surfactant include an anionic surfactant represented by $R^z$-L-M, wherein $R^z$ is a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is $-ArSO_3^-$, $—SO_3^-$, $—SO_4^-$, $—PO_3^-$ or $—COO^-$, and M is H, a metal atom, $NR^{5z}_4$, imidazolium optionally having a substituent, pyridinium optionally having a substituent, or phosphonium optionally having a substituent, where each $R^{5z}$ is H or an organic group, and $-ArSO_3—$ is an aryl sulfonate. $R^{5z}$ is preferably H or an organic group having 1 to 10 carbon atoms, and more preferably H or an organic group having 1 to 4 carbon atoms. Specific examples thereof include a compound represented by $CH_3—(CH_2)_n$-L-M, wherein n is an integer of 6 to 17, as represented by lauryl acid and lauryl sulfate (dodecyl sulfate), and L and M are the same as described above.

Mixtures of those in which $R^z$ is an alkyl group having 12 to 16 carbon atoms and L-M is a sulfate can also be used.

Examples of the anionic hydrocarbon surfactant include an anionic surfactant represented by $R^{6z}$-(L-M)$_2$, wherein $R^{6z}$ is a linear or branched alkylene group having 1 or more carbon atoms and optionally having a substituent, or a cyclic alkylene group having 3 or more carbon atoms and optionally having a substituent, and optionally contains a monovalent or divalent heterocycle or optionally forms a ring when having 3 or more carbon atoms; L is $-ArSO_3^-$, $—SO_3^-$, $—SO_4^-$, $—PO_3^-$ or $—COO^-$, and M is H, a metal atom, $NR^{5z}_4$, imidazolium optionally having a substituent, pyridinium optionally having a substituent, or phosphonium optionally having a substituent, where each $R^{5z}$ is H or an organic group, and $-ArSO_3^-$ is an aryl sulfonate.

Examples of the anionic hydrocarbon surfactant include an anionic surfactant represented by $R^{7z}$-(L-M)$_3$, wherein $R^{7z}$ is a linear or branched alkylidine group having 1 or more carbon atoms and optionally having a substituent, or a cyclic alkylidine group having 3 or more carbon atoms and optionally having a substituent, and optionally contains a monovalent or divalent heterocycle or optionally forms a ring when having 3 or more carbon atoms; L is $-ArSO_3^-$, $—SO_3^-$, $—SO_4^-$, $—PO_3^-$ or $—COO^-$, and M is H, a metal atom, $NR^{5z}_4$, imidazolium optionally having a substituent, pyridinium optionally having a substituent, or phosphonium optionally having a substituent, each $R^{5z}$ is H or an organic group; and $-ArSO_3^-$ is an aryl sulfonate.

$R^{5z}$ is preferably H or an alkyl group, more preferably H or an alkyl group having 1 to 10 carbon atoms, and still more preferably H or an alkyl group having 1 to 4 carbon atoms.

The term "substituent" as used herein, unless otherwise specified, means a substitutable group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoylamino group, a halogen atom, a sulfamoylcarbamoyl group, a carbamoyl sulfamoyl group, a dialiphatic oxyphosphinyl group, or a diaromatic oxyphosphinyl group.

Examples of the hydrocarbon surfactant include a siloxane hydrocarbon surfactant. Examples of the siloxane hydrocarbon surfactant include those described in Silicone Surfactants, R. S. M. Hill, Marcel Dekker, Inc., ISBN: 0-8247-00104. The structure of the siloxane hydrocarbon surfactant includes defined hydrophobic and hydrophilic moieties. The hydrophobic moiety contains one or more dihydrocarbyl siloxane units, where the substituents on the silicone atoms are completely hydrocarbon.

In the sense that the carbon atoms of the hydrocarbyl groups are fully replaced with hydrogen atoms where they can be replaced with halogen such as fluorine, these siloxane hydrocarbon surfactants can also be regarded as hydrocarbon surfactants, i.e. the monovalent substituents on the carbon atoms of the hydrocarbyl groups are hydrogen.

The hydrophilic moiety of the siloxane hydrocarbon surfactant may contain one or more polar moieties including ionic groups such as sulfate, sulfonate, phosphonate, phosphate ester, carboxylate, carbonate, sulfosuccinate, taurate (as the free acid, a salt or an ester), phosphine oxides, betaine, betaine copolyol, or quaternary ammonium salts. Ionic hydrophobic moieties may also contain ionically functionalized siloxane grafts.

Examples of such siloxane hydrocarbon surfactants include polydimethylsiloxane-graft-(meth)acrylic acid salts, polydimethylsiloxane-graft-polyacrylate salts, and polydimethylsiloxane-grafted quaternary amines.

The polar moieties of the hydrophilic moiety of the siloxane hydrocarbon surfactant may contain nonionic groups formed by polyethers, such as polyethylene oxide (PEO), and mixed polyethylene oxide/propylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/polypropylene oxide polyethers.

The hydrophilic moiety of the siloxane hydrocarbon surfactant may also contain a combination of ionic and nonionic moieties. Such moieties include, for example, ionically end-functionalized or randomly functionalized polyether or polyol. Preferred for carrying out the present disclosure is a siloxane having a nonionic moiety, i.e., a nonionic siloxane hydrocarbon surfactant.

The arrangement of the hydrophobic and hydrophilic moieties of the structure of a siloxane hydrocarbon surfactant may take the form of a diblock polymer (AB), triblock polymer (ABA), wherein the "B" represents the siloxane portion of the molecule, or a multi-block polymer. Alternatively, the siloxane surfactant may include a graft polymer.

The siloxane hydrocarbon surfactants also include those disclosed in U.S. Pat. No. 6,841,616.

Examples of the siloxane-based anionic hydrocarbon surfactant include Noveon® by Lubrizol Advanced Materials, Inc. and SilSense™ PE-100 silicone and SilSense™ CA-1 silicone available from Consumer Specialties.

Examples of the anionic hydrocarbon surfactant also include a sulfosuccinate surfactant Lankropol® K8300 by Akzo Nobel Surface Chemistry LLC.

Examples of the sulfosuccinate surfactant include sodium diisodecyl sulfosuccinate (Emulsogen® SB10 by Clariant) and sodium diisotridecyl sulfosuccinate (Polirol® TR/LNA by Cesapinia Chemicals).

Examples of the hydrocarbon surfactants also include PolyFox® surfactants by Omnova Solutions, Inc. (PolyFox™ PF-156A, PolyFox™ PF-136A, etc.).

The hydrocarbon surfactant is preferably an anionic hydrocarbon surfactant. The anionic hydrocarbon surfactant used may be those described above, including the following preferred compounds, for example.

The anionic hydrocarbon surfactant includes a compound (α) represented by the following formula (α):

$$R^{100}—COOM \quad (\alpha)$$

wherein $R^{100}$ is a monovalent organic group containing 1 or more carbon atoms; and M is H, a metal atom, $NR^{101}_4$, imidazolium optionally having a substituent, pyridinium optionally having a substituent, or phosphonium optionally having a substituent, wherein $R^{101}$ is H or an organic group and may be the same or different. The organic group for $R^{101}$ is preferably an alkyl group. $R^{101}$ is preferably H or an organic group having 1 to 10 carbon atoms, more preferably H or an organic group having 1 to 4 carbon atoms, and still more preferably H or an alkyl group having 1 to 4 carbon atoms.

From the viewpoint of surfactant function, the number of carbon atoms in $R^{100}$ is preferably 2 or more, and more preferably 3 or more. From the viewpoint of water-solubility, the number of carbon atoms in $R^{100}$ is preferably 29 or less, and more preferably 23 or less.

Examples of the metal atom as M include alkali metals (Group 1) and alkaline earth metals (Group 2), and preferred is Na, K, or Li. M is preferably H, a metal atom, or $NR^{101}_4$, more preferably H, an alkali metal (Group 1), an alkaline earth metal (Group 2), or $NR^{101}_4$, still more preferably H, Na, K, Li, or $NH_4$, further preferably Na, K, or $NH_4$, particularly preferably Na or $NH_4$, and most preferably $NH_4$.

Examples of the compound (α) include an anionic surfactant represented by $R^{102}$—COOM, wherein $R^{102}$ is a linear or branched, alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, $R^{102}$ optionally contains a monovalent or divalent heterocycle, or optionally forms a ring; and M is the same as above.

Specific examples thereof include a compound represented by $CH_3—(CH_2)_n—COOM$, wherein n is an integer of 2 to 28, and M is the same as above.

From the viewpoint of emulsion stability, the compound (α) may be free from a carbonyl group which is not in a carboxyl group.

Preferred examples of the hydrocarbon-containing surfactant free from a carbonyl group include a compound of the following formula (A):

$R^{103}$—COO-M (A)

wherein $R^{103}$ is an alkyl group, an alkenyl group, an alkylene group, or an alkenylene group, each of which optionally contains an ether bond; M is H, a metal atom, $NR^{101}_4$, imidazolium optionally having a substituent, pyridinium optionally having a substituent, or phosphonium optionally having a substituent; and $R^{101}$ is the same or different and is H or an organic group.

In the formula (A), $R^{103}$ is preferably an alkyl group or an alkenyl group, each of which optionally contains an ether group. The alkyl group or alkenyl group for $R^{103}$ may be linear or branched. The number of carbon atoms in $R^{103}$ is, but is not limited to, 2 to 29.

When the alkyl group is linear, the number of carbon atoms in $R^{103}$ is preferably 3 to 29, and more preferably 5 to 23. When the alkyl group is branched, the number of carbon atoms in $R^{103}$ is preferably 5 to 25, and more preferably 11 to 23.

When the alkenyl group is linear, the number of carbon atoms in $R^{103}$ is preferably 2 to 29, and more preferably 9 to 23. When the alkenyl group is branched, the number of carbon atoms in $R^{103}$ is preferably 2 to 29, more preferably 3 to 29, and still more preferably 9 to 23.

Examples of the alkyl group and alkenyl group include a methyl group, an ethyl group, an isobutyl group, a t-butyl group, and a vinyl group.

Examples of the anionic hydrocarbon surfactant include butylic acid, valeric acid, caproic acid, enanthic acid, caprylic acid, pelargonic acid, capric acid, undecanoic acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienoic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, sardine acid, tetracosapentaenoic acid, docosahexaenoic acid, nisinic acid, and salts thereof.

In particular, at least one selected from the group consisting of lauric acid, undecanoic acid, capric acid, myristic acid, pentadecylic acid, palmitic acid, and salts thereof is preferred, lauric acid and a salt thereof are more preferred, a salt of lauric acid is particularly preferred, and sodium laurate or ammonium laurate is most preferred.

Examples of the salts include, but are not limited to, those in which hydrogen of the carboxyl group is a metal atom, $NR^{101}_4$, imidazolium optionally having a substituent, pyridinium optionally having a substituent, or phosphonium optionally having a substituent as M in the formula described above.

Examples of the anionic hydrocarbon surfactant also include a hydrocarbon surfactant having one or more carbonyl groups which are not in a carboxyl group.

Examples of the hydrocarbon surfactant having one or more carbonyl groups which are not in a carboxyl group include a surfactant represented by the formula:

$R^X—X^X$ wherein $R^X$ is a fluorine-free organic group having one or more carbonyl groups which are not in a carboxyl group and having 1 to 2,000 carbon atoms, $X^X$ is $—OSO_3X^{X1}$, $—COOX^{X1}$, or $—SO_3X^{X1}$, wherein $X^{X1}$ is H, a metal atom, $NR^{X1}_4$, imidazolium optionally having a substituent, pyridinium optionally having a substituent, or phosphonium optionally having a substituent, wherein $R^{X1}$ is H or an organic group and may be the same or different. $R^X$ preferably has 500 or less carbon atoms, more preferably 100 or less, still more preferably 50 or less, and further preferably 30 or less. The organic group for $R^{X1}$ is preferably an alkyl group. $R^{X1}$ is preferably H or an organic group having 1 to 10 carbon atoms, more preferably H or an organic group having 1 to 4 carbon atoms, and still more preferably H or an alkyl group having 1 to 4 carbon atoms.

The specific hydrocarbon surfactant is preferably at least one selected from the group consisting of a surfactant (α) represented by the following formula (α):

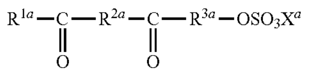

wherein $R^{1a}$ is a linear or branched alkyl group having 1 or more carbon atoms or a cyclic alkyl group having 3 or more carbon atoms, with a hydrogen atom bonded to a carbon atom therein being optionally replaced with a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; $R^{2a}$ and $R^{3a}$ are each independently a single bond or a divalent linking group; the total number of carbon atoms of $R^{1a}$, $R^{2a}$, and $R^{3a}$ is 6 or more; $X^a$ is H, a metal atom, $NR^{4a}_4$, imidazolium optionally having a substituent, pyridinium optionally having a substituent, or phosphonium optionally having a substituent, wherein $R^{4a}$ is H or an organic group and may be the same or different; and any two of $R^{1a}$, $R^{2a}$, and $R^{3a}$ optionally bind to each other to form a ring;

a surfactant (b) represented by the following formula (b):

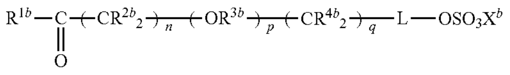

wherein $R^{1b}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; $R^{2b}$ and $R^{4b}$ are each independently H or a substituent; $R^{3b}$ is an alkylene group having 1 to 10 carbon atoms and optionally having a substituent; n is an integer of 1 or more; p and q are each independently an integer of 0 or more; $X^b$ is H, a metal atom, $NR^{5b}_4$, imidazolium optionally having a substituent, pyridinium optionally having a substituent, or phosphonium optionally having a substituent, wherein $R^{5b}$ is H or an organic group and may be the same or different; any two of $R^{1b}$, $R^{2b}$, $R^{3b}$, and $R^{4b}$ optionally bind to each other to form a ring; L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^6CO$—B—, wherein B is a single bond or an alkylene group having 1 to 10 carbon atoms and optionally having a substituent, $R^{6b}$ is H or an alkyl group having 1 to 4 carbon atoms and optionally having a substituent; and * indicates the side bonded to —$OSO_3X^b$ in the formula;

a surfactant (c) presented by the following formula (c):

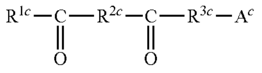

wherein $R^{1c}$ is a linear or branched alkyl group having 1 or more carbon atoms or a cyclic alkyl group having 3 or more carbon atoms, with a hydrogen atom bonded to a carbon atom therein being optionally replaced with a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; $R^{2c}$ and $R^{3c}$ are each independently a single bond or a divalent linking group; the total number of carbon atoms of $R^{1c}$, $R^{2c}$, and $R^{3c}$ is 5 or more; $A^c$ is —$COOX^c$ or —$SO_3X^c$, wherein $X^c$ is H, a metal atom, $NR^{4c}_4$, imidazolium optionally having a substituent, pyridinium optionally having a substituent, or phosphonium optionally having a substituent, wherein $R^{4c}$ is H or an organic group and may be the same or different; and any two of $R^{1c}$, $R^{2c}$, and $R^{3c}$ optionally bind to each other to form a ring; and a surfactant (d) represented by the following formula (d):

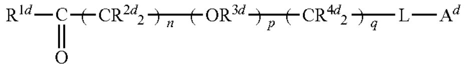

wherein $R^{1d}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; $R^{2d}$ and $R^{4d}$ are each independently H or a substituent; $R^{3d}$ is an alkylene group having 1 to 10 carbon atoms and optionally having a substituent; n is an integer of 1 or more; p and q are each independently an integer of 0 or more; $A^d$ is —$SO_3X^d$ or —$COOX^d$, wherein $X^d$ is H, a metal atom, $NR^{5d}_4$, imidazolium optionally having a substituent, pyridinium optionally having a substituent, or phosphonium optionally having a substituent, wherein $R^{5d}$ is H or an organic group and may be the same or different; any two of $R^{1d}$, $R^{2d}$, $R^{3d}$, and $R^{4d}$ optionally bind to each other to form a ring; L is a single bond, —$CO_2$—B—*, —OCO—B—*, —$CONR^6$d-B—*, —$NR^{6d}CO$—B—*, or —CO— other than the carbonyl groups in —$CO_2$—B—, —OCO—B—, —$CONR^{6d}$—B—, and —$NR^{6d}CO$—B—, wherein B is a single bond or an alkylene group having 1 to 10 carbon atoms and optionally having a substituent, $R^{6d}$ is H or an alkyl group having 1 to 4 carbon atoms and optionally having a substituent; and * indicates the side bonded to $A^d$ in the formula.

The surfactant (α) is described below.

In the formula (α), $R^{1a}$ is a linear or branched alkyl group having 1 or more carbon atoms or a cyclic alkyl group having 3 or more carbon atoms.

When having 3 or more carbon atoms, the alkyl group optionally contains a carbonyl group (—C(═O)—) between two carbon atoms. When having 2 or more carbon atoms, the alkyl group optionally contains the carbonyl group at an end of the alkyl group. In other words, acyl groups such as an acetyl group represented by $CH_3$—C(═O)— are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1a}$, a divalent heterocycle may be present between two carbon atoms, or a divalent heterocycle may be present at an end and bind to —C(═O)—, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by $CH_3$—C(═O)—$CH_2$— is 3, the number of carbon atoms in the group represented by $CH_3$—C(═O)—$C_2H_4$—C(═O)—$C_2H_4$— is 7, and the number of carbon atoms in the group represented by $CH_3$—C(═O)— is 2.

In the alkyl group, a hydrogen atom bonded to a carbon atom may be replaced with a functional group such as a hydroxy group (—OH) or a monovalent organic group containing an ester bond. Still, it is preferably not replaced with any functional group.

An example of the monovalent organic group containing an ester bond is a group represented by the formula: —O—C(═O)—$R^{101a}$, wherein $R^{101a}$ is an alkyl group.

In the alkyl group, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

In the formula, $R^{2a}$ and $R^{3a}$ are each independently a single bond or a divalent linking group.

Preferably, $R^{2a}$ and $R^{3a}$ are each independently a single bond, a linear or branched alkylene group having 1 or more carbon atoms, or a cyclic alkylene group having 3 or more carbon atoms.

The alkylene group constituting $R^{2a}$ and $R^{3a}$ is preferably free from a carbonyl group.

In the alkylene group, a hydrogen atom bonded to a carbon atom may be replaced with a functional group such as a hydroxy group (—OH) or a monovalent organic group containing an ester bond. Still, it is preferably not replaced with any functional group.

An example of the monovalent organic group containing an ester bond is a group represented by the formula: —O—C(═O)—$R^{102a}$, wherein $R^{102a}$ is an alkyl group.

In the alkylene group, 75% or less of the hydrogen atoms bonded to the carbon atoms may be replaced with halogen atoms, 50% or less thereof may be replaced with halogen atoms, or 25% or less thereof may be replaced with halogen atoms. The alkylene group is preferably a non-halogenated alkylene group free from halogen atoms such as fluorine atoms and chlorine atoms.

The total number of carbon atoms of $R^{1a}$, $R^{2a}$, and $R^{3a}$ is 6 or more. The total number of carbon atoms is preferably 8 or more, more preferably 9 or more, still more preferably 10 or more, and preferably 20 or less, more preferably 18 or less, still more preferably 15 or less.

Any two of $R^{1a}$, $R^{2a}$, and $R^{3a}$ optionally bind to each other to form a ring.

In the formula (α), $X^a$ is H, a metal atom, $NR^{4a}_4$, imidazolium optionally having a substituent, pyridinium optionally having a substituent, or phosphonium optionally having a substituent, wherein $R^{4a}$ is H or an organic group. The four $R^{4a}$ may be the same as or different from each other. The organic group in $R^{4a}$ is preferably an alkyl group. $R^{4a}$ is preferably H or an organic group having 1 to 10 carbon atoms, more preferably H or an organic group having 1 to 4 carbon atoms, and still more preferably H or an alkyl group having 1 to 4 carbon atoms. Examples of the metal atom include monovalent and divalent metal atoms, and examples thereof include alkali metals (Group 1) and alkaline earth metals (Group 2), and preferred is Na, K or Li.

$X^a$ is preferably H, an alkali metal (Group 1), an alkaline earth metal (Group 2), or $NR^{4a}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^a$ is $NH_4$, the solubility of the surfactant in an aqueous medium is excellent, and the metal component is unlikely to remain in the PTFE or the final product.

$R^{1a}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

$R^{1a}$ is more preferably a group represented by the following formula:

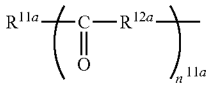

wherein $n^{11a}$ is an integer of 0 to 10; $R^{11a}$ is a linear or branched alkyl group having 1 to 5 carbon atoms or a cyclic alkyl group having 3 to 5 carbon atoms; $R^{12a}$ is an alkylene group having 0 to 3 carbon atoms; and when $n^{11a}$ is an integer of 2 to 10, each $R^{12a}$ may be the same or different.

In the formula, $n^{11a}$ is preferably an integer of 0 to 5, more preferably an integer of 0 to 3, and still more preferably an integer of 1 to 3.

The alkyl group for $R^{11a}$ is preferably free from a carbonyl group.

In the alkyl group for $R^{11a}$, a hydrogen atom bonded to a carbon atom may be replaced with a functional group such as a hydroxy group (—OH) or a monovalent organic group containing an ester bond. Still, it is preferably not replaced with any functional group.

An example of the monovalent organic group containing an ester bond is a group represented by the formula: —O—C(═O)—$R^{103a}$, wherein $R^{103a}$ is an alkyl group.

In the alkyl group for $R^{11c}$, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

$R^{12a}$ is an alkylene group having 0 to 3 carbon atoms. The alkylene group preferably has 1 to 3 carbon atoms.

The alkylene group for $R^{12a}$ may be either linear or branched.

The alkylene group for $R^{12a}$ is preferably free from a carbonyl group. $R^{12a}$ is more preferably an ethylene group (—$C_2H_4$—) or a propylene group (—$C_3H_6$—).

In the alkylene group for $R^{12a}$, a hydrogen atom bonded to a carbon atom may be replaced with a functional group such as a hydroxy group (—OH) or a monovalent organic group containing an ester bond. Still, it is preferably not replaced with any functional group.

Examples of the monovalent organic group containing an ester bond include a group represented by the formula:

—O—C(═O)—$R^{104a}$ wherein $R^{104a}$ is an alkyl group.

In the alkylene group for $R^{12a}$, 75% or less of the hydrogen atoms bonded to the carbon atoms may be replaced with halogen atoms, 50% or less thereof may be replaced with halogen atoms, or 25% or less thereof may be replaced with halogen atoms. The alkylene group is preferably a non-halogenated alkylene group free from halogen atoms such as fluorine atoms and chlorine atoms.

$R^{2a}$ and $R^{3a}$ are preferably each independently an alkylene group having 1 or more carbon atoms and free from a carbonyl group, more preferably an alkylene group having 1 to 3 carbon atoms and free from a carbonyl group, and still more preferably an ethylene group (—$C_2H_4$—) or a propylene group (—$C_3H_6$—).

Examples of the surfactant (α) include the following surfactants. In each formula, $X^a$ is defined as described above.

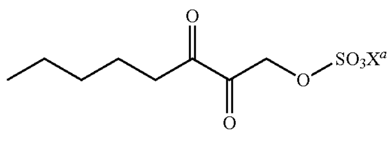

-continued
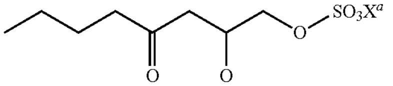
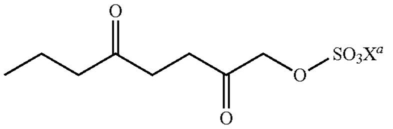
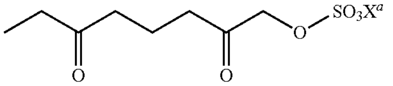
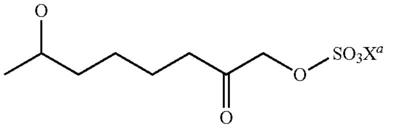
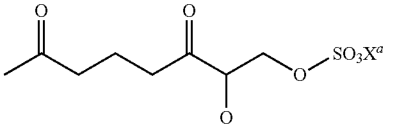
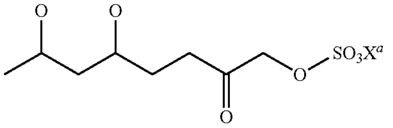
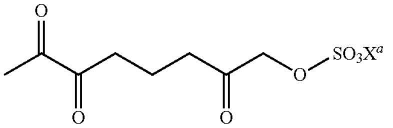
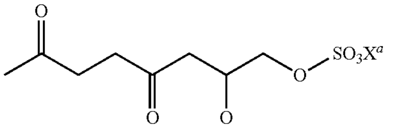
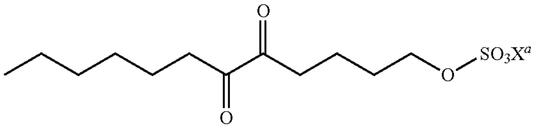
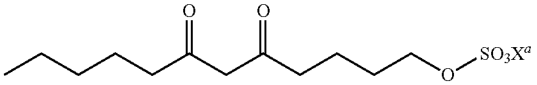
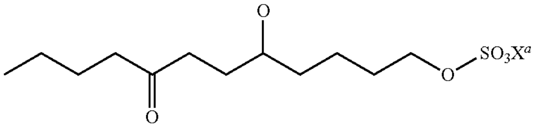
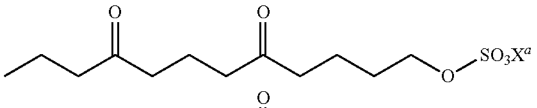
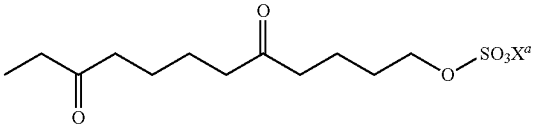
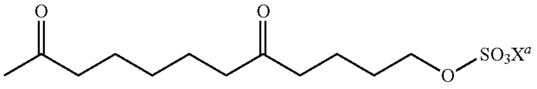
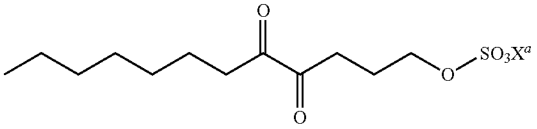
-continued
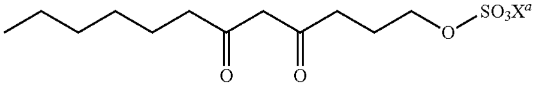
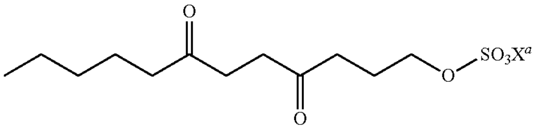
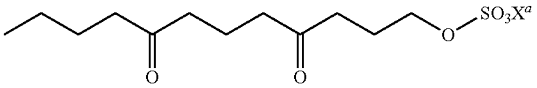
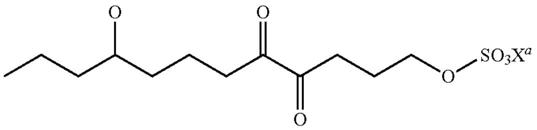
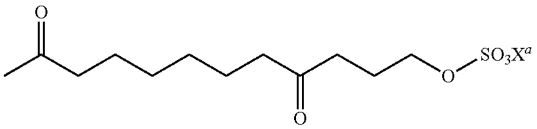
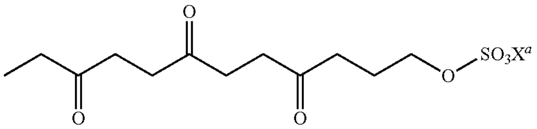
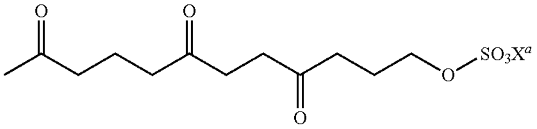
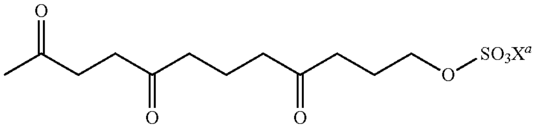
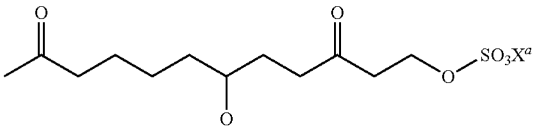
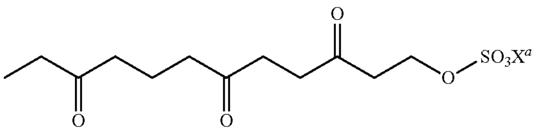
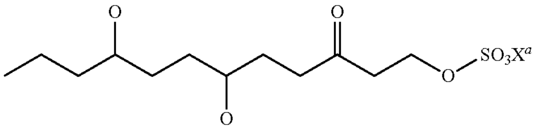
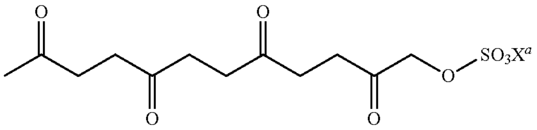
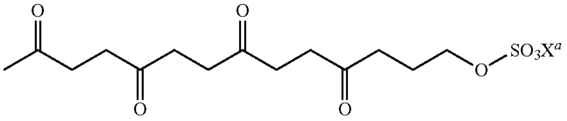
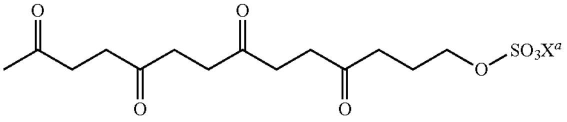

-continued
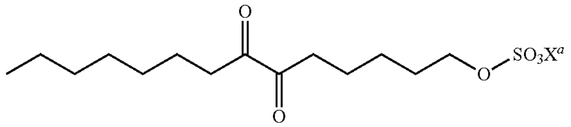
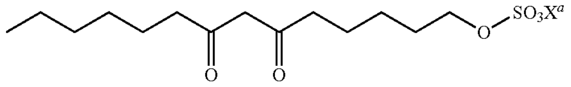
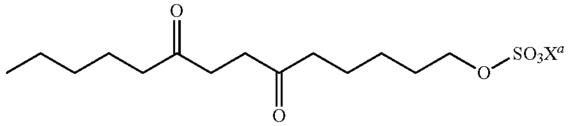
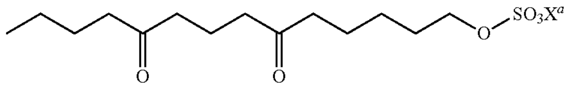
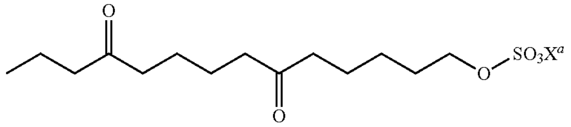
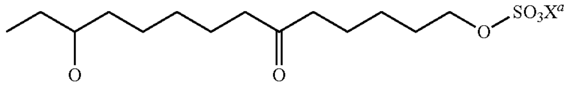
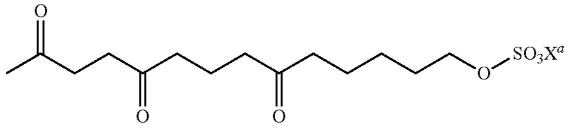
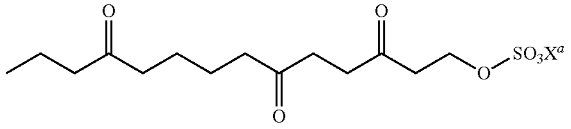
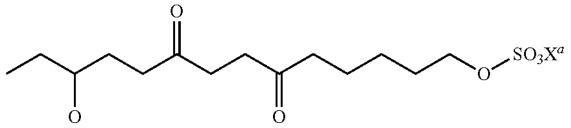
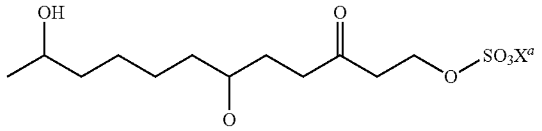
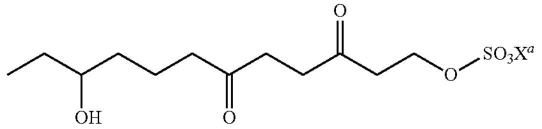
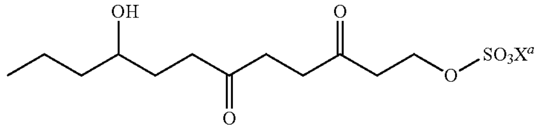
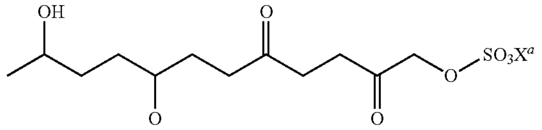
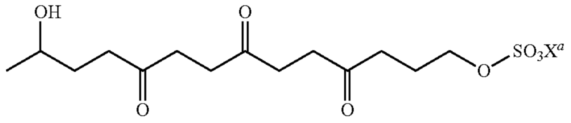
-continued
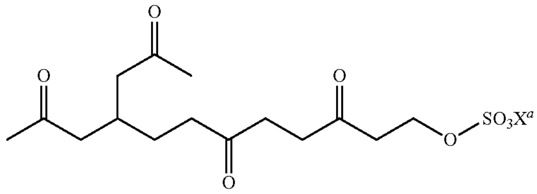
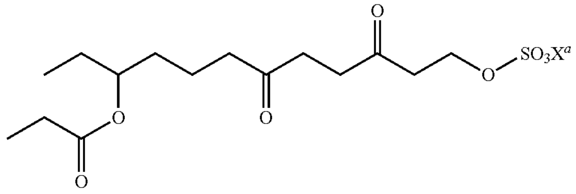
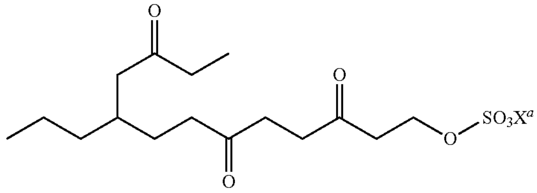
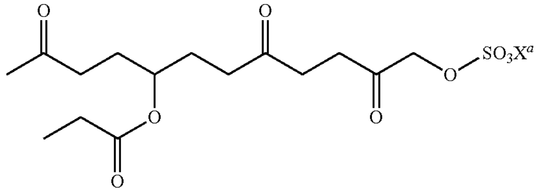
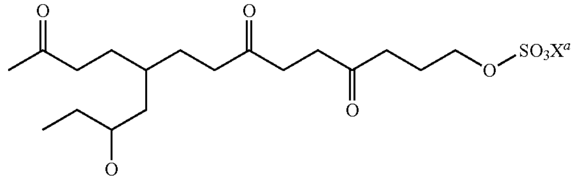
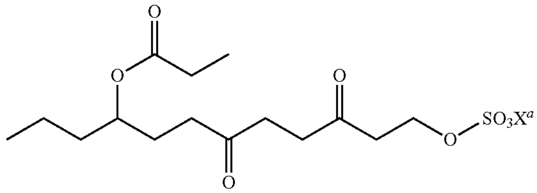
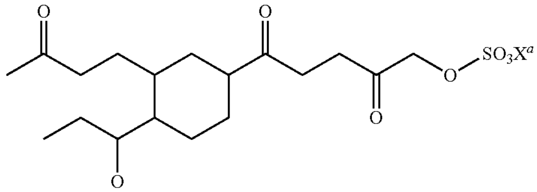
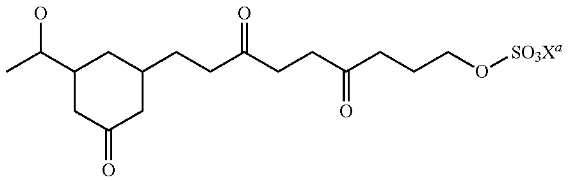
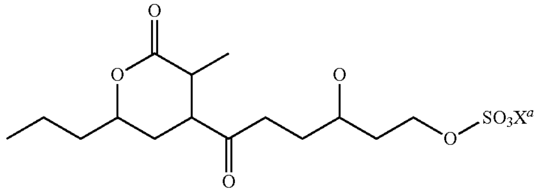

-continued

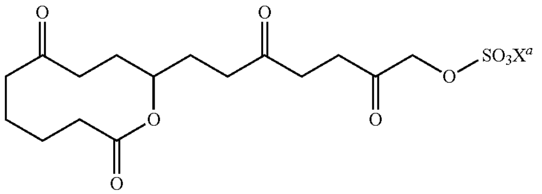

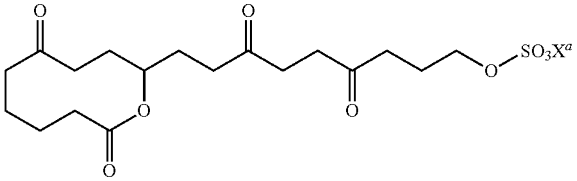

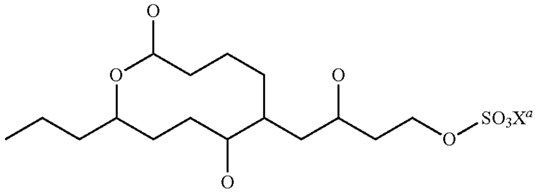

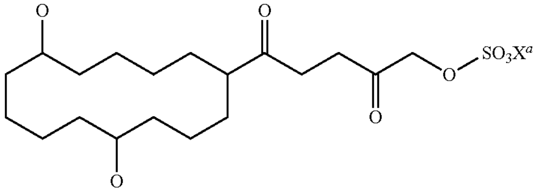

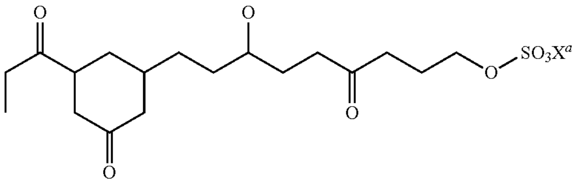

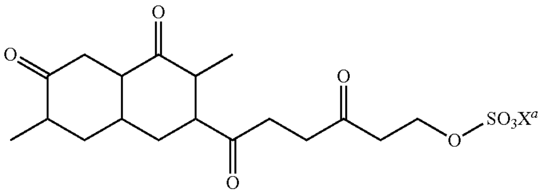

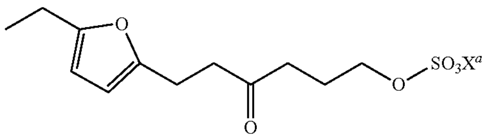

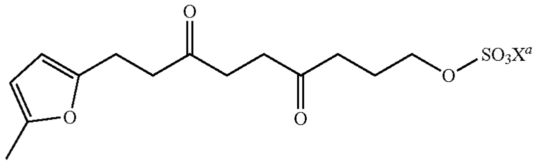

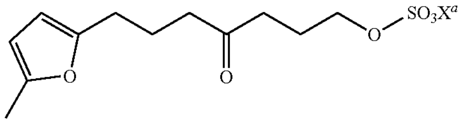

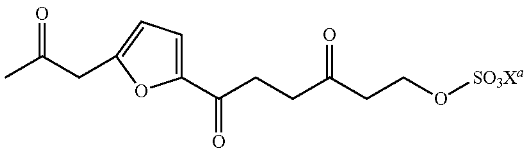

-continued

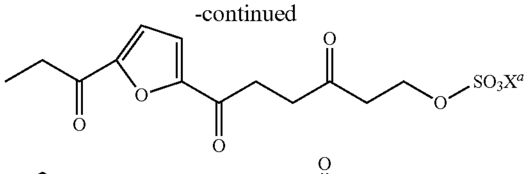

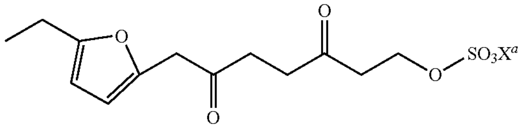

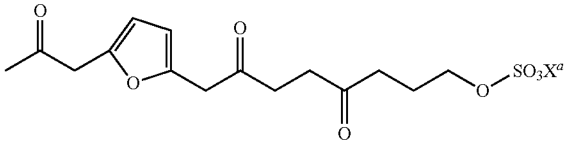

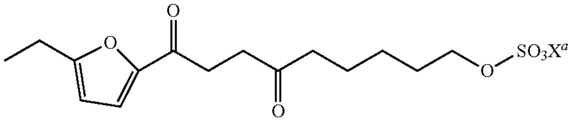

Next, the surfactant (b) will be described below.

In the formula (b), $R^{1b}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1b}$, a divalent heterocycle may be present between two carbon atoms, or a divalent heterocycle may be present at an end and bind to —C(═O)—, or a monovalent heterocycle may be present at an end of the alkyl group.

The "number of carbon atoms" in the alkyl group as used herein includes the number of carbon atoms constituting the heterocycles.

The substituent which may be contained in the alkyl group for $R^{1b}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^{1b}$ is preferably free from a carbonyl group.

In the alkyl group, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

The alkyl group preferably does not have any substituent.

$R^{1b}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group ($—CH_3$) or an ethyl group ($—C_2H_5$), and most preferably a methyl group ($—CH_3$).

In the formula (b), $R^{2b}$ and $R^{4b}$ are each independently H or a substituent. A plurality of $R^{2b}$ and $R^{4b}$ may be the same or different.

The substituent for each of $R^{2b}$ and $R^{4b}$ is preferably a halogen atom, a linear or branched alkyl group having 1 to 10 carbon atoms, a cyclic alkyl group having 3 to 10 carbon atoms, or a hydroxy group, and particularly preferably a methyl group or an ethyl group.

The alkyl group for each of $R^{2b}$ and $R^{4b}$ is preferably free from a carbonyl group. In the alkyl group, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

The alkyl group preferably does not have any substituent.

The alkyl group for each of $R^{2b}$ and $R^{4b}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group ($—CH_3$) or an ethyl group ($—C_2H_5$).

$R^{2b}$ and $R^{4b}$ are preferably each independently H or a linear or branched alkyl group having 1 to 10 carbon atoms and free from a carbonyl group, more preferably H or a linear or branched alkyl group having 1 to 3 carbon atoms and not having a substituent, further preferably H, a methyl group ($—CH_3$), or an ethyl group ($—C_2H_5$), and particularly preferably H.

In the formula (b), $R^{3b}$ is an alkylene group having 1 to 10 carbon atoms and optionally having a substituent. When a plurality of $R^{3b}$ are present, they may be the same or different.

The alkylene group is preferably free from a carbonyl group.

In the alkylene group, 75% or less of the hydrogen atoms bonded to the carbon atoms may be replaced with halogen atoms, 50% or less thereof may be replaced with halogen atoms, or 25% or less thereof may be replaced with halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group ($—CH_2—$), an ethylene group ($—C_2H_4—$), an isopropylene group ($—CH(CH_3)CH_2—$), or a propylene group ($—C_3H_6—$).

Any two of $R^{1b}$, $R^{2b}$, $R^{3b}$, and $R^{4b}$ optionally bind to each other to form a ring, but preferably do not form a ring.

In the formula (b), n is an integer of 1 or more. In the formula, n is preferably an integer of 1 to 40, more preferably an integer of 1 to 30, still more preferably an integer of 5 to 25, and particularly preferably an integer of 5 to 9 and 11 to 25.

In the formula (b), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 5 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (b), $X^b$ is H, a metal atom, $NR^{5b}_4$, imidazolium optionally having a substituent, pyridinium optionally having a substituent, or phosphonium optionally having a substituent, wherein $R^{5b}$ is H or an organic group. The four $R^{5b}$ may be the same as or different from each other. The organic group in $R^{5b}$ is preferably an alkyl group. $R^{5b}$ is preferably H or an organic group having 1 to 10 carbon atoms, more preferably H or an organic group having 1 to 4 carbon atoms, and still more preferably H or an alkyl group having 1 to 4 carbon atoms. Examples of the metal atom include monovalent and divalent metal atoms, and examples thereof include alkali metals (Group 1) and alkaline earth metals (Group 2), and preferred is Na, K or Li. $X^b$ may be a metal atom or $NR^{5b}_4$, wherein $R^{5b}$ is defined as described above.

$X^b$ is preferably H, an alkali metal (Group 1), an alkaline earth metal (Group 2), or $NR^{5b}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^b$ is $NH_4$, the solubility of the surfactant in an aqueous medium is excellent, and the metal component is unlikely to remain in the PTFE or the final product.

In the formula (b), L is a single bond, $—CO_2—B—*$, $—OCO—B—*$, $—CONR^{6b}—B—*$, $—NR^{6b}CO—B—*$, or $—CO—$ other than the carbonyl groups in $—CO_2—B—$, $—OCO—B—$, $—CONR^{6b}—B—$, and $—NR^{6}CO—B—$, wherein B is a single bond or an alkylene group having 1 to 10 carbon atoms and optionally having a substituent, $R^{6b}$ is H or an alkyl group having 1 to 4 carbon atoms and optionally having a substituent. The alkylene group more preferably has 1 to 5 carbon atoms. $R^{6d}$ is more preferably H or a methyl group. * indicates the side bonded to $—OSO_3X^b$ in the formula.

L is preferably a single bond.

The surfactant (b) is preferably a compound represented by the following formula:

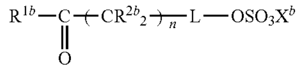

wherein $R^{1b}$, $R^{2b}$, L, n, and $X^b$ are defined as described above.

The surfactant (b) preferably has a 1H-NMR spectrum in which all peak intensities observed in a chemical shift range of 2.0 to 5.0 ppm give an integral value of 10% or more.

The surfactant (b) preferably has a 1H-NMR spectrum in which all peak intensities observed in a chemical shift range of 2.0 to 5.0 ppm give an integral value within the above range. In this case, the surfactant preferably has a ketone structure in the molecule.

The integral value of the surfactant (b) is more preferably 15 or more, and preferably 95 or less, more preferably 80 or less, and still more preferably 70 or less.

The integral value is determined using a heavy water solvent at room temperature. The heavy water content is adjusted to 4.79 ppm.

Examples of the surfactant (b) include: $CH_3C(O)CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2OSO_3Na$, $CH_3C(O)CH_2CH_2CH_2CH_2CH_2CH_2CH_2OSO_3Na$, $CH_3C(O)CH_2CH_2CH_2CH_2CH_2CH_2OSO_3Na$, $CH_3C(O)CH_2CH_2CH_2CH_2CH_2OSO_3Na$, $CH_3C(O)CH_2CH_2CH_2CH_2OSO_3Na$, $(CH_3)_3CC(O)CH_2CH_2CH_2CH_2CH_2CH_2CH_2CH_2CH_2CH_2OSO_3Na$, $(CH_3)_2CHC(O)CH_2CH_2CH_2CH_2CH_2CH_2CH_2CH_2CH_2CH_2OSO_3Na$, $(CH_2)_5CHC(O)CH_2CH_2CH_2CH_2CH_2CH_2CH_2CH_2CH_2CH_2OSO_3Na$, $CH_3CH_2C(O)CH_2CH_2CH_2CH_2CH_2CH_2CH_2CH_2OSO_3Na$, $CH_3CH_2CH_2C(O)CH_2CH_2CH_2CH_2CH_2CH_2CH_2OSO_3Na$, $CH_3CH_2CH_2CH_2C(O)CH_2CH_2CH_2CH_2CH_2CH_2OSO_3Na$, $CH_3CH_2CH_2CH_2CH_2C(O)CH_2CH_2CH_2CH_2CH_2OSO_3Na$, $CH_3CH_2CH_2CH_2CH_2CH_2C(O)CH_2CH_2CH_2CH_2OSO_3Na$, $CH_3CH_2CH_2CH_2CH_2CH_2CH_2C(O)CH_2CH_2CH_2OSO_3Na$, $CH_3CH_2CH_2CH_2CH_2CH_2CH_2CH_2C(O)CH_2CH_2OSO_3Na$, $CH_3CH_2CH_2CH_2CH_2CH_2CH_2CH_2CH_2C(O)CH_2OSO_3Na$, $CH_3C(O)CH_2CH_2CH_2CH_2CH_2CH_2CH_2CH_2CH_2OCH_2CH_2OSO_3Na$, $CH_3C(O)CH_2CH_2CH_2CH_2CH_2CH_2CH_2CH_2CH_2C(O)NHCH_2OSO_3Na$, $CH_3C(O)CH_2CH_2CH_2CH_2CH_2CH_2CH_2CH_2CH_2NHC(O)CH_2OSO_3Na$, $CH_3C(O)CH_2CH_2CH_2CH_2CH_2CH_2CH_2CH_2CH_2C(O)OSO_3Na$, $CH_3C(O)CH_2CH_2CH_2CH_2CH_2CH_2CH_2CH_2CH_2C(O)OCH_2OSO_3Na$, $CH_3C(O)CH_2CH_2CH_2CH_2CH_2CH_2CH_2CH_2CH_2OC(O)CH_2OSO_3Na$, $CH_3C(O)CH_2CH_2CH_2CH_2CH_2CH_2CH_2CH_2CH_2OSO_3H$, $CH_3C(O)CH_2CH_2CH_2CH_2CH_2CH_2CH_2CH_2CH_2OSO_3Li$, $CH_3C(O)CH_2CH_2CH_2CH_2CH_2CH_2CH_2CH_2CH_2OSO_3K$, $CH_3C(O)CH_2CH_2CH_2CH_2CH_2CH_2CH_2CH_2CH_2OSO_3NH_4$, $CH_3C(O)CH_2CH_2CH_2CH_2CH_2CH_2CH_2CH_2CH(CH_3)_2OSO_3Na$, $CH_3C(O)CH_2CH_2CH_2CH_2CH_2CH_2CH_2CH_2CH_2CH_2CH_2CH_2CH_2CH_2CH_2CH_2CH_2CH_2OSO_3N$ a, $CH_3C(O)CH_2CH_2CH_2CH_2CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2OSO_3Na$, $(CH_3)_3CC(O)CH_2CH_2CH_2CH_2CH_2CH_2CH_2CH_2CH_2CH_2CH_2CH_2CH_2CH_2CH_2CH_2CH_2O$ $SO_3Na$, $(CH_3)_2CHC(O)CH_2CH_2CH_2CH_2CH_2CH_2CH_2CH_2CH_2CH_2CH_2CH_2CH_2CH_2CH_2CH_2CH_2$ $OSO_3Na$, $(CH_2)_5CHC(O)CH_2CH_2CH_2CH_2CH_2CH_2CH_2CH_2CH_2CH_2CH_2CH_2CH_2CH_2CH_2CH_2CH_2$ $OSO_3Na$, $CH_3CH_2C(O)CH_2CH_2CH_2CH_2CH_2CH_2CH_2CH_2CH_2CH_2CH_2CH_2CH_2CH_2CH_2CH_2OSO_3N$ a, $CH_3CH_2CH_2CH_2CH_2C(O)CH_2CH_2CH_2CH_2CH_2CH_2CH_2CH_2CH_2CH_2CH_2CH_2CH_2OSO_3N$ a, $CH_3CH_2CH_2CH_2CH_2CH_2CH_2CH_2C(O)CH_2CH_2CH_2CH_2CH_2CH_2CH_2CH_2CH_2CH_2OSO_3N$ a, $CH_3CH_2CH_2CH_2CH_2CH_2CH_2CH_2CH_2CH_2CH_2C(O)CH_2CH_2CH_2CH_2CH_2CH_2CH_2OSO_3N$ a, $CH_3CH_2CH_2CH_2CH_2CH_2CH_2CH_2CH_2CH_2CH_2CH_2CH_2CH_2C(O)CH_2CH_2CH_2CH_2OSO_3N$ a, $CH_3CH_2C(O)CH_2CH_2CH_2CH_2CH_2CH_2CH_2CH_2CH_2CH_2CH_2CH_2CH_2CH_2CH_2CH_2OCH_2C$ $H_2OSO_3Na$, $CH_3CH_2C(O)CH_2CH_2CH_2CH_2CH_2CH_2CH_2CH_2CH_2CH_2CH_2CH_2CH_2CH_2CH_2CH_2C(O)$ N $HCH_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2CH_2NHC(O)$ $CH_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2C(O)O$ $CH_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2OC(O)$ $CH_2CH_2OSO_3Na$, $CH_3CH_2C(O)CH_2CH_2CH_2CH_2CH_2CH_2CH_2CH_2CH_2CH_2CH_2CH_2CH_2CH_2CH_2CH_2C(O)O$ $SO_3Na$, $CH_3CH_2C(O)CH_2CH_2CH_2CH_2CH_2CH_2CH_2CH_2CH_2CH_2CH_2CH_2CH_2CH_2CH_2CH_2OSO_3H$, $CH_3CH_2C(O)CH_2CH_2CH_2CH_2CH_2CH_2CH_2CH_2CH_2CH_2CH_2CH_2CH_2CH_2CH_2CH_2OSO_3Li$, $CH_3CH_2C(O)CH_2CH_2CH_2CH_2CH_2CH_2CH_2CH_2CH_2CH_2CH_2CH_2CH_2CH_2CH_2CH_2$ $OSO_3K$, $CH_3CH_2C(O)CH_2CH_2CH_2CH_2CH_2CH_2CH_2CH_2CH_2CH_2CH_2CH_2CH_2CH_2CH_2CH_2$ $OSO_3NH_4$, and $CH_3C(O)CH_2CH_2CH_2CH_2CH_2CH_2CH_2CH_2CH_2CH_2CH_2CH_2CH_2CH_2CH_2CH_2CH_2$ $CH_2CH_2CH_2CH_2OSO_3Na$.

The surfactant (c) will be described.

In the formula (c), $R^{1c}$ is a linear or branched alkyl group having 1 or more carbon atoms or a cyclic alkyl group having 3 or more carbon atoms.

When having 3 or more carbon atoms, the alkyl group optionally contains a carbonyl group (—C(═O)—) between two carbon atoms. When having 2 or more carbon atoms, the alkyl group optionally contains the carbonyl group at an end of the alkyl group. In other words, acyl groups such as an acetyl group represented by $CH_3$—C(═O)— are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1c}$, a divalent heterocycle may be present between two carbon atoms, or a divalent heterocycle may be present at an end and bind to —C(═O)—, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by $CH_3$—C(═O)—$CH_2$— is 3, the number of carbon atoms in the group represented by $CH_3$—C(═O)—$C_2H_4$—C(═O)—$C_2H_4$— is 7, and the number of carbon atoms in the group represented by $CH_3$—C(═O)— is 2.

In the alkyl group, a hydrogen atom bonded to a carbon atom may be replaced with a functional group such as a hydroxy group (—OH) or a monovalent organic group containing an ester bond. Still, it is preferably not replaced with any functional group.

An example of the monovalent organic group containing an ester bond is a group represented by the formula: —O—C(═O)—$R^{101c}$, wherein $R^{101c}$ is an alkyl group.

In the alkyl group, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

In the formula (c), $R^{2c}$ and $R^{3c}$ are each independently a single bond or a divalent linking group.

Preferably, $R^{2c}$ and $R^{3c}$ are each independently a single bond, a linear or branched alkylene group having 1 or more carbon atoms, or a cyclic alkylene group having 3 or more carbon atoms.

The alkylene group constituting $R^{2c}$ and $R^{3c}$ is preferably free from a carbonyl group.

In the alkylene group, a hydrogen atom bonded to a carbon atom may be replaced with a functional group such as a hydroxy group (—OH) or a monovalent organic group containing an ester bond. Still, it is preferably not replaced with any functional group.

An example of the monovalent organic group containing an ester bond is a group represented by the formula: —O—C(═O)—$R^{102c}$, wherein $R^{102c}$ is an alkyl group.

In the alkylene group, 75% or less of the hydrogen atoms bonded to the carbon atoms may be replaced with halogen atoms, 50% or less thereof may be replaced with halogen atoms, or 25% or less thereof may be replaced with halogen atoms. The alkylene group is preferably a non-halogenated alkylene group free from halogen atoms such as fluorine atoms and chlorine atoms.

The total number of carbon atoms of $R^{1c}$, $R^{2c}$, and $R^{3c}$ is 5 or more. The total number of carbon atoms is preferably 7 or more, more preferably 9 or more, and preferably 20 or less, more preferably 18 or less, still more preferably 15 or less.

Any two of $R^{1c}$, $R^{2c}$, and $R^{3c}$ optionally bind to each other to form a ring.

In the formula (c), $A^c$ is —$COOX^c$ or —$SO_3X^c$, wherein $X^c$ is H, a metal atom, $NR^{4c}{}_4$, imidazolium optionally having a substituent, pyridinium optionally having a substituent, or phosphonium optionally having a substituent, wherein $R^{4c}$ is H or an organic group and may be the same or different. The organic group in $R^{4c}$ is preferably an alkyl group. $R^{4c}$ is preferably H or an organic group having 1 to 10 carbon atoms, more preferably H or an organic group having 1 to 4 carbon atoms, and still more preferably H or an alkyl group having 1 to 4 carbon atoms. Examples of the metal atom include monovalent and divalent metal atoms, and examples thereof include alkali metals (Group 1) and alkaline earth metals (Group 2), and preferred is Na, K or Li.

$X^a$ is preferably H, an alkali metal (Group 1), an alkaline earth metal (Group 2), or $NR^{4c}{}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When X° is $NH_4$, the solubility of the surfactant in an aqueous medium is excellent, and the metal component is unlikely to remain in the PTFE or the final product.

$R^{1c}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

$R^{1c}$ is more preferably a group represented by the following formula:

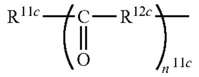

wherein $n^{11c}$ is an integer of 0 to 10; $R^{11c}$ is a linear or branched alkyl group having 1 to 5 carbon atoms or a cyclic alkyl group having 3 to 5 carbon atoms; $R^{12c}$ is an alkylene group having 0 to 3 carbon atoms; and when $n^{11c}$ is an integer of 2 to 10, each $R^{12c}$ may be the same or different.

In the formula, $n^{11c}$ is preferably an integer of 0 to 5, more preferably an integer of 0 to 3, and still more preferably an integer of 1 to 3.

The alkyl group for $R^{11c}$ is preferably free from a carbonyl group.

In the alkyl group for $R^{11c}$, a hydrogen atom bonded to a carbon atom may be replaced with a functional group such as a hydroxy group (—OH) or a monovalent organic group containing an ester bond. Still, it is preferably not replaced with any functional group.

An example of the monovalent organic group containing an ester bond is a group represented by the formula: —O—C(═O)—$R^{103c}$, wherein $R^{103c}$ is an alkyl group.

In the alkyl group for $R^{11c}$, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

$R^{12c}$ is an alkylene group having 0 to 3 carbon atoms. The alkylene group preferably has 1 to 3 carbon atoms.

The alkylene group for $R^{12c}$ may be either linear or branched.

The alkylene group for $R^{12c}$ is preferably free from a carbonyl group. $R^{12c}$ is more preferably an ethylene group (—$C_2H_4$—) or a propylene group (—$C_3H_6$—).

In the alkylene group for $R^{12c}$, a hydrogen atom bonded to a carbon atom may be replaced with a functional group such as a hydroxy group (—OH) or a monovalent organic group containing an ester bond. Still, it is preferably not replaced with any functional group.

An example of the monovalent organic group containing an ester bond is a group represented by the formula: —O—C(═O)—$R^{104c}$, wherein $R^{104c}$ is an alkyl group.

In the alkylene group for $R^{12c}$, 75% or less of the hydrogen atoms bonded to the carbon atoms may be replaced with halogen atoms, 50% or less thereof may be replaced with halogen atoms, or 25% or less thereof may be replaced with halogen atoms. The alkylene group is preferably a non-halogenated alkylene group free from halogen atoms such as fluorine atoms and chlorine atoms.

$R^{2c}$ and $R^{3c}$ are preferably each independently an alkylene group having 1 or more carbon atoms and free from a carbonyl group, more preferably an alkylene group having 1 to 3 carbon atoms and free from a carbonyl group, and still more preferably an ethylene group (—$C_2H_4$—) or a propylene group (—$C_3H_6$—).

Examples of the surfactant (c) include the following surfactants. In each formula, $A^c$ is defined as described above.
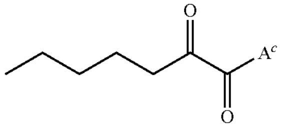
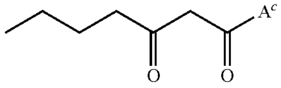
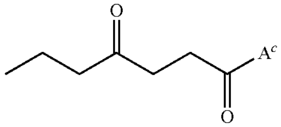
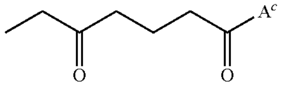
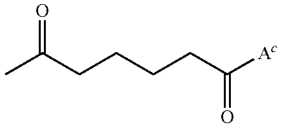
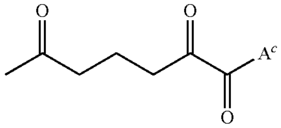
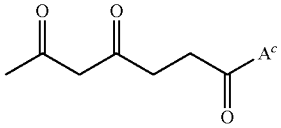
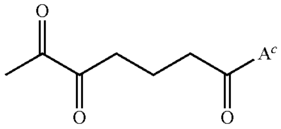
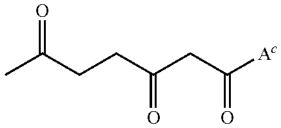
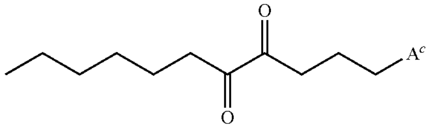
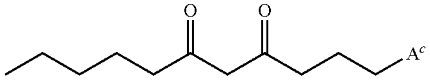
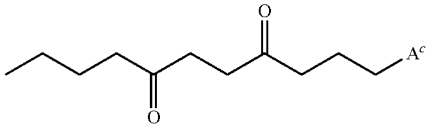
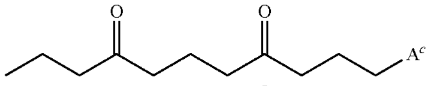
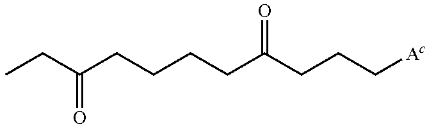
-continued
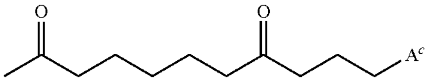
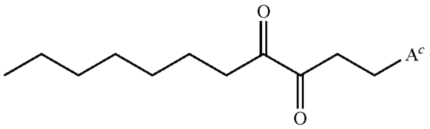
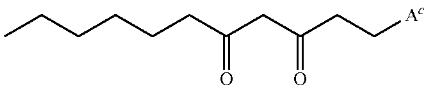
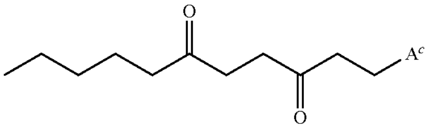
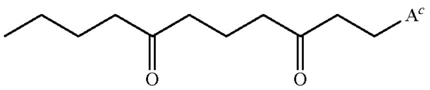
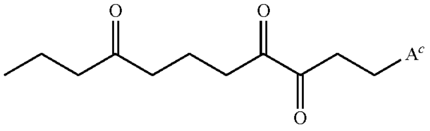
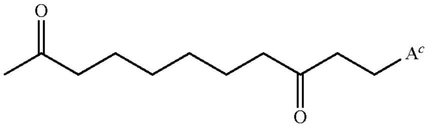
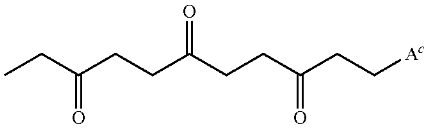
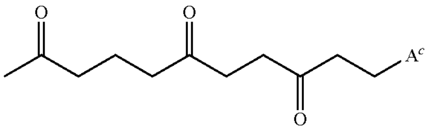
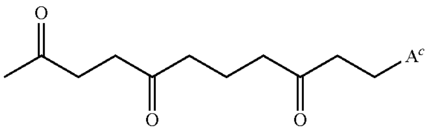
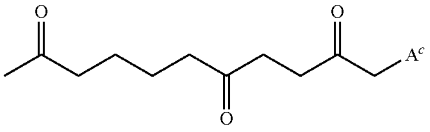
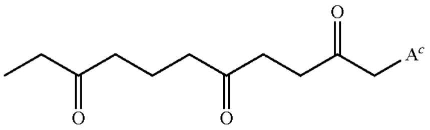
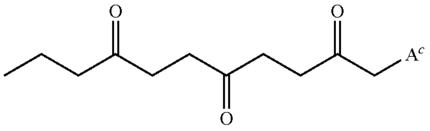
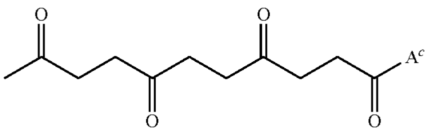

-continued
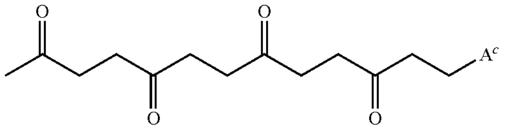
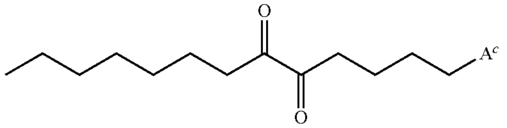
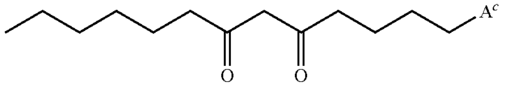
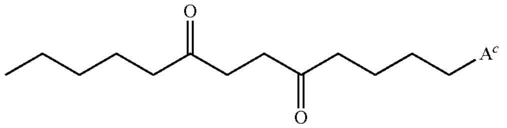
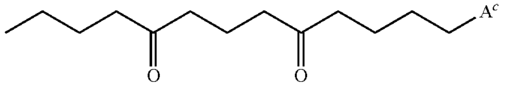
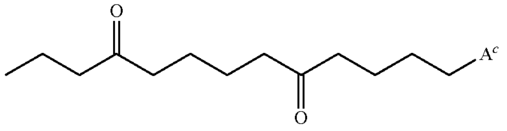
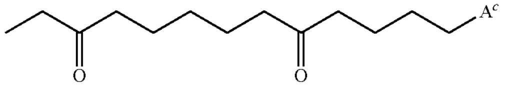
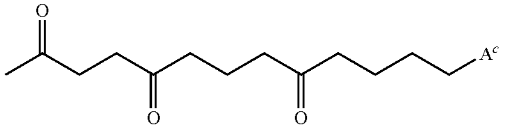
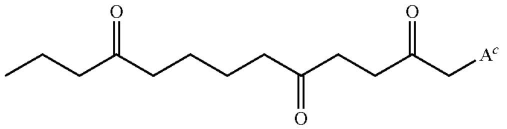
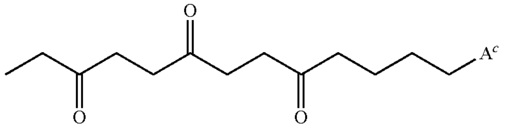
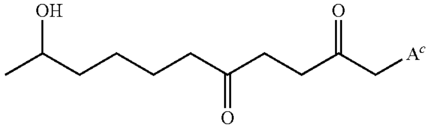
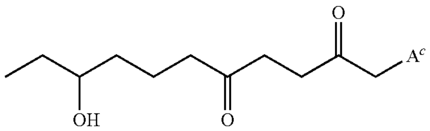
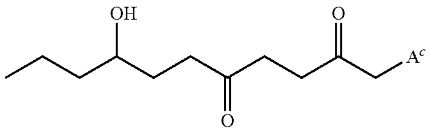
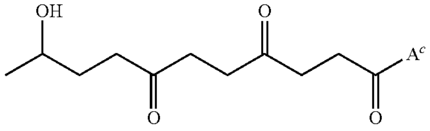
-continued
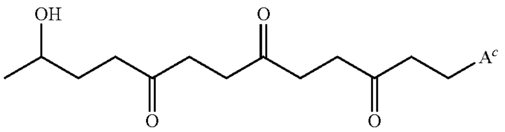
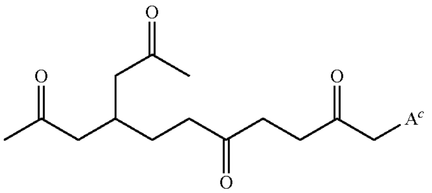
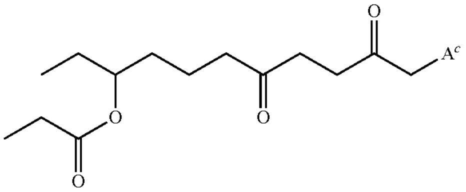
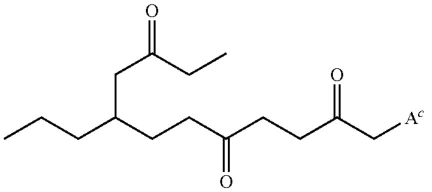
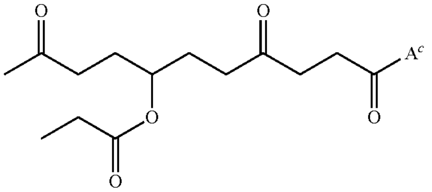
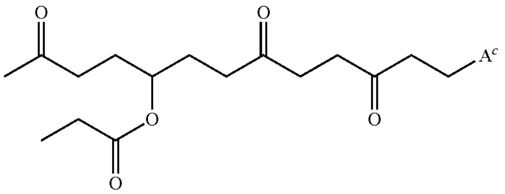
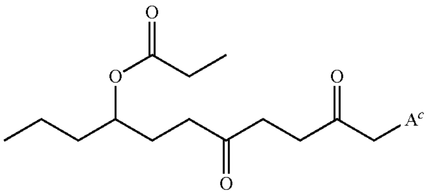
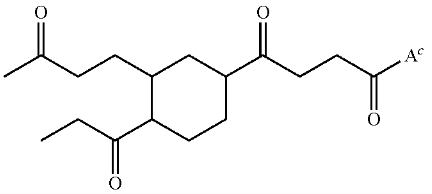
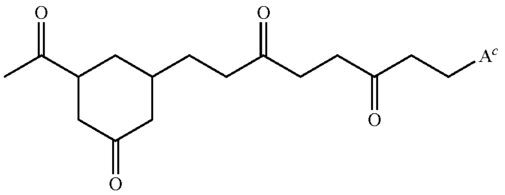

-continued

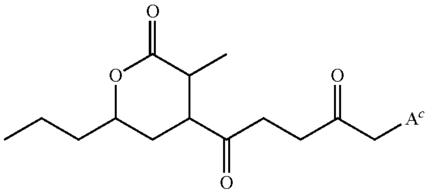

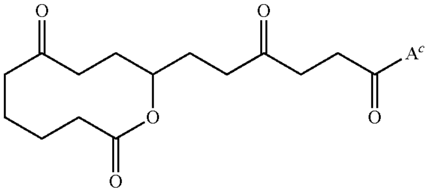

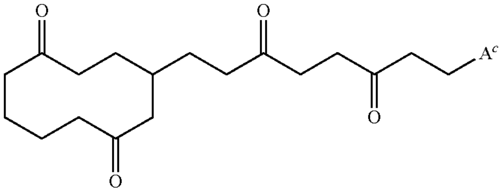

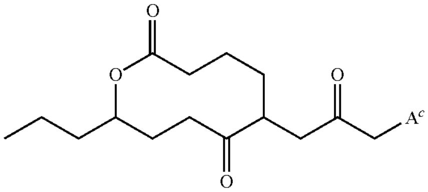

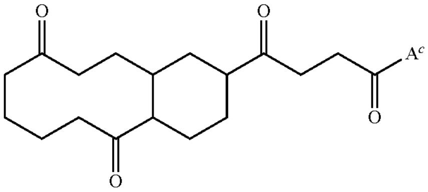

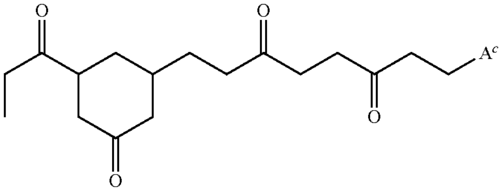

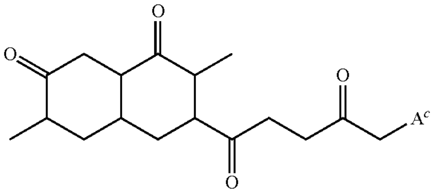

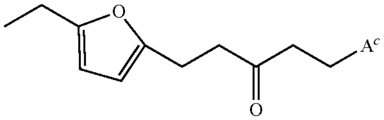

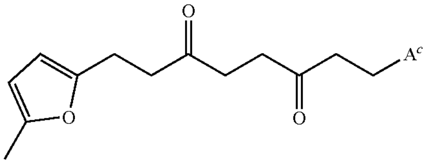

-continued

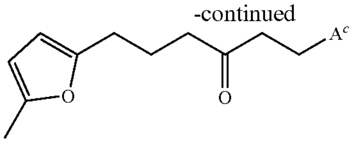

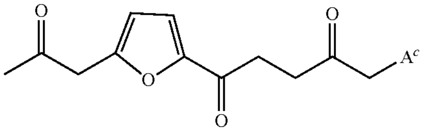

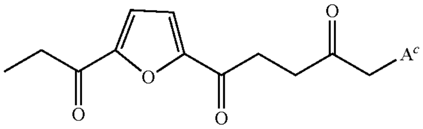

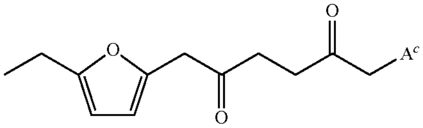

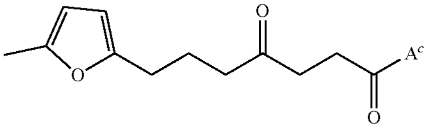

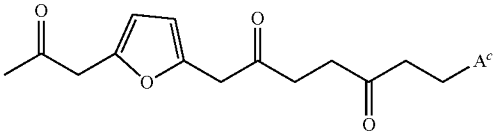

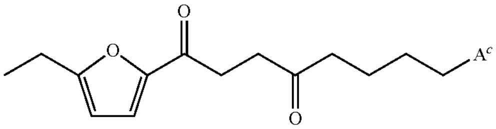

The surfactant (d) will be described.

In the formula (d), $R^{1d}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1d}$, a divalent heterocycle may be present between two carbon atoms, or a divalent heterocycle may be present at an end and bind to —C(═O)—, or a monovalent heterocycle may be present at an end of the alkyl group.

The “number of carbon atoms” in the alkyl group as used herein includes the number of carbon atoms constituting the heterocycles.

The substituent which may be contained in the alkyl group for $R^{1d}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^{1d}$ is preferably free from a carbonyl group.

In the alkyl group, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

The alkyl group preferably does not have any substituent.

$R^{1d}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group ($—CH_3$) or an ethyl group ($—C_2H_5$), and most preferably a methyl group ($—CH_3$).

In the formula (d), $R^{2d}$ and $R^{4d}$ are each independently H or a substituent. A plurality of $R^{2d}$ and $R^{4d}$ may be the same or different.

The substituent for each of $R^{2d}$ and $R^{4d}$ is preferably a halogen atom, a linear or branched alkyl group having 1 to 10 carbon atoms, a cyclic alkyl group having 3 to 10 carbon atoms, or a hydroxy group, and particularly preferably a methyl group or an ethyl group.

The alkyl group for each of $R^{2d}$ and $R^{4d}$ is preferably free from a carbonyl group. In the alkyl group, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

The alkyl group preferably does not have any substituent.

The alkyl group for each of $R^{2d}$ and $R^{4d}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group ($—CH_3$) or an ethyl group ($—C_2H_5$).

$R^{2d}$ and $R^{4d}$ are preferably each independently H or a linear or branched alkyl group having 1 to 10 carbon atoms and free from a carbonyl group, more preferably H or a linear or branched alkyl group having 1 to 3 carbon atoms and not having a substituent, further preferably H, a methyl group ($—CH_3$), or an ethyl group ($—C_2H_5$), and particularly preferably H.

In the formula (d), $R^{3d}$ is an alkylene group having 1 to 10 carbon atoms and optionally having a substituent. When a plurality of $R^{3d}$ are present, they may be the same or different.

The alkylene group is preferably free from a carbonyl group.

In the alkylene group, 75% or less of the hydrogen atoms bonded to the carbon atoms may be replaced with halogen atoms, 50% or less thereof may be replaced with halogen atoms, or 25% or less thereof may be replaced with halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group ($—CH_2—$), an ethylene group ($—C_2H_4—$), an isopropylene group ($—CH(CH_3)CH_2—$), or a propylene group ($—C_3H_6—$).

Any two of $R^{1b}$, $R^{2b}$, $R^{3b}$, and $R^{4b}$ optionally bind to each other to form a ring.

In the formula (d), n is an integer of 1 or more. In the formula, n is preferably an integer of 1 to 40, more preferably an integer of 1 to 30, and still more preferably an integer of 5 to 25.

In the formula (d), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 6 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (d), $A^d$ is $—SO_3X^d$ or $—COOX^d$, wherein $X^d$ is H, a metal atom, $NR^{5d}_4$, imidazolium optionally having a substituent, pyridinium optionally having a substituent, or phosphonium optionally having a substituent, wherein $R^{5d}$ is H or an organic group and may be the same or different. The organic group in $R^{5d}$ is preferably an alkyl group. $R^{5d}$ is preferably H or an organic group having 1 to 10 carbon atoms, more preferably H or an organic group having 1 to 4 carbon atoms, and still more preferably H or an alkyl group having 1 to 4 carbon atoms. Examples of the metal atom include monovalent and divalent metal atoms, and examples thereof include alkali metals (Group 1) and alkaline earth metals (Group 2), and preferred is Na, K or Li. $X^d$ may be a metal atom or $NR^{5d}4$, wherein $R^{5d}$ is defined as described above.

$X^d$ is preferably H, an alkali metal (Group 1), an alkaline earth metal (Group 2), or $NR^{5d}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^d$ is $NH_4$, the solubility of the surfactant in an aqueous medium is excellent, and the metal component is unlikely to remain in the PTFE or the final product.

In the formula (d), L is a single bond, $—CO_2—B—*$, $—OCO—B—*$, $—CONR^{6d}—B—*$, $—NR^{6d}CO—B—*$, or $—CO—$ other than the carbonyl groups in $—CO_2—B—$, $—OCO—B—$, $—CONR^{6d}—B—$, and $—NR^{6d}CO—B—$, wherein B is a single bond or an alkylene group having 1 to 10 carbon atoms and optionally having a substituent, $R^{6d}$ is H or an alkyl group having 1 to 4 carbon atoms and optionally having a substituent. The alkylene group more preferably has 1 to 5 carbon atoms. $R^{6d}$ is more preferably H or a methyl group. * indicates the side bonded to $A^d$ in the formula.

L is preferably a single bond.

The surfactant preferably has a 1H-NMR spectrum in which all peak intensities observed in a chemical shift range of 2.0 to 5.0 ppm give an integral value of 10 or more.

The surfactant preferably has a 1H-NMR spectrum in which all peak intensities observed in a chemical shift range of 2.0 to 5.0 ppm give an integral value within the above range. In this case, the surfactant preferably has a ketone structure in the molecule.

The integral value of the surfactant is more preferably 15 or more, and preferably 95 or less, more preferably 80 or less, and still more preferably 70 or less.

The integral value is determined using a heavy water solvent at room temperature. The heavy water content is adjusted to 4.79 ppm.

Examples of the surfactant (d) include: $CH_3C(O)CH_2CH_2CH_2CH_2CH_2CH_2CH_2CH_2COOK$, $CH_3C(O)CH_2CH_2CH_2CH_2CH_2CH_2CH_2COONa$, $CH_3C(O)CH_2CH_2CH_2CH_2CH_2CH_2COONa$, $CH_3C(O)CH_2CH_2CH_2CH_2CH_2COONa$, $CH_3C(O)CH_2CH_2CH_2CH_2COONa$, $CH_3C(O)CH_2CH_2CH_2COONa$, $CH_3C(O)CH_2CH_2CH_2CH_2CH_2CH_2CH_2CH_2CH_2CH_2CH_2CH_2CH_2COONa$, $CH_3C(O)CH_2CH_2CH_2CH_2CH_2CH_2CH_2CH_2CH_2CH_2CH_2CH_2CH_2CH_2CH_2CH_2CH_2CH_2CO$ ONa, $(CH_3)_3CC(O)CH_2CH_2CH_2CH_2CH_2CH_2CH_2CH_2COONa$, $(CH_3)_2CHC(O)CH_2CH_2CH_2CH_2CH_2CH_2CH_2CH_2COONa$, $(CH_2)_5CHC(O)CH_2CH_2CH_2CH_2CH_2CH_2CH_2CH_2COONa$, $CH_3CH_2C(O)CH_2CH_2CH_2CH_2CH_2CH_2CH_2COONa$, $CH_3CH_2CH_2C(O)CH_2CH_2CH_2CH_2CH_2CH_2COONa$, $CH_3CH_2CH_2CH_2C(O)CH_2CH_2CH_2CH_2CH_2COONa$, $CH_3CH_2CH_2CH_2CH_2C(O)CH_2CH_2CH_2CH_2COONa$, $CH_3CH_2CH_2CH_2CH_2CH_2C(O)CH_2CH_2CH_2COONa$, $CH_3CH_2CH_2CH_2CH_2CH_2CH_2C(O)CH_2CH_2COONa$, $CH_3CH_2CH_2CH_2CH_2CH_2CH_2CH_2C(O)CH_2COONa$, $CH_3C(O)CH_2CH_2CH_2CH_2CH_2CH_2CH_2CH_2OCH_2CH_2COONa$, $CH_3C(O)CH_2CH_2CH_2CH_2CH_2CH_2CH_2CH_2C(O)NHCH_2COOK$, $CH_3C(O)CH_2CH_2CH_2CH_2CH_2CH_2CH_2CH_2NHC(O)CH_2COOK$, $CH_3C(O)CH_2CH_2CH_2CH_2CH_2CH_2CH_2CH_2C(O)OCH_2COONa$, $CH_3C(O)CH_2CH_2CH_2CH_2CH_2CH_2CH_2CH_2OC(O)CH_2COONa$, $CH_3C(O)CH_2CH_2CH_2CH_2CH_2CH_2CH_2CH_2C(O)$ COONa, $CH_3C(O)CH_2CH_2CH_2CH_2CH_2CH_2CH_2CH_2C(O)$ COOH, $CH_3C(O)CH_2CH_2CH_2CH_2CH_2CH_2CH_2CH_2C(O)$ COOLi, $CH_3C(O)CH_2CH_2CH_2CH_2CH_2CH_2CH_2CH_2C(O)$ $COONH_4$, $CH_3C(O)CH_2CH_2CH_2CH_2CH_2CH_2CH_2CH_2C(O)$ COONa, $CH_3C(O)CH_2CH_2CH_2CH_2CH_2CH_2CH_2C(CH_3)_2COOK$, $CH_3C(O)CH_2CH_2CH_2CH_2CH_2CH_2CH_2CH_2CH_2SO_3Na$, $CH_3C(O)CH_2CH_2CH_2CH_2CH_2CH_2CH_2CH_2SO_3Na$, $CH_3C(O)CH_2CH_2CH_2CH_2CH_2CH_2CH_2SO_3Na$, $CH_3C(O)CH_2CH_2CH_2CH_2CH_2CH_2SO_3Na$, $CH_3C(O)CH_2CH_2CH_2CH_2CH_2SO_3Na$, $CH_3C(O)CH_2CH_2CH_2CH_2SO_3Na$, $CH_3C(O)CH_2CH_2CH_2CH_2CH_2CH_2CH_2CH_2CH_2CH_2CH_2CH_2CH_2SO_3Na$, $CH_3C(O)CH_2CH_2CH_2CH_2CH_2CH_2CH_2CH_2CH_2CH_2CH_2CH_2CH_2CH_2CH_2CH_2CH_2CH_2SO_3Na$, $CH_3C(O)CH_2CH_2CH_2CH_2CH_2CH_2CH_2CH_2CH_2CH_2SO_3Na$, $(CH_3)_3CC(O)CH_2CH_2CH_2CH_2CH_2CH_2CH_2CH_2CH_2SO_3Na$, $(CH_3)_2CHC(O)CH_2CH_2CH_2CH_2CH_2CH_2CH_2CH_2CH_2SO_3Na$, $(CH_2)_5CHC(O)CH_2CH_2CH_2CH_2CH_2CH_2CH_2CH_2CH_2SO_3Na$, $CH_3C(O)CH_2CH_2CH_2CH_2CH_2CH_2CH_2CH_2SO_3Na$, $CH_3C(O)CH_2CH_2CH_2CH_2CH_2CH_2CH_2SO_3Na$, $CH_3C(O)CH_2CH_2CH_2CH_2CH_2CH_2SO_3Na$, $CH_3C(O)CH_2CH_2CH_2CH_2CH_2SO_3Na$, $CH_3C(O)CH_2CH_2CH_2CH_2SO_3Na$, $CH_3C(O)CH_2CH_2CH_2SO_3Na$, $CH_3C(O)CH_2CH_2SO_3Na$, $CH_3C(O)CH_2SO_3Na$, $CH_3C(O)CH_2CH_2CH_2CH_2CH_2CH_2CH_2CH_2CH_2OCH_2CH_2CH_2SO_3Na$, $CH_3C(O)CH_2CH_2CH_2CH_2CH_2CH_2CH_2CH_2CH_2C(O)NHCH_2SO_3Na$, $CH_3C(O)CH_2CH_2CH_2CH_2CH_2CH_2CH_2CH_2CH_2NHC(O)CH_2SO_3Na$, $CH_3C(O)CH_2CH_2CH_2CH_2CH_2CH_2CH_2CH_2CH_2C(O)$ $SO_3Na$, $CH_3C(O)CH_2CH_2CH_2CH_2CH_2CH_2CH_2CH_2CH_2C(O)OCH_2SO_3Na$, $CH_3C(O)CH_2CH_2CH_2CH_2CH_2CH_2CH_2CH_2CH_2OC(O)CH_2SO_3Na$, $CH_3C(O)CH_2CH_2CH_2CH_2CH_2CH_2CH_2CH_2CH_2SO_3H$, $CH_3C(O)CH_2CH_2CH_2CH_2CH_2CH_2CH_2CH_2CH_2SO_3K$, $CH_3C(O)CH_2CH_2CH_2CH_2CH_2CH_2CH_2CH_2CH_2SO_3Li$, $CH_3C(O)CH_2CH_2CH_2CH_2CH_2CH_2CH_2CH_2CH_2SO_3NH_4$, and $CH_3C(O)CH_2CH_2CH_2CH_2CH_2CH_2CH_2CH_2C(CH_3)_2SO_3Na$.

Examples of the anionic hydrocarbon surfactant include a surfactant (hereinafter also referred to as a surfactant (1)) represented by the following general formula (1):

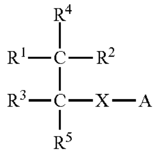

wherein $R^1$ to $R^5$ each represent H or a monovalent substituent, with the proviso that at least one of $R^1$ and $R^3$ represents a group represented by the general formula: —Y—$R^6$ and at least one of $R^2$ and $R^5$ represents a group represented by the general formula: —X-A or a group represented by the general formula: —Y—$R^6$;

X is the same or different at each occurrence and represents a divalent linking group or a bond;

A is the same or different at each occurrence and represents —COOM, —$SO_3M$, or —$OSO_3M$, wherein M is H, a metal atom, $NR^7_4$, imidazolium optionally having a substituent, pyridinium optionally having a substituent, or phosphonium optionally having a substituent, wherein $R^7$ is H or an organic group;

Y is the same or different at each occurrence and represents a divalent linking group selected from the group consisting of —S(=O)$_2$—, —O—, —COO—, —OCO—, —CONR$^8$—, and —NR$^8$CO—, or a bond, wherein $R^8$ is H or an organic group;

$R^6$ is the same or different at each occurrence and represents an alkyl group having 1 or more carbon atoms optionally containing, between carbon atoms, at least one selected from the group consisting of a carbonyl group, an ester group, an amide group, and a sulfonyl group; and any two of $R^1$ to $R^5$ optionally bind to each other to form a ring.

The surfactant (1) will be described.

In the formula, $R^1$ to $R^5$ each represent H or a monovalent substituent, with the proviso that at least one of $R^1$ and $R^3$ represents a group represented by the general formula: —Y—$R^6$ and at least one of $R^2$ and $R^3$ represents a group represented by the general formula: —X-A or a group represented by the general formula: —Y—$R^6$; any two of $R^1$ to $R^5$ optionally bind to each other to form a ring.

The substituent which may be contained in the alkyl group for $R^1$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^1$ is preferably free from a carbonyl group.

In the alkyl group, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

The alkyl group preferably does not have any substituent.

$R^1$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group ($—CH_3$) or an ethyl group ($—C_2H_5$), and most preferably a methyl group ($—CH_3$).

The monovalent substituent is preferably a group represented by the general formula: $—Y—R^6$, a group represented by the general formula: —X-A, —H, and a $C_{1-20}$ alkyl group optionally having a substituent, $—NH_2$, $—NHR^9$ (wherein $R^9$ is an organic group), —OH, $—COOR^9$ (wherein $R^9$ is an organic group) or $—OR^9$ (wherein $R^9$ is an organic group). The alkyl group preferably has 1 to 10 carbon atoms.

$R^9$ is preferably a $C_{1-10}$ alkyl group or a $C_{1-10}$ alkylcarbonyl group, more preferably a $C_{1-4}$ alkyl group or a $C_{1-4}$ alkylcarbonyl group.

In the formula, X is the same or different at each occurrence and represents a divalent linking group or a bond.

When $R^6$ does not contain any of a carbonyl group, an ester group, an amide group, and a sulfonyl group, X is preferably a divalent linking group containing at least one selected from the group consisting of a carbonyl group, an ester group, an amide group, and a sulfonyl group.

X is preferably a divalent linking group containing at least one bond selected from the group consisting of —CO—, $—S(=O)_2—$, —O—, —COO—, —OCO—, $—S(=O)_2—O—$, $—O—S(=O)_2—$, $—CONR^8—$, and $—NR^8CO—$, a $C_{1-10}$ alkylene group, or a bond. $R^8$ represents H or an organic group.

The organic group in $R^8$ is preferably an alkyl group. $R^8$ is preferably H or an organic group having 1 to 10 carbon atoms, more preferably H or an organic group having 1 to 4 carbon atoms, still more preferably H or an alkyl group having 1 to 4 carbon atoms, and further preferably H.

In the formula, A is the same or different at each occurrence and represents —COOM, $—SO_3M$, or $—OSO_3M$, wherein M is H, a metal atom, $NR^7_4$, imidazolium optionally having a substituent, pyridinium optionally having a substituent, or phosphonium optionally having a substituent, wherein $R^7$ is H or an organic group, and four $R^7$ are the same as or different from each other.

The organic group in $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably H, a metal atom, or $NR^7_4$, more preferably H, an alkali metal (Group 1), an alkaline earth metal (Group 2), or $NR^7_4$, still more preferably H, Na, K, Li, or $NH_4$, further preferably Na, K, or $NH_4$, particularly preferably Na or $NH_4$, and most preferably $NH_4$.

In the formula, Y is the same or different at each occurrence and represents a divalent linking group selected from the group consisting of $—S(=O)_2—$, —O—, —COO—, —OCO—, $—CONR^8—$, and $—NR^8CO—$, or a bond, wherein $R^8$ represents H or an organic group.

Y is preferably a divalent linking group selected from the group consisting of a bond, —O—, —COO—, —OCO—, $—CONR^8—$, and $—NR^8CO—$, more preferably a divalent linking group selected from the group consisting of a bond, —COO—, and —OCO—.

The organic group in $R^8$ is preferably an alkyl group. $R^8$ is preferably H or a $C_{1-10}$ organic group, more preferably H or a $C_{1-4}$ organic group, still more preferably H or a $C_{1-4}$ alkyl group, and further preferably H.

In the formula, $R^6$ is the same or different at each occurrence and represents an alkyl group having 1 or more carbon atoms optionally containing, between carbon atoms, at least one selected from the group consisting of a carbonyl group, an ester group, an amide group, and a sulfonyl group. The number of carbon atoms of the organic group in $R^6$ is preferably 2 or more, preferably 20 or less, more preferably 2 to 20, and still more preferably 2 to 10.

When the number of carbon atoms is 2 or more, the alkyl group for $R^6$ optionally contains, between carbon atoms, one or two or more of at least one selected from the group consisting of a carbonyl group, an ester group, an amide group, and a sulfonyl group, but the alkyl group contains no such groups at both ends. In the alkyl group for $R^6$, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

$R^6$ is preferably

- a group represented by the general formula: $—R^{10}—CO—R^{11}$,
- a group represented by the general formula: $—R^{10}—COO—R^{11}$,
- a group represented by the general formula: $—R^{11}$,
- a group represented by the general formula: $—R^{10}—NR^8CO—R^{11}$, or
- a group represented by the general formula: $—R^{10}—CONR^8—R^{11}$, wherein $R^8$ represents H or an organic group; $R^{10}$ represents an alkylene group; and $R^{11}$ represents an alkyl group optionally having a substituent.

$R^6$ is more preferably a group represented by the general formula: $—R^{10}—CO—R^{11}$.

The organic group in $R^8$ is preferably an alkyl group. $R^8$ is preferably H or a $C_{1-10}$ organic group, more preferably H or a $C_{1-4}$ organic group, still more preferably H or a $C_{1-4}$ alkyl group, and further preferably H.

The alkylene group for $R^{10}$ preferably has 1 or more, and more preferably 3 or more carbon atoms, and preferably 20 or less, more preferably 12 or less, still more preferably 10 or less, and particularly preferably 8 or less carbon atoms.

Further, the alkylene group for $R^{10}$ preferably has 1 to 20, more preferably 1 to 10, and still more preferably 3 to 10 carbon atoms.

The alkyl group for $R^{11}$ may have 1 to 20 carbon atoms, and preferably has 1 to 15, more preferably 1 to 12, still more preferably 1 to 10, further preferably 1 to 8, still further preferably 1 to 6, still much more preferably 1 to 3, particularly preferably 1 or 2, and most preferably 1 carbon atom. The alkyl group for $R^{11}$ preferably consists only of primary carbons, secondary carbons, and tertiary carbons, and particularly preferably consists only of primary carbons and secondary carbons. In other words, $R^{11}$ is preferably a methyl group, an ethyl group, an n-propyl group, or an isopropyl group, and most preferably a methyl group.

The surfactant (1) is preferably a compound represented by the general formula (1-1), a compound represented by the general formula (1-2), or a compound represented by the general formula (1-3), more preferably a compound represented by the general formula (1-1) or a compound represented by the general formula (1-2).

General Formula (1-1)

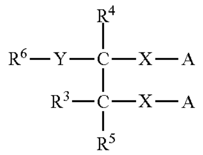

wherein $R^3$ to $R^6$, X, A, and Y are defined as described above.

General Formula (1-2)

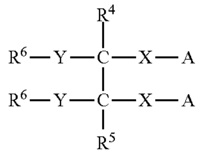

wherein $R^4$ to $R^6$, X, A, and Y are defined as described above.

General formula (1-3)

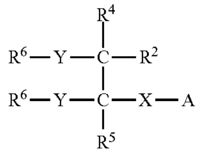

wherein $R^2$, $R^4$ to $R^6$, X, A, and Y are defined as described above.

The group represented by the general formula: —X-A is preferably

—COOM,
—$R^{12}$COOM,
—$SO_3M$,
—$OSO_3M$,
—$R^{12}SO_3M$,
—$R^{12}OSO_3M$,
—OCO—$R^{12}$—COOM,
—OCO—$R^{12}$—$SO_3M$,
—OCO—$R^{12}$—$OSO_3M$
—COO—$R^{12}$—COOM,
—COO—$R^{12}$—$SO_3M$,
—COO—$R^{12}$—$OSO_3M$,
—$CONR^8$—$R^{12}$—COOM,
—$CONR^8$—$R^{12}$—$SO_3M$,
—$CONR^8$—$R^{12}$—$OSO_3M$,
—$NR^8CO$—$R^{12}$—COOM,
—$NR^8CO$—$R^{12}$—$SO_3M$,
—$NR^8CO$—$R^{12}$—$OSO_3M$,
—$OS(=O)_2$—$R^{12}$—COOM,
—$OS(=O)_2$—$R^{12}$—$SO_3M$, or
—$OS(=O)_2$—$R^{12}$—$OSO_3M$, wherein $R^8$ and M are defined as described above; and $R^{12}$ is a $C_{1-10}$ alkylene group.

In the alkylene group for $R^{12}$, 75% or less of the hydrogen atoms bonded to the carbon atoms may be replaced with halogen atoms, 50% or less thereof may be replaced with halogen atoms, or 25% or less thereof may be replaced with halogen atoms. The alkylene group is preferably a non-halogenated alkylene group free from halogen atoms such as fluorine atoms and chlorine atoms.

The group represented by the general formula: —Y—$R^6$ is preferably a group represented by the general formula: —$R^{10}$—CO—$R^{11}$,
a group represented by the general formula: —OCO—$R^{10}$—CO—$R^{11}$,
a group represented by the general formula: —COO—$R^{10}$—CO—$R^{11}$,
a group represented by the general formula: —OCO—$R^{10}$—COO—$R^{11}$,
a group represented by the general formula: —COO—$R^{11}$,
a group represented by the general formula: —$NR^8CO$—$R^{10}$—CO—$R^{11}$, or
a group represented by the general formula: —$CONR^8$—$R^{10}$—$NR^8CO$—$R^{11}$, wherein $R^8$, $R^{10}$, and $R^{11}$ are defined as described above.

In the formula, $R^4$ and $R^5$ are each independently preferably H or a $C_{1-4}$ alkyl group.

In the alkyl groups for $R^4$ and $R^5$, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

$R^3$ in the general formula (1-1) is preferably H or a $C_{1-20}$ alkyl group optionally having a substituent, more preferably H or a $C_{1-20}$ alkyl group having no substituent, and still more preferably H.

In the alkyl group for $R^3$, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

$R^2$ in the general formula (1-3) is preferably H, OH, or a $C_{1-20}$ alkyl group optionally having a substituent, more preferably H, OH, or a $C_{1-20}$ alkyl group having no substituent, and still more preferably H or OH.

In the alkyl group for $R^2$, 75% or less of the hydrogen atoms bonded to the carbon atoms may be replaced with halogen atoms, 50% or less thereof may be replaced with halogen atoms, or 25% or less thereof may be replaced with halogen atoms. The alkyl group is preferably a non-halogenated alkyl group free from halogen atoms such as fluorine atoms and chlorine atoms.

Examples of the anionic hydrocarbon surfactant include a surfactant (1-0A) represented by the following formula (1-0A):

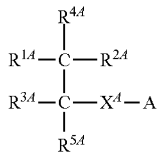

wherein $R^{1A}$ to $R^{5A}$ are H, a monovalent hydrocarbon group optionally containing, between carbon atoms, an ester group, or a group represented by general formula: —$X^A$-A, with the proviso that at least one of $R^{2A}$ and $R^{5A}$ represents a group represented by the general formula: —$X^A$-A;

$X^A$ is the same or different at each occurrence and represents a divalent hydrocarbon group or a bond;

A is the same or different at each occurrence and represents —COOM, wherein M is H, a metal atom, $NR^7_4$, imidazolium optionally having a substituent, pyridinium optionally having a substituent, or phosphonium optionally having a substituent, wherein $R^7$ is H or an organic group; and any two of $R^{1A}$ to $R^{5A}$ may be bonded to each other to form a ring.

In the general formula (1-0A), in $R^{1A}$ to $R^{5A}$, the monovalent hydrocarbon group optionally containing, between carbon atoms, an ester group preferably has 1 to 50 carbon atoms, and more preferably 5 to 20 carbon atoms. Any two of $R^{1A}$ to $R^{5A}$ optionally bind to each other to form a ring. The monovalent hydrocarbon group optionally containing, between carbon atoms, an ester group is preferably an alkyl group.

In the formula, in $X^A$, the number of carbon atoms in the divalent hydrocarbon group is preferably 1 to 50, and more preferably 5 to 20. Examples of the divalent hydrocarbon group include an alkylene group and an alkanediyl group, and preferred is an alkylene group.

In the general formula (1-0A), any one of $R^{2A}$ and $R^{5A}$ is preferably a group represented by the general formula: —$X^A$-A, and more preferably, $R^{2A}$ is a group represented by the general formula: —$X^A$-A.

In a preferred embodiment, in the general formula (1-0A), $R^{2A}$ is a group represented by the general formula: —$X^A$-A, and $R^{1A}$, $R^{3A}$, $R^{4A}$ and $R^{5A}$ are H. In this case, $X^A$ is preferably a bond or an alkylene group having 1 to 5 carbon atoms.

Another preferred embodiment is an embodiment in which in general formula (1-0A), $R^{2A}$ is a group represented by general formula: —$X^A$-A, $R^{1A}$ and $R^{3A}$ are groups represented by —$Y^A$—$R^6$, $Y^A$ is the same or different at each occurrence, and is —COO—, —OCO—, or a bond, and $R^6$ is the same or different at each occurrence, and is an alkyl group having 1 or more carbon atoms. In this case, it is preferable that $R^{4A}$ and $R^{5A}$ are H.

Examples of the hydrocarbon surfactant represented by the general formula (1-0A) include glutaric acid or a salt thereof, adipic acid or a salt thereof, pimelic acid or a salt thereof, suberic acid or a salt thereof, azelaic acid or a salt thereof, and sebacic acid or a salt thereof.

The aliphatic carboxylic acid-type hydrocarbon surfactant represented by the general formula (1-0A) may be a 2-chain 2-hydrophilic type synthetic surfactant, and examples of the gemini type surfactant include geminiserf (CHUKYO YUSHI CO., LTD.), Gemsurf α142 (carbon number: 12, lauryl group), Gemsurf α102 (carbon number: 10), and Gemsurf α182 (carbon number: 14).

The hydrocarbon surfactant may be one that has been subjected to radical treatment or oxidation treatment.

The radical treatment may be any treatment that generates radicals in the hydrocarbon surfactant, for example, a treatment in which deionized water and the hydrocarbon surfactant are added to the reactor, the reactor is hermetically sealed, the inside of the reactor is replaced with nitrogen, the reactor is heated and pressurized, a polymerization initiator is charged, the reactor is stirred for a certain time, and then the reactor is depressurized to the atmospheric pressure, and the reactor is cooled. The oxidation treatment is a treatment in which an oxidizing agent is added to the hydrocarbon surfactant. Examples of the oxidizing agent include oxygen, ozone, hydrogen peroxide solution, manganese (IV) oxide, potassium permanganate, potassium dichromate, nitric acid, and sulfur dioxide. In order to promote the radical treatment or the oxidation treatment, the radical treatment or the oxidation treatment may be performed in a pH-adjusted aqueous solution. The pH of the aqueous solution for radical treatment or oxidation treatment is preferably less than 7, and the pH of the aqueous solution can be adjusted by using, for example, sulfuric acid, nitric acid, hydrochloric acid or the like.

In the production method of the present disclosure, two or more hydrocarbon surfactants may be used simultaneously, and the hydrocarbon surfactants used in the polymerization step and the addition step may be the same or different.

The hydrocarbon surfactant in the polymerization step and the addition step is preferably an anionic hydrocarbon surfactant, and more preferably at least one selected from the group consisting of the compound (α), the surfactant (α), the surfactant (b), the surfactant (c), the surfactant (d), the surfactant (1) and the surfactant (1-0A), and those obtained by subjecting these surfactants to a radical treatment or oxidation treatment.

In the first and second production methods of the present disclosure, the hydrocarbon surfactant is more preferably a carboxylic acid-type hydrocarbon surfactant.

The carboxylic acid-type hydrocarbon surfactant is usually an anionic hydrocarbon surfactant having a hydrophilic moiety formed of carboxylate and a hydrophobic moiety which is a long chain hydrocarbon moiety such as alkyl. In particular, the carboxylic acid-type hydrocarbon surfactant may be any one having a carboxyl group (—COOH) or a group in which the hydrogen atom of the carboxyl group is replaced with an inorganic cation (for example, metal atoms, ammonium, etc.).

The carboxylic acid-type hydrocarbon surfactant may be an aliphatic-type carboxylic acid-type hydrocarbon surfactant or a carboxylic acid-type hydrocarbon surfactant other than the aliphatic-type.

As used herein, the term "aliphatic-type carboxylic acid-type hydrocarbon surfactant" means a carboxylic acid-type hydrocarbon surfactant free from a carbonyl group which is not in a carboxyl group or an ester group.

The ester group means a group represented by —COO— or —OCO—.

The carboxylic acid-type hydrocarbon surfactant used may be, for example, a hydrocarbon surfactant having a group in which the carboxyl group or the hydrogen atom of the carboxyl group is replaced with an inorganic cation among the hydrocarbon surfactants described above.

In the first and second production methods of the present disclosure, the carboxylic acid-type hydrocarbon surfactant used in the polymerization step and the adding step is preferably at least one selected from the group consisting of a surfactant having a carboxyl group (—COOH) or a group in which the hydrogen atom of the carboxyl group is replaced with an inorganic cation (for example, metal atoms, ammonium, etc.) among the surfactant (1), the anionic surfactant represented by $R^{6z}(\text{-L-M})_2$ described above, and the anionic surfactant represented by $R^{7z}(\text{-L-M})_3$ described above, the compound (α), the surfactant (1-0A), and those obtained by radically treating or oxidizing these surfactants. The carboxylic acid-type hydrocarbon surfactant may be used alone or in a mixture of two or more.

The compound (α) includes not only the anionic hydrocarbon surfactant represented by the formula: $R^{102}$—COOM (wherein $R^{102}$ and M are the same as above) (preferably, the compound represented by the formula (A)) but also those having a carboxyl group (—COOH) or a group in which the hydrogen atom of the carboxyl group is replaced with an inorganic cation (for example, metal atoms, ammonium, etc.) among the anionic surfactant represented by the formula: $R^z$-L-M (wherein $R^z$, L, and M are the same as above), the surfactant (c), and the surfactant (d).

The carboxylic acid-type hydrocarbon surfactant is preferably the compound (α), and more preferably at least one selected from the group consisting of a compound represented by the formula (A), a compound in which $A^c$ is —$COOX^c$ in the formula (c), a compound in which $A^d$ is —$COOX^d$ in the formula (d), a compound in which A is —COOM in the formula (1), a compound in which A is —COOM in the formula (1-0A), and those obtained by radically treating or oxidizing any of these compounds, and still more preferably at least one selected from the group consisting of a compound represented by the formula (A) and a compound obtained by radically treating or oxidizing the compound.

In particular, preferred is at least one selected from the group consisting of lauric acid, undecanoic acid, capric acid, myristic acid, pentadecylic acid, palmitic acid, salts thereof, and those obtained by radically treating or oxidizing any of these compounds, more preferred is at least one selected from the group consisting of lauric acid and salts thereof, and those obtained by radically treating or oxidizing any of these compounds, still more preferred is at least one selected from the group consisting of lauric acid salts and those obtained by radically treating or oxidizing any of these, and still more preferred is at least one selected from the group consisting of sodium laurate and those obtained by radically treating or oxidizing sodium laurate. Examples of the salts include, but are not limited to, those in which hydrogen of the carboxyl group is a metal atom, $NR^{101}_4$, imidazolium optionally having a substituent, pyridinium optionally having a substituent, or phosphonium optionally having a substituent as M in the formula described above.

In the polymerization step, the fluoromonomer is preferably polymerized substantially in the absence of a fluorine-containing surfactant.

Conventionally, fluorine-containing surfactants have been used for the polymerization of a fluoropolymer, but the production method of the present disclosure allows for obtaining a fluoropolymer having a high-molecular-weight without using the fluorine-containing surfactants.

The expression "substantially in the absence of a fluorine-containing surfactant" as used herein means that the amount of the fluorine-containing surfactant in the aqueous medium is 10 ppm or less, preferably 1 ppm or less, more preferably 100 ppb or less, still more preferably 10 ppb or less, and further preferably 1 ppb or less.

Examples of the fluorine-containing surfactant include anionic fluorine-containing surfactants.

The anionic fluorine-containing surfactant may be, for example, a fluorine atom-containing surfactant having 20 or less carbon atoms in total in the portion excluding the anionic group.

The fluorine-containing surfactant may also be a surfactant containing fluorine having a molecular weight of 800 or less in the anionic moiety.

The "anionic moiety" means the portion of the fluorine-containing surfactant excluding the cation. For example, in the case of $F(CF_2)_{n1}COOM$ represented by the formula (I) described later, the anionic moiety is the "$F(CF_2)_{n1}COO$" portion.

Examples of the fluorine-containing surfactant also include fluorine-containing surfactants having a Log POW of 3.5 or less. The Log POW is a partition coefficient between 1-octanol and water, which is represented by Log P (wherein P represents the ratio between the concentration of the fluorine-containing surfactant in octanol and the concentration of the fluorine-containing surfactant in water in a phase-separated octanol/water (1:1) liquid mixture containing the fluorine-containing surfactant).

Log POW is determined as follows. Specifically, HPLC is performed on standard substances (heptanoic acid, octanoic acid, nonanoic acid, and decanoic acid) each having a known octanol/water partition coefficient using TOSOH ODS-120T column (ϕ4.6 mm×250 mm, Tosoh Corp.) as a column and acetonitrile/0.6% by mass $HClO_4$ aqueous solution=1/1 (vol/vol %) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, and U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO2007/046377, International Publication No. WO2007/119526, International Publication No. WO2007/046482, International Publication No. WO2007/046345, U.S. Patent Application Publication No. 2014/0228531, International Publication No. WO2013/189824, and International Publication No. WO2013/189826.

Examples of the anionic fluorine-containing surfactant include a compound represented by the following general formula ($N^0$):

$$X^{n0}—Rf^{n0}—Y^0 \qquad (N^0)$$

wherein $X^{n0}$ is H, Cl, or F; $Rf^{n0}$ is a linear, branched, or cyclic alkylene group having 3 to 20 carbon atoms in which some or all of H are replaced with F; the alkylene group optionally containing one or more ether bonds in which some of H are replaced with Cl; and $Y^0$ is an anionic group.

The anionic group $Y^0$ may be —COOM, —$SO_2$M, or —$SO_3$M, and may be —COOM or —$SO_3$M.

M is H, a metal atom, $NR^{8y}$, imidazolium optionally having a substituent, pyridinium optionally having a substituent, or phosphonium optionally having a substituent, wherein $R^{8y}$ is H or an organic group.

Examples of the metal atom include alkali metals (Group 1) and alkaline earth metals (Group 2), such as Na, K, or Li.

The organic group in $R^{8y}$ is preferably an alkyl group.

$R^{8y}$ may be H or a $C_{1-10}$ organic group, may be H or a $C_{1-4}$ organic group, and may be H or a $C_{1-4}$ alkyl group.

M may be H, a metal atom, or $NR^{8y}$, may be H, an alkali metal (Group 1), an alkaline earth metal (Group 2), or $NR^{8y}$, and may be H, Na, K, Li, or $NH_4$.

$Rf^{n0}$ may be one in which 50% or more of H has been replaced with fluorine.

Examples of the compound represented by the general formula ($N^0$) include:

a compound represented by the following general formula ($N^1$):

$$X^{n0}—(CF_2)_{m1}—Y^0 \quad (N^1)$$

wherein $X^{n0}$ is H, Cl, and F; m1 is an integer of 3 to 15; and $Y^0$ is as defined above;

a compound represented by the following general formula ($N^2$):

$$Rf^{n1}—O—(CF(CF_3)CF_2O)_{m2}CFX^{n1}—Y^0 \quad (N^2)$$

wherein $Rf^{n1}$ is a perfluoroalkyl group having 1 to 5 carbon atoms; m2 is an integer of 0 to 3; $X^{n1}$ is F or $CF_3$; and $Y^0$ is as defined above;

a compound represented by the following general formula ($N^3$):

$$Rf^{n2}(CH_2)_{m3}—(Rf^{n3})_q—Y^0 \quad (N^3)$$

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the following general formula ($N^4$):

$$Rf^{n4}—O—(CY^{n1}Y^{n2})_pCF_2—Y^0 \quad (N^4)$$

wherein $Rf^{n4}$ is a linear or branched partially or fully fluorinated alkyl group having 1 to 12 carbon atoms and optionally containing an ether bond; and $Y^{n1}$ and $Y^{n2}$ are the same or different and are each H or F; p is 0 or 1; and $Y^0$ is as defined above; and a compound represented by the following general formula ($N^5$):

($N^5$)

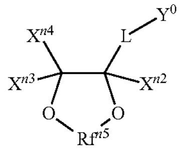

wherein $X^{n2}$, $X^{n3}$, and $X^{n4}$ may be the same or different and are each H, F, or a linear or branched partially or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and Y° is as defined above, with the proviso that the total carbon number of $X^{n2}$, $X^{n3}$, $X^{n4}$, and $Rf^{n5}$ is 18 or less.

More specific examples of the compound represented by the above general formula ($N^0$) include a perfluorocarboxylic acid (I) represented by the following general formula (I), an ω—H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkvlsulfonic acid (VI) represented by the following general formula (VI), an ω—H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The perfluorocarboxylic acid (I) is represented by the following general formula (I):

$$F(CF_2)_{n1}COOM \quad (I)$$

wherein n1 is an integer of 3 to 14; and M is H, a metal atom, $NR^{8y}$, imidazolium optionally having a substituent, pyridinium optionally having a substituent, or phosphonium optionally having a substituent, wherein $R^{8y}$ is H or an organic group.

The ω—H perfluorocarboxylic acid (II) is represented by the following general formula (II):

$$H(CF_2)_{n2}COOM \quad (II)$$

wherein n2 is an integer of 4 to 15; and M is as defined above.

The perfluoropolyethercarboxylic acid (III) is represented by the following general formula (III):

$$Rf^1—O—(CF(CF_3)CF_2O)_{n3}CF(CF_3)COOM \quad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$$Rf^2(CH_2)_{n4}Rf^3COOM \quad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4—O—CY^1Y^2CF_2—COOM \quad (V)$$

wherein $Rf^4$ is a linear or branched partially or fully fluorinated alkyl group having 1 to 12 carbon atoms and optionally containing an ether bond; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \quad (VI)$$

wherein n5 is an integer of 3 to 14; and M is as defined above.

The ω—H perfluorosulfonic acid (VII) is represented by the following general formula (VII):

$$H(CF_2)_{n6}SO_3M \quad (VII)$$

wherein n6 is an integer of 4 to 14; and M is as defined above.

The perfluoroalkylalkylenesulfonic acid (VIII) is represented by the following general formula (VIII):

$$Rf^5(CH_2)_{n7}SO_3M \quad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$$Rf^6(CH_2)_{n8}COOM \quad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$$Rf^7—O—Rf^8—O—CF_2—COOM \quad (X)$$

wherein $Rf^7$ is a linear or branched partially or fully fluorinated alkyl group having 1 to 6 carbon atoms and optionally containing an ether bond; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9—O—CY^1Y^2CF_2—SO_3M \quad (XI)$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the following general formula (XII):

(XII)

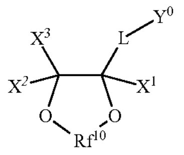

wherein $X^1$, $X^2$, and $X^3$ may be the same or different and are H, F, and a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —$SO_2M$, or —$SO_3M$, and may be —$SO_3M$ or COOM, where M is as defined above.

Examples of L include a single bond, a partially or fully fluorinated alkylene group having 1 to 10 carbon atoms and optionally containing an ether bond.

The compound (XIII) is represented by the following general formula (XIII):

$$Rf^{11}—O—(CF_2CF(CF_3)O)_{n9}(CF_2O)_{n10}CF_2COOM \quad (XIII)$$

wherein $Rf^{11}$ is a fluoroalkyl group having 1 to 5 carbon atoms containing chlorine, n9 is an integer of 0 to 3, n10 is an integer of 0 to 3, and M is the same as defined above. Examples of the compound (XIII) include $CF_2ClO(CF_2CF(CF_3)O)_{n9}(CF_2O)_{n10}CF_2COONH_4$ (mixture having an average molecular weight of 750, in the formula, n9 and n10 are as defined above).

As described above, examples of the anionic fluorine-containing surfactant include a carboxylic acid-based surfactant and a sulfonic acid-based surfactant.

In the polymerization step, an aqueous dispersion containing the particles made of the fluoropolymer, the hydrocarbon surfactant, and the aqueous medium is usually obtained. In the aqueous dispersion, the particles made of the fluoropolymer are dispersed in an aqueous medium in the presence of the hydrocarbon surfactant.

The production method of the present disclosure may obtain a fluoropolymer aqueous dispersion. The fluoropolymer aqueous dispersion obtained by the production method of the present disclosure may be the same as the aqueous dispersion obtained in the polymerization step, or may be a treated solution of the aqueous dispersion obtained in the polymerization step.

The solid concentration of the fluoropolymer aqueous dispersion obtained by the production method of the present disclosure is not limited, but may be, for example, 1.0 to 70.0% by mass. The solid concentration is preferably 8.0% by mass or more, more preferably 10.0% by mass or more, and preferably 60.0% by mass or less, more preferably 50.0% by mass or less.

The production method of the present disclosure may include a step of diluting the fluoropolymer aqueous dispersion obtained in the polymerization step by adding water. For example, the solid concentration can be diluted to 10.0 to 25.0% by mass by the dilution.

In order to increase the bulk density of the fluoropolymer powder, it is preferable that the fluoropolymer solid concentration in the fluoropolymer aqueous dispersion is high. When the concentration of the fluoropolymer solid concentration in the fluoropolymer aqueous dispersion for coagulation is high, the degree of association of the primary particles of the fluoropolymer increases, and the primary particles of the fluoropolymer are densely associated and agglomerated to granulate. When the fluoropolymer solid concentration of the fluoropolymer aqueous dispersion is less than 8% by mass, the agglomeration density of the primary particles of the fluoropolymer tends to be sparse, and it is difficult to obtain a fluoropolymer powder having a high bulk density. On the other hand, if the fluoropolymer solid concentration in the fluoropolymer aqueous dispersion is too high, the concentration of unagglomerated fluoropolymer increases and the unagglomerated fluoropolymer solid concentration in the coagulated discharge water increases. When the unagglomerated fluoropolymer solid concentration in the coagulated discharge water is high, the piping clogging and discharge water treatment are costly and time-consuming. In addition, the yield of the fluoropolymer powder decreases. The unagglomerated fluoropolymer solid concentration in the coagulated discharge water is preferably low from the viewpoint of productivity of the fluoropolymer powder, more preferably less than 0.4% by mass, still more preferably less than 0.3% by mass, and particularly preferably less than 0.2% by mass. When the fluoropolymer solid concentration of the fluoropolymer aqueous dispersion exceeds 25% by mass, it is difficult to reduce the unagglomerated fluoropolymer solid concentration of the coagulated discharge water to less than 0.4% by mass.

From the viewpoint of reducing the uncoagulated content, the solid concentration is preferably 10.0 to 25.0% by mass, preferably 10.0 to 22.0% by mass, and more preferably 10.0 to 20.0% by mass.

Since the fluoropolymer solid concentration in the fluoropolymer aqueous dispersion obtained in the polymerization step is about 8 to 45% by mass, in a case where the fluoropolymer solid concentration is high, it may be adjusted to 8 to 25% by mass by adding a diluting solvent such as water. When the fluoropolymer solid concentration in the fluoropolymer aqueous dispersion after emulsion polymerization is 8 to 25% by mass, the fluoropolymer aqueous dispersion can be used as it is as the fluoropolymer aqueous dispersion.

In order to adjust the average particle size (average secondary particle size) of the fluoropolymer powder, it is also preferable to set the temperature of the fluoropolymer aqueous dispersion for coagulation to 3 to 80° C.

The fluoropolymer aqueous dispersion is preferably substantially free from a fluorine-containing surfactant. The term "substantially free of fluorine-containing surfactant" in the aqueous dispersion as used herein means that the fluorine-containing surfactant is 10 ppm or less based on the fluoropolymer. The content of the fluorine-containing surfactant is preferably 1 ppm or less, more preferably 100 ppb or less, still more preferably 10 ppb or less, further preferably 1 ppb or less, and particularly preferably the fluorine-containing surfactant is below the detection limit as measured by liquid chromatography-mass spectrometry (LC/MS/MS).

The amount of the fluorine-containing surfactant can be determined by a known method. For example, it can be determined by LC/MS/MS analysis. First, the resulting aqueous dispersion is extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The resulting aqueous dispersion is subjected to Soxhlet extraction with methanol, and the extracted liquid is subjected to LC/MS/MS analysis for quantitative measurement.

That is, the content of the fluorine-containing surfactant can be quantified by, for example, LC/MS/MS analysis. First, extraction is performed by adding methanol to the aqueous dispersion, and the obtained extracted liquid is subjected to LC/MS/MS analysis. In order to further improve the extraction efficiency, treatment by Soxhlet extraction, ultrasonic treatment or the like may be performed. The molecular weight information is extracted from the LC/MS/MS spectrum obtained to confirm agreement with the structural formula of the candidate fluorine-containing surfactant. Thereafter, aqueous solutions having five or more different concentration levels of the confirmed fluorine-containing surfactant are prepared, LC/MS/MS analysis is performed for aqueous solutions of each concentration level, and the relationship between the content and the area for the content is plotted to draw a calibration curve. Then, using the calibration curve, the area of the LC/MS/MS chromatogram of the fluorine-containing surfactant in the extracted liquid can be converted into the content of the fluorine-containing surfactant.

The fluorine-containing surfactant is the same as those exemplified in the production method of the present disclosure described above. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant include compounds represented by the general formula ($N^0$), and specific examples thereof include compounds represented by the general formula ($N^1$), compounds represented by the general formula ($N^2$), compounds represented by the general formula ($N^3$), compounds represented by the general formula ($N^4$), and compounds represented by the general formula ($N^5$). More specific examples thereof include a perfluorocarboxylic acid (I) represented by the general formula (I), an ω—H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω—H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the general formula (XIII).

In the fluoropolymer aqueous dispersion, the average primary particle size of the fluoropolymer is, for example, 50 to 1,000 nm. The lower limit of the average primary particle size is preferably 100 nm, and more preferably 150 nm. The upper limit of the average primary particle size is preferably 400 nm, and more preferably 350 nm.

The average primary particle size can be measured by a dynamic light scattering method. The average primary particle size may be determined by preparing a fluoropolymer aqueous dispersion with a fluoropolymer solid concentration adjusted to 1.0% by mass and using a dynamic light scattering method at 25° C. with 70 measurement processes, wherein the solvent (water) has a refractive index of 1.3328 and the solvent (water) has a viscosity of 0.8878 mPa·s. The dynamic light scattering may use, for example, ELSZ-1000S (manufactured by Otsuka Electronics Co., Ltd.).

The hydrocarbon surfactant can be suitably used as a dispersant for dispersing the fluoropolymer in an aqueous medium.

The lower limit value of the content of the hydrocarbon surfactant in the fluoropolymer aqueous dispersion is preferably 10 ppb, more preferably 100 ppb, still more preferably 1 ppm, further preferably 10 ppm, and particularly preferably 50 ppm, based on the fluoropolymer. The upper limit value thereof is preferably 100,000 ppm, more preferably 50,000 ppm, still more preferably 10,000 ppm, and still more preferably 5,000 ppm based on the fluoropolymer.

The content of the hydrocarbon surfactant in the fluoropolymer aqueous dispersion can be determined, for example, by centrifuging the fluoropolymer aqueous dispersion using a high speed centrifuge and measuring the obtained supernatant with a high performance liquid chromatography (HPLC) analyzer.

The fluoropolymer aqueous dispersion obtained by the above-mentioned polymerization step may be concentrated or subjected to dispersion stabilization treatment to obtain a dispersion.

The fluoropolymer aqueous dispersion may be obtained by subjecting the fluoropolymer aqueous dispersion obtained in the polymerization step to (A) a step of bringing the fluoropolymer aqueous dispersion obtained by the polymerization step into contact with an anion exchange resin or a mixed bed containing an anion exchange resin and a cation exchange resin in the presence of a nonionic surfactant (A), and/or (B) a step of concentrating the aqueous dispersion obtained by this step such that the solid concentration is 30 to 70% by mass based on 100% by mass of the aqueous dispersion (B).

The nonionic surfactant is not limited, but any of those to be described above as the nucleating agent can be used.

The anion exchange resin to be used may be, but is not limited to, a known one. The contact with the anion exchange resin may be performed by a known method.

The fluoropolymer aqueous dispersion can be produced by subjecting the aqueous dispersion obtained by the polymerization step to the step (A), and subjecting the aqueous dispersion obtained in the step (A) to the step (B). The step (B) may also be performed without carrying out the step (A) to produce an aqueous dispersion. Further, the step (A) and the step (B) may be repeated or combined.

Examples of the anion exchange resin include known ones such as a strongly basic anion exchange resin containing as a functional group a $—N^+X^-(CH_3)_3$ group (wherein X is Cl or OH) or a strongly basic anion exchange resin containing a $—N^+X^-(CH_3)_3(C_2H_4OH)$ group (wherein X is as described above). Specific examples thereof include those described in International Publication No. WO99/62858, International Publication No. WO03/020836, International Publication No. WO2004/078836, International Publication No. WO2013/027850, and International Publication No. WO2014/084399.

Examples of the cation exchange resin include, but are not limited to, known ones such as a strongly acidic cation exchange resin containing as a functional group a $—SO_3—$ group and a weakly acidic cation exchange resin containing as a functional group a —COO— group. Of these, from the viewpoint of achieving good removal efficiency, a strongly acidic cation exchange resin is preferred, a $H^+$ form strongly acidic cation exchange resin is more preferred.

The "mixed bed containing a cation exchange resin and an anion exchange resin" encompasses, but is not limited to, those in which the resins are filled into a single column, those in which the resins are filled into different columns, and those in which the resins are dispersed in an aqueous dispersion.

The concentration may be carried out by a known method. Specific examples include those described in International Publication No. WO2007/046482 and International Publication No. WO2014/084399. Examples thereof include phase separation, centrifugal sedimentation, cloud point concentration, electric concentration, electrophoresis, filtration treatment using ultrafiltration, filtration treatment using a reverse osmosis membrane (RO membrane), and nanofiltration treatment. The concentration may concentrate the fluoropolymer concentration to be 30 to 70% by mass in accordance with the application thereof.

The concentration may impair the stability of the dispersion. In such a case, a dispersion stabilizer may be further added.

The dispersion stabilizer added may be the aforementioned nonionic surfactant or various other surfactants.

The nonionic surfactant is the same as the nonionic surfactant exemplified as the nucleating agent described above, and can be appropriately selected from the nonionic surfactants described above. The nonionic surfactant is preferably free from an aromatic moiety.

Also, the cloud point of the nonionic surfactant is a measure of its solubility in water. The surfactant used in the aqueous dispersion of the present disclosure has a cloud point of about 30° C. to about 90° C., preferably about 35° C. to about 85° C.

The total amount of the dispersion stabilizer is 0.5 to 20% by mass in terms of concentration, based on the solid of the dispersion. When the amount of the dispersion stabilizer is less than 0.5% by mass, the dispersion stability may deteriorate, and when the amount thereof is more than 20% by mass, dispersion effects commensurate with the amount thereof may not be obtained, which is impractical. The lower limit of the amount of the dispersion stabilizer is more preferably 2% by mass, while the upper limit thereof is more preferably 12% by mass.

The method for producing a fluoropolymer of the present disclosure preferably includes at least one of a step of recovering a fluoropolymer aqueous dispersion obtained in the polymerization step, a step of agglomerating the fluoropolymer in the fluoropolymer aqueous dispersion, a step of recovering the agglomerated fluoropolymer, and a step of drying the recovered fluoropolymer at 100 to 300° C. (preferably 100 to 250° C.) By including such a step, a fluoropolymer powder can be obtained.

A powder can be produced by agglomerating the fluoropolymer contained in the fluoropolymer aqueous dispersion. The fluoropolymer aqueous dispersion can be used as a powder for various purposes after being post-treated such as concentration if necessary, and then agglomerated, washed, and dried.

Agglomeration of the fluoropolymer aqueous dispersion is usually performed by diluting the aqueous dispersion obtained by polymerization of polymer latex, for example, with water to a polymer concentration of 10 to 25% by mass, optionally adjusting the pH to acidic, neutral or alkaline, and then stirring the polymer more vigorously than during the reaction in a vessel equipped with a stirrer. The agglomeration may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The agglomeration may be continuously performed using a device such as an inline mixer.

Pigment-containing or filler-containing fluoropolymer powder in which pigments and fillers are uniformly mixed can be obtained by adding pigments for coloring and various fillers for improving mechanical properties before or during the coagulation.

In the production method of the present disclosure, the wet powder obtained by coagulating the fluoropolymer is usually dried by means of vacuum, high-frequency waves, hot air, or the like while keeping the wet powder in a state in which the wet powder is less fluidized, preferably in a stationary state.

For example, when the fluoropolymer is PTFE, friction between the powder particles especially at high temperature usually has unfavorable effects on the PTFE in the form of fine powder. This is because the particles made of such PTFE are easily formed into fibrils even with a small shearing force and lose its original, stable particulate structure. The drying is performed at a drying temperature of 10 to 300° C. (more suitably 10 to 250° C.), preferably 100 to 300° C. (more suitably 100 to 250° C.).

As used herein, the presence or absence of the fibrillation ability can be determined by "paste extrusion", a representative method of molding a "high-molecular-weight PTFE powder" which is a powder (fine powder) of an emulsion polymer of TFE. Usually, the high-molecular-weight PTFE powder can be paste-extruded is when it is fibrillatable. When a non-fired molded product obtained by paste extrusion shows substantially no strength or elongation (for example, when it shows an elongation of 0% and is broken when stretched), it can be regarded as non-fibrillatable.

The fluoropolymer obtained by the production method of the present disclosure is a powder, the powder preferably has an average particle size (average secondary particle size) of 100 to 2,000 μm. The lower limit of the average secondary particle size is more preferably 200 μm or more, and still more preferably 300 μm or more. The upper limit of the average secondary particle size is preferably 1,000 μm or less, more preferably 800 μm or less, and particularly preferably 700 μm or less. The average particle size is a value measured in conformity with JIS K 6891.

The powder may contain a hydrocarbon surfactant. The powder is preferably substantially free from a hydrocarbon surfactant. The term "substantially free from hydrocarbon surfactant" in the powder as used herein means that the fluorine-containing surfactant is 10 ppm or less based on the powder. The content of the hydrocarbon surfactant is preferably 1 ppm or less, more preferably 100 ppb or less, further preferably 10 ppb or less, and further preferably 1 ppb or less.

The amount of the hydrocarbon surfactant can be determined, for example, by extracting the powder with a mixed aqueous solution of water and methanol (1/1 vol), removing methanol from the extracted liquid obtained using an evaporator, and measuring the amount with a high performance liquid chromatography (HPLC) analyzer.

The powder is preferably substantially free from a fluorine-containing surfactant. The term "substantially free of fluorine-containing surfactant" in the powder as used herein means that the fluorine-containing surfactant is 10 ppm or less based on the powder. The content of the fluorine-containing surfactant is preferably 1 ppm or less, more preferably 100 ppb or less, still more preferably 10 ppb or less, further preferably 1 ppb or less, and particularly preferably the fluorine-containing surfactant is equal to or below the detection limit as measured by liquid chromatography-mass spectrometry (LC/MS/MS).

The amount of the fluorine-containing surfactant can be determined by a known method. For example, it can be determined by LC/MS/MS analysis. First, the resulting powder is extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The resulting powder is subjected to Soxhlet extraction with methanol, and the extracted liquid is subjected to LC/MS/MS analysis for quantitative measurement.

That is, the content of the fluorine-containing surfactant can be quantified by, for example, LC/MS/MS analysis. First, extraction is performed by adding the obtained powder to methanol, and the obtained extracted liquid is subjected to LC/MS/MS analysis. In order to further improve the extraction efficiency, treatment by Soxhlet extraction, ultrasonic treatment or the like may be performed. The molecular weight information is extracted from the LC/MS/MS spectrum obtained to confirm agreement with the structural formula of the candidate fluorine-containing surfactant. Thereafter, aqueous solutions having five or more different concentration levels of the confirmed fluorine-containing surfactant are prepared, LC/MS/MS analysis is performed for aqueous solutions of each concentration level, and the relationship between the content and the area for the content is plotted to draw a calibration curve. Then, using the calibration curve, the area of the LC/MS/MS chromatogram of the fluorine-containing surfactant in the extracted liquid can be converted into the content of the fluorine-containing surfactant.

The fluorine-containing surfactant is the same as those exemplified in the production method described above. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant include compounds represented by the general formula ($N^0$), and specific examples thereof include compounds represented by the general formula ($N^1$), compounds represented by the general formula ($N^2$), compounds represented by the general formula ($N^3$), compounds represented by the general formula ($N^4$), and compounds represented by the general formula ($N^5$) More specific examples thereof include a perfluorocarboxylic acid (I) represented by the general formula (I), an ω—H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω—H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the general formula (XIII).

In the production method of the present disclosure, the hydrocarbon surfactant, decomposition products and by-products of the hydrocarbon surfactant by-produced by the hydrocarbon surfactant, residual monomers, and the like may be collected from discharge water generated in the coagulation or the washing and/or from off gas generated in the drying, and then purified to reuse the hydrocarbon surfactant, the decomposition products and by-products of the hydrocarbon surfactant by-produced by the hydrocarbon surfactant, the residual monomers, and the like. The collection and the purification may be performed by known methods, although not limited thereto. For example, they may be performed by the methods disclosed in National Publication of International Patent Application No. 2011-520020.

The collection of the hydrocarbon surfactant, the decomposition products and by-products of the hydrocarbon surfactant by-produced by the hydrocarbon surfactant, the residual monomers, and the like from discharge water generated in the coagulation, discharge water generated in the washing, and off gas generated in the drying and the purification thereof may be performed by any known methods, although not limited thereto, such as the methods disclosed in U.S. patent application publication No. 2007/15937, U.S. patent application publication No. 2007/25902, and U.S. patent application publication No. 2007/27251. Specific examples of the methods are as follows.

An example of the method of collecting the hydrocarbon surfactant, the decomposition products and by-products of the hydrocarbon surfactant by-produced by the hydrocarbon surfactant, the residual monomers, and the like from discharge water is a method in which the discharge water is brought into contact with adsorbent particles formed of ion exchange resin, activated carbon, silica gel, clay, zeolite, or the like, so that the particles are allowed to adsorb the hydrocarbon surfactant and the others, and then the discharge water and the adsorbent particles are separated. Incinerating the adsorbent particles having adsorbed the hydrocarbon surfactant and the others can prevent emission of the hydrocarbon surfactant and the others into the environment.

Alternatively, the hydrocarbon surfactant and the others may be removed and eluted by a known method from the ion exchange resin particles having adsorbed the hydrocarbon surfactant and the others, and collected. For example, in the case of using anion exchange resin particles as the ion exchange resin particles, the surfactant and the others can be eluted by bringing a mineral acid into contact with an anion exchange resin. Subsequently, when a water-soluble organic solvent is added to the resulting eluate, the mixture is usually separated into two phases. Since the lower phase contains the hydrocarbon surfactant and the others, it is possible to collect the hydrocarbon surfactant and the others by collecting and neutralizing the lower phase. Examples of the water-soluble organic solvent include polar solvents such as alcohols, ketones, and ethers.

Other methods of collecting the hydrocarbon surfactant and the others from ion exchange resin particles include a method of using an ammonium salt and a water-soluble organic solvent and a method of using an alcohol and, if necessary, an acid. In the latter method, ester derivatives of the surfactant and the others are generated, and they can easily be separated from the alcohol by distillation.

When the discharge water contains fluoropolymer particles and other solids, they are preferably removed before the discharge water and the adsorbent particles are brought into contact with each other. Examples of methods of removing the fluoropolymer particles and other solids include a method of adding an aluminum salt, for example, to deposit these components, and then separating the discharge water and the deposits, and an electrocoagulation method. The components may also be removed by a mechanical method, and examples thereof include a cross-flow filtration method, a depth filtration method, and a precoat filtration method.

From the viewpoint of productivity, the discharge water preferably contains the fluoropolymer in a non-agglomerated form in a low concentration, more preferably less than 0.4% by mass, and particularly preferably less than 0.3% by mass.

An example of the method of collecting the hydrocarbon surfactant and the others from the off gas is a method in which a scrubber is brought into contact with deionized water, an alkaline aqueous solution, an organic solvent such as a glycol ether solvent, or the like to provide a scrubber solution containing the surfactant and the others. When the alkaline aqueous solution used is a highly concentrated alkaline aqueous solution, the scrubber solution can be collected in a state where the surfactant and the others are phase-separated, and thus the surfactant and the others can be easily collected and reused. Examples of the alkali compound include alkali metal hydroxides and quaternary ammonium salts.

The scrubber solution containing the hydrocarbon surfactant and the others may be concentrated using a reverse osmosis membrane, for example. The concentrated scrubber solution usually contains fluoride ions. Still, the fluoride ions may be removed by adding alumina after the concentration so that the surfactant and the others can easily be reused. Alternatively, the scrubber solution may be brought into contact with adsorbent particles so that the adsorbent particles can adsorb the hydrocarbon surfactant and the others, and thereby the hydrocarbon surfactant and the others may be collected by the aforementioned method.

The hydrocarbon surfactant and the others collected by any of the methods may be reused in the production of fluoropolymer.

The fluoropolymers that can be obtained by the production method of the present disclosure will be described in detail below.

Examples of the fluoropolymer obtained by the production method of the present disclosure include a TFE polymer in which TFE is the monomer having the highest mole fraction (hereinafter, "most abundant monomer") among the monomers in the polymer, a VDF polymer in which VDF is the most abundant monomer, and a CTFE polymer in which CTFE is the most abundant monomer. Hereinafter, more preferred embodiments will be described for each fluoropolymer.

The TFE polymer may suitably be a TFE homopolymer, or may be a copolymer containing (1) TFE, (2) one or two or more fluorine-containing monomers each of which is different from TFE and has 2 to 8 carbon atoms, in particular VDF, HFP, or CTFE, and (3) another monomer. Examples of (3) the another monomer include fluoro(alkyl vinyl ethers) having an alkyl group having 1 to 5 carbon atoms, particularly 1 to 3 carbon atoms; fluorodioxoles; perfluoroalkyl ethylenes; and ω-hydroperfluoroolefins.

The TFE polymer may also be a copolymer of TFE and one or two or more fluorine-free monomers. Examples of the fluorine-free monomers include alkenes such as ethylene and propylene; vinyl esters; and vinyl ethers. The TFE polymer may also be a copolymer of TFE, one or two or more fluorine-containing monomers having 2 to 8 carbon atoms, and one or two or more fluorine-free monomers.

The VDF polymer may suitably be a VDF homopolymer (PVDF), or may be a copolymer containing (1) VDF, (2) one or two or more fluoroolefins each of which is different from VDF and has 2 to 8 carbon atoms, in particular TFE, HFP, or CTFE, and (3) a perfluoro(alkyl vinyl ether) having an alkyl group having 1 to 5 carbon atoms, particularly 1 to 3 carbon atoms, or the like.

The CTFE polymer may suitably be a CTFE homopolymer, or may be a copolymer containing (1) CTFE, (2) one or two or more fluoroolefins each of which is different from CTFE and has 2 to 8 carbon atoms, in particular TFE or HFP, and (3) a perfluoro(alkyl vinyl ether) having an alkyl group having 1 to 5 carbon atoms, particularly 1 to 3 carbon atoms.

The CTFE polymer may also be a copolymer of CTFE and one or two or more fluorine-free monomers, and examples of the fluorine-free monomers include alkenes such as ethylene and propylene; vinyl esters; and vinyl ethers.

The fluoropolymer produced by the production method of the present disclosure may be vitreous, plastic, or elastomeric. The fluoropolymer is amorphous or partially crystallized, and may be subjected to compression firing, melt fabrication, or non-melt fabrication.

With the production method of the present disclosure, it is possible to suitably produce (I) non melt-processible fluororesins, including tetrafluoroethylene polymers (TFE polymers (PTFE)); (II) melt-fabricable fluororesins, including ethylene/TFE copolymers (ETFE), TFE/HFP copolymers (FEP), TFE/perfluoro(alkyl vinyl ether) copolymers (e.g., PFA, MFA), TFE/perfluoroallyl ether copolymer, TFE/VDF copolymer, and electrolyte polymer precursor; and (III) fluoroelastomer, including TFE/propylene copolymers, TFE/propylene/third monomer copolymers (the third monomer is VDF, HFP, CTFE, fluoroalkyl vinyl ethers, or the like), copolymers of TFE and fluoroalkyl vinyl ethers; HFP/ethylene copolymers, HFP/ethylene/TFE copolymers; PVDF; thermoplastic elastomers such as VDF/HFP copolymers, HFP/ethylene copolymers, and VDF/TFE/HFP copolymers; and fluorine-containing segmented polymers described in Japanese Patent Publication No. 61-49327.

The fluoropolymer is preferably a fluororesin, more preferably a fluororesin having a fluorine substitution percentage, calculated by the following formula, of 50% or higher, still more preferably a fluororesin having the fluorine substitution percentage of higher than 50%, further preferably a fluororesin having the fluorine substitution percentage of 55% or higher, further preferably a fluororesin having the fluorine substitution percentage of 60% or higher, further preferably a fluororesin having the fluorine substitution percentage of 75% or higher, particularly preferably a fluororesin having the fluorine substitution percentage of 80% or higher, and most preferably a fluororesin having the fluorine substitution percentage of 90 to 100%, i.e., a perfluororesin.

(Formula)

Fluorine substitution percentage (%)=(number of fluorine atoms bonded to carbon atoms constituting fluoropolymer)/((number of hydrogen atoms bonded to carbon atoms constituting fluoropolymer)+(number of fluorine atoms and chlorine atoms bonded to carbon atoms constituting fluoropolymer))×100

The perfluororesin is more preferably a fluororesin having a fluorine substitution percentage of 95 to 100%, still more preferably PTFE, FEP, or PFA, particularly preferably PTFE, and still further preferably high-molecular-weight PTFE. In other words, in the production method of the present disclosure, the fluoropolymer is preferably PTFE, and more preferably high-molecular-weight PTFE.

The fluoropolymer may have a core-shell structure. An example of the fluoropolymer having a core-shell structure is a PTFE including a core of high-molecular-weight PTFE and a shell of a lower-molecular-weight PTFE or a modified PTFE in the particle. An example of such a PTFE is PTFE disclosed in National Publication of International Patent Application No. 2005-527652.

The core-shell structure may have the following structures.

| | |
|---|---|
| Core: TFE homopolymer | Shell: TFE homopolymer |
| Core: modified PTFE | Shell: TFE homopolymer |
| Core: modified PTFE | Shell: modified PTFE |
| Core: TFE homopolymer | Shell: modified PTFE |
| Core: low-molecular-weight PTFE | Shell: high-molecular-weight PTFE |
| Core: high-molecular-weight PTFE | Shell: low-molecular-weight PTFE |

In the fluoropolymer having a core-shell structure, the lower limit of the proportion of the core is preferably 0.5% by mass, more preferably 1.0% by mass, still more preferably 3.0% by mass, particularly preferably 5.0% by mass, and most preferably 10.0% by mass. The upper limit of the proportion of the core is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having a core-shell structure, the lower limit of the proportion of the shell is preferably 0.5% by mass, more preferably 1.0% by mass, still more preferably 3.0% by mass, particularly preferably 5.0% by mass, and most preferably 10.0% by mass. The upper limit of the proportion of the shell is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having a core-shell structure, the core or the shell may be composed of two or more layers. For example, the fluoropolymer may have a trilayer structure including a core center portion of a PTFE, a core outer layer portion of a TFE homopolymer, and a shell of a modified PTFE. An example of a fluoropolymer having such a trilayer structure is PTFE disclosed in International Publication No. WO2006/054612.

The above-mentioned (I) non melt-processible fluororesin and (II) melt-fabricable fluororesin suitably produced by the production method of the present disclosure are preferably produced by the following embodiments.

(I) Non Melt-Processible Fluororesins [PTFE]

In the production method of the present disclosure, the polymerization of TFE is usually performed at a polymerization temperature of 10 to 150° C. and a polymerization pressure of 0.05 to 5 MPaG. For example, the polymerization temperature is more preferably 30° C. or higher, and still more preferably 50° C. or higher. Further, the polymerization temperature is more preferably 120° C. or lower, and still more preferably 100° C. or lower. Further, the polymerization pressure is more preferably 0.3 MPaG or higher, still more preferably 0.5 MPaG or higher, and more preferably 5.0 MPaG or lower, still more preferably 3.0 MPaG or lower. In particular, from the viewpoint of improving the yield of fluoropolymer, the polymerization pressure is preferably 1.0 MPaG or more, more preferably 1.2 MPaG or more, still more preferably 1.5 MPaG or more, and more preferably 2.0 MPaG or more.

In an embodiment, the polymerization reaction is initiated by charging pure water into a pressure-resistant reaction vessel equipped with a stirrer, deoxidizing the system, charging TFE, increasing the temperature to a predetermined level, and adding a polymerization initiator. When the pressure decreases as the reaction progresses, additional TFE is fed continuously or intermittently to maintain the initial pressure. When the amount of TFE fed reaches a predetermined level, feeding is stopped, and then TFE in the reaction vessel is purged and the temperature is returned to room temperature, whereby the reaction is completed. Additional TFE may be added continuously or intermittently to prevent pressure drop.

In production of the TFE polymer (PTFE), various known modifying monomers may be used in combination. In the present specification, the PTFE is a concept including not only a TFE homopolymer but also a copolymer of TFE and a modifying monomer, which is non melt-processible (hereinafter referred to as "modified PTFE").

The PTFE may be a TFE homopolymer, or may be a modified PTFE containing 99.0% by mass or more of a polymerized unit based on TFE and 1.0% by mass or less of a polymerized unit based on a modifying monomer.

The modified PTFE preferably has a polymerized unit based on the modifying monomer (hereinafter, also referred to as "modifying monomer unit") in the range of 0.00001 to 1.0% by mass. The lower limit of the modifying monomer unit is more preferably 0.0001% by mass, more preferably 0.0005% by mass, and still more preferably 0.001% by mass. The upper limit of the modifying monomer unit is preferably 0.90% by mass, more preferably 0.50% by mass, still more preferably 0.40% by mass, further preferably 0.30% by mass, still further preferably 0.10% by mass, particularly preferably 0.08% by mass, particularly preferably 0.05% by mass, and particularly preferably 0.01% by mass.

The term "modifying monomer unit" as used herein means a portion of the molecular structure of PTFE as a part derived from the modifying monomer.

The contents of the respective monomer units constituting PTFE can be calculated herein by any appropriate combination of NMR, FT-IR, elemental analysis, and X-ray fluorescence analysis in accordance with the types of the monomers.

Further, the contents of respective monomer units constituting PTFE can also be obtained by calculation from the amount of the modifying monomer added used for the polymerization.

The modifying monomer may be any modifying monomer copolymerizable with TFE, and examples thereof include perfluoroolefins such as hexafluoropropylene (HFP); hydrogen-containing fluoroolefins such as trifluoroethylene and vinylidene fluoride (VDF); perhaloolefins such as chlorotrifluoroethylene; perfluorovinyl ethers; (perfluoroalkyl) ethylenes; and ethylene. The modifying monomer to be used may be one kind or a plurality of kinds.

Examples of the modifying monomer include perhaloolefins such as HFP, CTFE, and perfluorovinyl ether; fluoro (alkyl vinyl ether) having an alkyl group having 1 to 5 carbon atoms, particularly 1 to 3 carbon atoms; cyclic fluorinated monomers such as fluorodioxol; perhaloalkylethylenes such as (perfluoroalkyl)ethylene; and ω-hydroperhaloolefins. The modifying monomer can be supplied by initial batch addition or continuous or intermittent divided addition depending on the purpose and the supply of TFE.

Examples of the modifying monomer include fluoromonomers and non-fluoromonomers.

Examples of the non-fluoromonomer include, but not limited to, a monomer represented by the general formula:

$$CH_2{=}CR^{Q1}\text{-}LR^{Q2}$$

wherein $R^{Q1}$ represents a hydrogen atom or an alkyl group; L represents a single bond, —CO—O—*, —O—CO—*, or —O—; * represents a bonding position with the $R^{Q2}$; and $R^{Q2}$ represents a hydrogen atom, an alkyl group, or a nitrile group.

Examples of the non-fluoromonomer include methyl acrylate, methyl methacrylate, ethyl acrylate, ethyl methacrylate, propyl acrylate, propyl methacrylate butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, the non-fluoromonomer is preferably butyl methacrylate, vinyl acetate, or acrylic acid.

Examples of the fluoromonomer include perfluoroolefins such as hexafluoropropylene (HFP); hydrogen-containing fluoroolefins such as trifluoroethylene and vinylidene fluoride (VDF); perhaloolefins such as chlorotrifluoroethylene; perfluorovinyl ethers; (perfluoroalkyl)ethylenes; and perfluoroallyl ethers.

Examples of the perfluorovinyl ether include, but not limited to, a perfluoro unsaturated compound represented by the following general formula (A): $CF_2{=}CF{-}ORf$ (A)

wherein Rf represents a perfluoroorganic group. The "perfluoroorganic group" as used herein means an organic group in which all hydrogen atoms bonded to the carbon atoms are replaced with fluorine atoms. The perfluoroorganic group optionally has ether oxygen.

Examples of the perfluorovinyl ether include perfluoro (alkyl vinyl ether)(PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include those represented by the general formula (A) in which Rf is a perfluoro(alkoxyalkyl) group having 4 to 9 carbon atoms; those in which Rf is a group represented by the following formula:

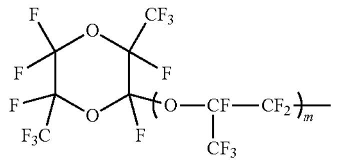

wherein m represents 0 or an integer of 1 to 4; and those in which Rf is a group represented by the following formula:

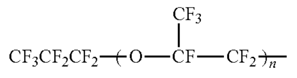

wherein n is an integer of 1 to 4.

Examples of the hydrogen-containing fluoroolefins include $CH_2{=}CF_2$, $CFH{=}CH_2$, $CFH{=}CF_2$, $CF_2{=}CFCF_3$, $CH_2{=}CFCF_3$, $CH_2{=}CHCF_3$, $CHF{=}CHCF_3$(E-form), and $CHF{=}CHCF_3$ (Z-form).

Examples of the (perfluoroalkyl)ethylene (PFAE) include, but are not limited to, (perfluorobutyl)ethylene (PFBE), and (perfluorohexyl)ethylene (PFHE).

Examples of perfluoroallyl ether include a fluoromonomer represented by the general formula: $CF_2{=}CF{-}CF_2{-}ORf$ wherein Rf represents a perfluoroorganic group.

Rf of the general formula is the same as Rf of the general formula (A). Rf is preferably a perfluoroalkyl group having 1 to 10 carbon atoms or a perfluoroalkoxyalkyl group having 1 to 10 carbon atoms. The perfluoroallyl ether is preferably at least one selected from the group consisting of $CF_2{=}CF{-}CF_2{-}O{-}CF_3$, $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, more preferably at least one selected from the group consisting of $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, and still more preferably $CF_2{=}CF{-}CF_2{-}O{-}CF_2CF_2CF_3$.

Preferred examples of the modifying monomer also include a modifying monomer (3) having a monomer reactivity ratio of 0.1 to 8. The presence of the modifying monomer (3) makes it possible to obtain PTFE particles having a small particle size, and to thereby obtain an aqueous dispersion having high dispersion stability.

Here, the monomer reactivity ratio in copolymerization with TFE is a value obtained by dividing the rate constant in the case that propagating radicals react with TFE by the rate constant in the case that the propagating radicals react with comonomers, in the case that the propagating radicals are less than the repeating unit derived from TFE. A smaller monomer reactivity ratio indicates higher reactivity of the comonomers with TFE. The monomer reactivity ratio can be calculated by determining the compositional features of the polymer produced immediately after the initiation of copolymerization of TFE and comonomers and using the Fineman-Ross equation.

The copolymerization is performed using 3,600 g of deionized degassed water, 1,000 ppm of ammonium perfluorooctanoate based on the water, and 100 g of paraffin wax contained in an autoclave made of stainless steel with an internal volume of 6.0 L at a pressure of 0.78 MPaG and a temperature of 70° C. A comonomer in an amount of 0.05 g, 0.1 g, 0.2 g, 0.5 g, or 1.0 g is added into the reactor, and then 0.072 g of ammonium persulfate (20 ppm based on the water) is added thereto. To maintain the polymerization pressure at 0.78 MPaG, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The compositional features in the resulting polymer are calculated by appropriate combination of NMR, FT-IR, elemental analysis, and X-ray fluorescence analysis depending on the types of the monomers.

The modifying monomer (3) having a monomer reactivity ratio of 0.1 to 8 is preferably at least one selected from the group consisting of comonomers represented by the formulae (3a) to (3d):

$$CH_2{=}CH{-}Rf^1 \quad (3a)$$

wherein $Rf^1$ is a perfluoroalkyl group having 1 to 10 carbon atoms;

$$CF_2{=}CF{-}O{-}Rf^2 \quad (3b)$$

wherein $Rf^2$ is a perfluoroalkyl group having 1 to 2 carbon atoms;

$$CF_2{=}CF{-}O{-}(CF_2)_nCF{=}CF_2 \quad (3c)$$

wherein n is 1 or 2; and (3d)

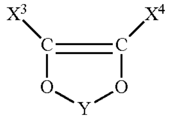

wherein $X^3$ and $X^4$ are each F, Cl, or a methoxy group; and Y is represented by the formula Y1 or Y2;

$$-CF{=}CF- \quad (Y1)$$

(Y2)

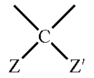

in the formula Y2, Z and Z' are each F or a fluorinated alkyl group having 1 to 3 carbon atoms.

The content of the modifying monomer (3) unit is preferably in the range of 0.00001 to 1.0% by mass based on all polymerized units of PTFE. The lower limit thereof is more preferably 0.0001% by mass, more preferably 0.0005% by mass, still more preferably 0.001% by mass, and the upper limit thereof is preferably 0.90% by mass, more preferably 0.50% by mass, still more preferably 0.40% by mass, further preferably 0.30% by mass, still further preferably 0.10% by mass, particularly preferably 0.08% by mass, particularly preferably 0.05% by mass, and very particularly preferably 0.01% by mass.

The modifying monomer is preferably at least one selected from the group consisting of hexafluoropropylene, vinylidene fluoride, fluoro(alkyl vinyl ether), (perfluoroalkyl)ethylene, ethylene, and modifying monomers having a functional group capable of reacting by radical polymerization and a hydrophilic group, in view of obtaining an aqueous dispersion of modified polytetrafluoroethylene particles having a small average primary particle size, a small aspect ratio of primary particles, and excellent stability. The use of the modifying monomer allows for obtaining an aqueous dispersion of PTFE having a smaller average primary particle size, a smaller aspect ratio of the primary particles, and excellent dispersion stability. Also, an aqueous dispersion having a smaller amount of uncoagulated polymer can be obtained.

From the viewpoint of reactivity with TFE, the modifying monomer preferably contains at least one selected from the group consisting of hexafluoropropylene, perfluoro(alkyl vinyl ether), and (perfluoroalkyl)ethylene.

More preferably, the modifying monomer contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, the perfluoro(alkyl vinyl ether) unit and the (perfluoroalkyl) ethylene unit is preferably in the range of 0.00001 to 1% by mass based on all polymerized units of PTFE. The lower limit of the total amount is more preferably 0.0001% by mass, more preferably 0.0005% by mass, and still more preferably 0.001% by mass. The upper limit thereof is more preferably 0.50% by mass, still more preferably 0.40% by mass, further preferably 0.30% by mass, still further preferably 0.10% by mass, particularly preferably 0.08% by mass, particularly preferably 0.05% by mass, and particularly preferably 0.01% by mass.

It is also preferable that the modifying monomer contains a modifying monomer having a functional group capable of reacting by radical polymerization and a hydrophilic group (hereinafter, referred to as "modifying monomer (A)").

The presence of the modifying monomer (A) makes it possible to obtain PTFE particles having a small primary particle size, and to thereby obtain an aqueous dispersion having high dispersion stability. In addition, the amount of uncoagulated polymer can be reduced. Further, the aspect ratio of the primary particles can be made small.

The amount of the modifying monomer (A) used is preferably an amount exceeding 0.1 ppm of the aqueous medium, more preferably an amount exceeding 0.5 ppm, still more preferably an amount exceeding 1.0 ppm, further preferably 5 ppm or more, and particularly preferably 10 ppm or more. When the amount of the modifying monomer (A) is too small, the average primary particle size of the obtained PTFE may not be reduced.

The amount of the modifying monomer (A) used may be in the above range, but the upper limit may be, for example, 5,000 ppm. Further, in the production method, the modifying monomer (A) may be added to the system during the reaction in order to improve the stability of the aqueous dispersion during or after the reaction.

Since the modifying monomer (A) is highly water-soluble, even if the unreacted modifying monomer (A) remains in the aqueous dispersion, it can be easily removed in the concentration step or the coagulation/washing step.

The modifying monomer (A) is incorporated into the resulting polymer in the process of polymerization, but the concentration of the modifying monomer (A) in the polymerization system itself is low and the amount incorporated into the polymer is small, so that there is no problem that the heat resistance of PTFE is lowered or PTFE is colored after sintering.

Examples of the hydrophilic group in the modifying monomer (A) include $—NH_2$, $—PO_3M$, $—P(O)(OM)_2$, $—OPO_3M$, $—OP(O)(OM)_2$, $—SO_3M$, $—OSO_3M$, and $—COOM$, wherein M represents H, a metal atom, $NR^{7y}_4$, imidazolium optionally having a substituent, pyridinium optionally having a substituent, or phosphonium optionally having a substituent, wherein $R^{7y}$ is H or an organic group, and may be the same or different, and any two thereof may be bonded to each other to form a ring. Of these, the hydrophilic group is preferably $—SO_3M$ or $—COOM$.

The organic group in $R^{7y}$ is preferably an alkyl group. $R^{7y}$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

Examples of the "functional group capable of reacting by radical polymerization" in the modifying monomer (A) include a group having an ethylenically unsaturated bond such as a vinyl group and an allyl group. The group having an ethylenically unsaturated bond may be represented by the following formula:

$$CX^eX^g{=}CX^fR—$$

wherein $X^e$, $X^f$ and $X^g$ are each independently F, Cl, H, $CF_3$, $CF_2H$, $CFH_2$ or $CH_3$; and R is a linking group. Examples of the linking group R include linking groups as $R^a$ which will be described later. Preferred are groups having an unsaturated bond, such as $—CH{=}CH_2$, $—CF{=}CH_2$, $—CH{=}CF_2$, $—CF{=}CF_2$, $—CH_2—CH{=}CH_2$, $—CF_2—CF{=}CH_2$, $—CF_2—CF{=}CF_2$, $—(C{=}O)—CH{=}CH_2$, $—(C{=}O)—CF{=}CH_2$, $—(C{=}O)—CH{=}CF_2$, $—(C{=}O)—CF{=}CF_2$, $—(C{=}O)—C(CH_3){=}CH_2$, $—(C{=}O)—C(CF_3){=}CH_2$, $—(C{=}O)—C(CH_3){=}CF_2$, $—(C{=}O)—C(CF_3){=}CF_2$, $—O—CH_2—CH{=}CH_2$, $—O—CF_2—CF{=}CH_2$, $—O—CH_2—CH{=}CF_2$, and $—O—CF_2—CF{=}CF_2$.

Since the modifying monomer (A) has a functional group capable of reacting by radical polymerization, it is presumed that when used in the polymerization, it reacts with a fluorine-containing monomer at the initial stage of the polymerization reaction and forms particles with high stability having a hydrophilic group derived from the modifying monomer (A). Therefore, it is considered that the number of particles increases when the polymerization is performed in the presence of the modifying monomer (A).

The polymerization may be performed in the presence of one or two or more of the modifying monomers (A).

In the polymerization, a compound having an unsaturated bond may be used as the modifying monomer (A)

The modifying monomer (A) is preferably a compound represented by the general formula (4):

$$CX^iX^k{=}CX^jR^a—(CZ^1Z^2)_k—Y^3 \quad (4)$$

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

Examples of the hydrophilic group include $—NH_2$, $—PO_3M$, $—P(O)(OM)_2$, $—OPO_3M$, $—OP(O)(OM)_2$, $—SO_3M$, $—OSO_3M$, and $—COOM$, wherein M represents H, a metal atom, $NR^7$?4, imidazolium optionally having a substituent, pyridinium optionally having a substituent, or phosphonium optionally having a substituent, wherein $R^{7y}$ is H or an organic group, and may be the same or different, and any two thereof may be bonded to each other to form a ring. Of these, the hydrophilic group is preferably $—SO_3M$ or $—COOM$. The organic group in $R^{7y}$ is preferably an alkyl group. $R^{7y}$ is preferably H or a $C_{1-10}$ organic group, more preferably H or a $C_{1-4}$ organic group, and still more preferably H or a $C_{1-4}$ alkyl group. Examples of the metal atom include monovalent and divalent metal atoms, and examples thereof include alkali metals (Group 1) and alkaline earth metals (Group 2), and preferred is Na, K or Li.

The use of the modifying monomer (A) allows for obtaining an aqueous dispersion having a smaller average primary particle size and superior stability. Also, the aspect ratio of the primary particles can be made smaller.

$R^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, the hydrogen atom bonded to the carbon atom may be replaced with a halogen other than fluorine, such as chlorine, and may or may not contain a double bond. Further, $R^a$ may be linear or branched, and may be cyclic or acyclic. $R^a$ may also contain a functional group (e.g., ester, ether, ketone, amine, halide, etc.).

$R^a$ may also be a fluorine-free divalent organic group or a partially fluorinated or perfluorinated divalent organic group.

$R^a$ may be, for example, a hydrocarbon group in which a fluorine atom is not bonded to a carbon atom, a hydrocarbon group in which some of the hydrogen atoms bonded to a carbon atom are replaced with fluorine atoms, a hydrocarbon group in which all of the hydrogen atoms bonded to the carbon atoms are replaced with fluorine atoms, —(C═O)—, —(C═O)—O—, or a hydrocarbon group containing —(C═O)—, and these groups optionally contain an oxygen atom, optionally contain a double bond, and optionally contain a functional group.

$R^a$ is preferably —(C═O)—, —(C═O)—O—, or a hydrocarbon group having 1 to 100 carbon atoms that optionally contains an ether bond and optionally contains a carbonyl group, wherein some or all of the hydrogen atoms bonded to the carbon atoms in the hydrocarbon group may be replaced with fluorine.

$R^a$ is preferably at least one selected from $—(CH_2)_a—$, $—(CF_2)_a—$, $—O—(CF_2)_a—$, $—(CF_2)_a—O—(CF_2)_b—$, $—O(CF_2)_a—O—(CF_2)_b—$, $—(CF_2)_a—[O—(CF_2)_b]_c—$, $—O(CF_2)_a—[O—(CF_2)_b]_c—$, $—[(CF_2)_a—O]_b—[(CF_2)_c—O]_d—$, $—O[(CF_2)_a—O]_b—[(CF_2)_c—O]_d—$, $—O—[CF_2CF(CF_3)O]_a—(CF_2)_b—$, —(C═O)—, —(C═O)—O—, $—(C═O)—(CH_2)_a—$, $—(C═O)—(CF_2)_a—$, $—(C═O)—O—(CH_2)_a—$, $—(C═O)—O—(CF_2)_a—$, $—(C═O)—[(CH_2)_a—O]_b—$, $—(C═O)—[(CF_2)_a—O]_b—$, $—(C═O)—O[(CH_2)_a—O]_b—$, $—(C═O)—O[(CF_2)_a—O]_b—$, $—(C═O)—O[(CH_2)_a—O]_b—(CH_2)_c—$, $—(C═O)—O[(CF_2)_a—O]_b—(CF_2)_c—$, $—(C═O)—(CH_2)_a—O—(CH_2)_b—$, $—(C═O)—(CF_2)_a—O—(CF_2)_b—$, $—(C═O)—O—(CH_2)_a—O—(CH_2)_b—$, $—(C═O)—O—(CF_2)_a—O—(CF_2)_b—$, $—(C═O)—O—C_6H_4—$, and combinations thereof.

In the formula, a, b, c, and d are independently at least 1 or more. a, b, c and d may independently be 2 or more, 3 or more, 4 or more, 10 or more, or 20 or more. The upper limits of a, b, c, and d are 100, for example.

Specific examples suitable for $R^a$ include $—CF_2—O—$, $—CF_2—O—CF_2—$, $—CF_2—O—CH_2—$, $—CF_2—O—CH_2CF_2—$, $—CF_2—O—CF_2CF_2—$, $—CF_2—O—CF_2CH_2—$, $—CF_2—O—CF_2CF_2CH_2—$, $—CF_2—O—CF(CF_3)—$, $—CF_2—O—CF(CF_3)\ CF_2—$, $—CF_2—O—CF(CF_3)\ CF_2—O—$, $—CF_2—O—CF(CF_3)CH_2—$, —(C═O)—, —(C═O)—O—, $—(C═O)—(CH_2)—$, $—(C═O)—(CF_2)—$, $—(C═O)—O—(CH_2)—$, $—(C═O)—O—(CF_2)—$, $—(C═O)—[(CH_2)_2—O]_n—$, $—(C═O)—[(CF_2)_2—O]_n—$, $—(C═O)—O\ [(CH_2)_2—O]_n—$, $—(C═O)—O\ [(CF_2)_2—O]_n—$, $—(C═O)—O\ [(CH_2)_2—O]_n—(CH_2)—$, $—(C═O)—O\ [(CF_2)_2—O]_n—(CF_2)—$, $—(C═O)—(CH_2)_2—O—(CH_2)—$, $—(C═O)—(CF_2)_2—O—(CF_2)—$, $—(C═O)—O—(CH_2)_2—O—(CH_2)—$, $—(C═O)—O—(CF_2)_2—O—(CF_2)—$, and $—(C═O)—O—C_6H_4—$. In particular, preferred for $R^a$ among these is $—CF_2—O—$, $—CF_2—O—CF_2—$, $—CF_2—O—CF_2CF_2—$, $—CF_2—O—CF(CF_3)—$, $—CF_2—O—CF(CF_3)\ CF_2—$, $—CF_2—O—CF(CF_3)\ CF_2—O—$, —(C═O)—, —(C═O)—O—, $—(C═O)—(CH_2)—$, $—(C═O)—O—(CH_2)—$, $—(C═O)—O[(CH_2)_2—O]_n—$, $—(C═O)—O[(CH_2)_2—O]_n—(CH_2)—$, $—(C═O)—(CH_2)_2—O—(CH_2)—$, or $—(C═O)—O—C_6H_4—$.

In the formula, n is an integer of 1 to 10.

$—R^a—(CZ^1Z^2)_k$ in the general formula (4) is preferably $—CF_2—O—CF_2—$, $—CF_2—O—CF(CF_3)—$, $—CF_2—O—C(CF_3)_2—$, $—CF_2—O—CF_2—CF_2—$, $—CF_2—O—CF_2—CF(CF_3)—$, $—CF_2—O—CF_2—C(CF_3)_2—$, $—CF_2—O—CF_2CF_2—CF_2—$, $—CF_2—O—CF_2CF_2—CF(CF_3)—$, $—CF_2—O—CF_2CF_2—C(CF_3)_2—$, $—CF_2—O—CF(CF_3)—CF_2—$, $—CF_2—O—CF(CF_3)—CF(CF_3)—$, $—CF_2—O—CF(CF_3)—C(CF_3)_2—$, $—CF_2—O—CF(CF_3)—CF_2—$, $—CF_2—O—CF(CF_3)—CF(CF_3)—$, $—CF_2—O—CF(CF_3)—C(CF_3)_2—$, $—CF_2—O—CF(CF_3)\ CF_2—CF_2—$, $—CF_2—O—CF(CF_3)\ CF_2—CF(CF_3)—$, $—CF_2—O—CF(CF_3)\ CF_2—C(CF_3)_2—$, $—CF_2—O—CF(CF_3)\ CF_2—O—CF_2—$, $—CF_2—O—CF(CF_3)\ CF_2—O—CF(CF_3)—$, $—CF_2—O—CF(CF_3)\ CF_2—O—C(CF_3)_2—$, —(C═O)—, —(C═O)—O—, $—(C═O)—(CH_2)—$, $—(C═O)—(CF_2)—$, $—(C═O)—O—(CH_2)—$, $—(C═O)—O—(CF_2)—$, $—(C═O)—[(CH_2)_2—O]_n—(CH_2)—$, $—(C═O)—[(CF_2)_2—O]_n—(CF_2)—$, $—(C═O)—[(CH_2)_2—O]_n—(CH_2)—(CH_2)—$, $—(C═O)—[(CF_2)_2—O]_n—(CF_2)—(CF_2)—$, $—(C═O)—O[(CH_2)_2—O]_n—(CF_2)—$, $—(C═O)—O[(CH_2)_2—O]_n—(CH_2)—(CH_2)—$, $—(C═O)—O[(CF_2)_2—O]_n—(CF_2)—$, $—(C═O)—O[(CF_2)_2—O]_n—(CF_2)—(CF_2)—$, $—(C═O)—(CH_2)_2—O—(CH_2)—(CH_2)—$, $—(C═O)—(CF_2)_2—O—(CF_2)—(CF_2)—$, $—(C═O)—O—(CH_2)_2—O—(CH_2)—(CH_2)—$, $—(C═O)—O—(CF_2)_2—O—(CF_2)—(CF_2)—$, $—(C═O)—O—(CH_2)_2—O—(CH_2)—C(CF_3)_2—$, $—(C═O)—O—(CF_2)_2—O—(CF_2)—C(CF_3)_2—$, or $—(C═O)—O—C_6H_4—C(CF_3)_2—$, and is more preferably $—CF_2—O—CF(CF_3)—$, $—CF_2—O—CF_2—CF(CF_3)—$, $—CF_2—O—CF_2CF_2—CF(CF_3)—$, $—CF_2—O—CF(CF_3)—CF(CF_3)—$, $—CF_2—O—CF(CF_3)\ CF_2—CF(CF_3)—$, $—CF_2—O—CF(CF_3)\ CF_2—O—CF(CF_3)—$, —(C═O)—, $—(C═O)—O—(CH_2)—$, $—(C═O)—O—(CH_2)—(CH_2)—$, $—(C═O)—O[(CH_2)_2—O]_n—(CH_2)—(CH_2)—$, $—(C═O)—O—(CH_2)_2—O—(CH_2)—C(CF_3)_2—$, or $—(C═O)—O—C_6H_4—C(CF_3)_2—$.

In the formula, n is an integer of 1 to 10.

Specific examples of the compound represented by the general formula (4) include compounds represented by the following formulas:

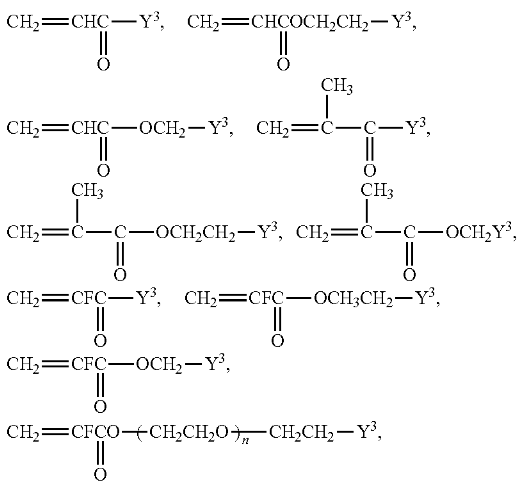

-continued

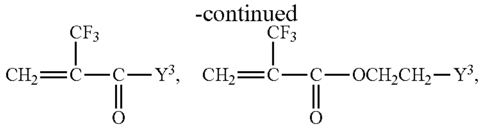

(i)

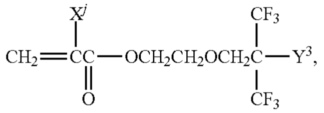

(ii)

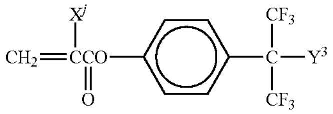

wherein $X^j$ and $Y^3$ are as described above; and n is an integer of 1 to 10.

$R^a$ is preferably a divalent group represented by the following general formula (r1):

$$(C{=}O)_h{-}(O)_i{-}CF_2{-}O{-}(CX^6{}_2)_e{-}\{O{-}CF(CF_3)\}_f{-}(O)_g{-} \quad (r1)$$

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the following general formula (r2):

$$(C{=}O)_h{-}(O)_i{-}CF_2{-}O{-}(CX^7{}_2)_e{-}(O)_g{-} \quad (r2)$$

wherein $X^7$ is each independently H, F, or $CF_3$; e is an integer of 0 to 3; g is 0 or 1; h is 0 or 1; and i is 0 or 1.

$—R^a—(CZ^1Z^2)_k—$ in the general formula (4) is also preferably a divalent group represented by the following formula (t1):

$$(C{=}O)_h{-}(O)_i{-}CF_2{-}O{-}(CX^6{}_2)_e{-}\{O{-}CF(CF_3)\}_f{-}(O)_g{-}CZ^1Z^2{-} \quad (t1)$$

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t1).

Also, in the general formula (4), $—R^a—(CZ^1Z^2)_k—$ is preferably a divalent group represented by the following formula (t2):

$$(C{=}O)_h{-}(O)_i{-}CF_2{-}O{-}(CX^7{}_2)_e{-}(O)_g{-}CZ^1Z^2{-} \quad (t2)$$

wherein $X^7$ is each independently H, F, or $CF_3$; e is an integer of 0 to 3; g is 0 or 1; h is 0 or 1; i is 0 or 1; and $Z^1$ and $Z^2$ are each independently F, or $CF_3$, and is more preferably a group in which one of $Z^1$ and $Z^2$ is F and the other is $CF_3$ in the formula (t2).

The compound represented by the general formula (4) also preferably has a C—F bond and does not have a C—H bond, in the portion excluding the hydrophilic group ($Y^3$). In other words, in the general formula (4), $X^i$, $X^j$, and $X^k$ are all F, and $R^a$ is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

$$CF_2{=}CF{-}O{-}Rf^0{-}Y^3 \quad (4a)$$

wherein $Y^3$ is a hydrophilic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

$$CH_2{=}CH{-}O{-}Rf^0{-}Y^3 \quad (4b)$$

wherein $Y^3$ is a hydrophilic group; and $Rf^0$ is a perfluorinated divalent linking group as defined in the formula (4a).

In the general formula (4), $Y^3$ is preferably $—OSO_3M$. Examples of the compound represented by the general formula (4) when $Y^3$ is $—OSO_3M$ include $CF_2{=}CF(OCF_2CF_2CH_2OSO_3M)$, $CH_2{=}CH((CF_2)_4CH_2OSO_3M)$, $CF_2{=}CF(O(CF_2)_4CH_2OSO_3M)$, $CF_2{=}CF(OCF_2CF(CF_3)CH_2OSO_3M)$, $CF_2{=}CF(OCF_2CF(CF_3)OCF_2CF_2CH_2OSO_3M)$, $CH_2{=}CH((CF_2)_4CH_2OSO_3M)$, $CF_2{=}CF(OCF_2CF_2SO_2N(CH_3)CH_2CH_2OSO_3M)$, $CH_2{=}CH(CF_2CF_2CH_2OSO_3M)$, $CF_2{=}CF(OCF_2CF_2CF_2CF_2SO_2N(CH_3)CH_2CH_2OSO_3M)$, and $CH_2{=}CH(CF_2CF_2CH_2OSO_3M)$. In the formula, M is as described above.

In the general formula (4), $Y^3$ is preferably $—SO_3M$. Examples of the compound represented by the general formula (4) when $Y^3$ is $—SO_3M$ include $CF_2{=}CF(OCF_2CF_2SO_3M)$, $CF_2{=}CF(O(CF_2)_4SO_3M)$, $CF_2{=}CF(OCF_2CF(CF_3)SO_3M)$, $CF_2{=}CF(OCF_2CF(CF_3)OCF_2CF_2SO_3M)$, $CH_2{=}CH(CF_2CF_2SO_3M)$, $CF_2{=}CF(OCF_2CF(CF_3)OCF_2CF_2CF_2CF_2SO_3M)$, $CH_2{=}CH((CF_2)_4SO_3M)$, $CH_2{=}CH(CF_2CF_2SO_3M)$, and $CH_2{=}CH((CF_2)_3SO_3M)$. In the formula, M is as described above.

In the general formula (4), $Y^3$ is preferably $—COOM$. Examples of the compound represented by the general formula (4) when $Y^3$ is $—COOM$ include $CF_2{=}CF(OCF_2CF_2COOM)$, $CF_2{=}CF(OCF_2CF_2CF_2COOM)$, $CF_2{=}CF(O(CF_2)_5COOM)$, $CF_2{=}CF(OCF_2CF(CF_3)COOM)$, $CF_2{=}CF(OCF_2CF(CF_3)O(CF_2)_nCOOM)$(n is greater than 1), $CH_2{=}CH(CF_2CF_2COOM)$, $CH_2{=}CH((CF_2)_4COOM)$, $CH_2{=}CH(CF_2CF_2COOM)$, $CH_2{=}CH((CF_2)_3COOM)$, $CF_2{=}CF(OCF_2CF_2SO_2NR'CH_2COOM)$, $CF_2{=}CF(O(CF_2)_4SO_2NR'CH_2COOM)$, $CF_2{=}CF(OCF_2CF(CF_3)SO_2NR'CH_2COOM)$, $CF_2{=}CF(OCF_2CF(CF_3)OCF_2CF_2SO_2NR'CH_2COOM)$, $CH_2{=}CH(CF_2CF_2SO_2NR'CH_2COOM)$, $CF_2{=}CF(OCF_2CF(CF_3)OCF_2CF_2CF_2CF_2SO_2NR'CH_2COOM)$, $CH_2{=}CH((CF_2)_4SO_2NR'CH_2COOM)$, $CH_2{=}CH(CF_2CF_2SO_2NR'CH_2COOM)$, and $CH_2{=}CH((CF_2)_3SO_2NR'CH_2COOM)$. In the formula, R' is H or an alkyl group having 1 to 4 carbon atoms, and M is as described above. In the formula, R' is H or a $C_{1-4}$ alkyl group, and M is as described above.

In a preferred embodiment, in the general formula (4), $Y^3$ is $—OPO_3M$ or $—OP(O)(OM)_2$. Examples of the compound represented by the general formula (4) when $Y^3$ is $—OPO_3M$ or $—OP(O)(OM)_2$ include $CF_2{=}CF$ $(OCF_2CF_2CH_2OP(O)(OM)_2)$, $CF_2{=}CF(O(CF_2)_4CH_2OP(O)(OM)_2)$, $CF_2{=}CF(OCF_2CF(CF_3)CH_2OP(O)(OM)_2)$, $CF_2{=}CF(OCF_2CF(CF_3)OCF_2CF_2CH_2OP(O)(OM)_2)$, $CF_2{=}CF(OCF_2CF_2SO_2N(CH_3)CH_2CH_2OP(O)(OM)_2)$, $CF_2{=}CF(OCF_2CF_2CF_2CF_2SO_2N(CH_3)CH_2CH_2OP(O)(OM)_2)$, $CH_2{=}CH(CF_2CF_2CH_2OP(O)(OM)_2$, $CH_2{=}CH((CF_2)_4CH_2OP(O)(OM)_2)$, $CH_2{=}CH(CF_2CF_2CH_2OP(O)(OM)_2)$, and $CH_2{=}CH((CF_2)_3CH_2OP(O)(OM)_2)$. In the formula, M is as described above.

In a preferred embodiment, in the general formula (4), $Y^3$ is $-PO_3M$ or $—P(O)(OM)_2$. Examples of the compound represented by the general formula (4A) when $Y^3$ is $—PO_3M$ or $—P(O)(OM)_2$ include $CF_2{=}CF(OCF_2CF_2P(O)(OM)_2)$, $CF_2{=}CF(O(CF_2)_4P(O)(OM)_2)$, $CF_2{=}CF(OCF_2CF(CF_3)P(O)(OM)_2)$, $CF_2{=}CF(OCF_2CF(CF_3)OCF_2CF_2P(O)(OM)_2)$, $CH_2{=}CH(CF_2CF_2P(O)(OM)_2)$, $CH_2{=}CH((CF_2)_4P(O)(OM)_2)$, $CH_2{=}CH(CF_2CF_2P(O)(OM)_2)$, and $CH_2{=}CH((CF_2)_3P(O)(OM)_2)$, and in the formula, M is the same as above.

The compound represented by the general formula (4) is preferably at least one selected from the group consisting of:

a monomer represented by the following general formula (5):

$$CX_2{=}CY(—CZ_2—O—Rf—Y^3) \quad (5)$$

wherein X is the same or different and is —H or —F; Y is —H, —F, an alkyl group, or a fluorine-containing alkyl group; Z is the same or different and —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above;

a monomer represented by the following general formula (6):

$$CX_2{=}CY(—O—Rf—Y^3) \quad (6)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above; and a monomer represented by the following general formula (7):

$$CX_2{=}CY(—Rf—Y^3) \quad (7)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above.

The fluorine-containing alkylene group having 2 to 100 carbon atoms and having an ether bond is an alkylene group which does not include a structure in which an oxygen atom is an end and contains an ether bond between carbon atoms.

In the general formula (5), each X is —H or —F. X may be both —H, may be both —F, or at least one thereof may be —H. For example, one thereof may be —F and the other may be —H, or both may be —H.

In the general formula (5), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or $—CF_3$, and more preferably —F.

In the general formula (5), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or $—CF_3$, and more preferably —F.

In the general formula (5), at least one of X, Y, and Z preferably contains a fluorine atom. For example, X, Y, and Z may be —H, —F, and —F, respectively.

In the general formula (5), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include $—CF_2—$, $—CH_2CF_2—$, $—CF_2CF_2—$, $—CF_2CH_2—$, $—CF_2CF_2CH_2—$, $—CF(CF_3)—$, $—CF(CF_3)CF_2—$, and $—CF(CF_3)CH_2—$. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less carbon atoms, more preferably 30 or less carbon atoms, and still more preferably 12 or less carbon atoms.

The fluorine-containing alkylene group having an ether bond is also preferably a divalent group represented by the following formula:

$$—(\underset{Z^1}{\underset{|}{C}}FCF_2O)_{p1}—(CF_2O)_{q1}—(CZ^2{}_2CF_2CF_2O)_{r1}—\underset{Z^4}{\underset{|}{C}}Z^3—(CF_2)_{s1}—(CH_2)_{t1}—$$

wherein $Z^1$ is F or $CF_3$; $Z^2$ and $Z^3$ are each H or F; $Z^4$ is H, F, or $CF_3$; p1+q1+r1 is an integer of 1 to 10; s1 is 0 or 1; and t1 is an integer of 0 to 5.

Specific examples of the fluorine-containing alkylene group having an ether bond include $—CF(CF_3)CF_2—O—CF(CF_3)—$, $—(CF(CF_3)CF_2—O)_n—CF(CF_3)—$ (wherein n is an integer of 1 to 10), $—CF(CF_3)CF_2—O—CF(CF_3)CH_2—$, $—(CF(CF_3)CF_2—O)_n—CF(CF_3)CH_2-$ (wherein n is an integer of 1 to 10), $—CH_2CF_2CF_2O—CH_2CF_2CH_2—$, $—CF_2CF_2CF_2O—CF_2CF_2—$, $—CF_2CF_2CF_2O—CF_2CF_2CH_2—$, $—CF_2CF_2O—CF_2—$, and $—CF_2CF_2O—$ $CF_2CH_2$—. The fluorine-containing alkylene group having an ether bond is preferably a perfluoroalkylene group.

In the general formula (5), $Y^3$ is preferably —COOM, —$SO_3M$, or —$OSO_3M$, wherein M is H, a metal atom, $NR^{7y}_4$, imidazolium optionally having a substituent, pyridinium optionally having a substituent, or phosphonium optionally having a substituent, wherein $R^{7y}$ is H or an organic group and may be the same or different; and any two thereof optionally bind to each other to form a ring.

The organic group in $R^{7y}$ is preferably an alkyl group.

$R^{7y}$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^{7y}_4$, more preferably —H, an alkali metal (Group 1), an alkaline earth metal (Group 2), or —$NR^{7y}_4$, still more preferably —H, —Na, —K, —Li, or —$NH_4$, further preferably —Na, —K, or —$NH_4$, particularly preferably —Na or —$NH_4$, and most preferably —$NH_4$.

$Y^3$ is preferably —COOM or —$SO_3M$, and more preferably —COOM.

The monomer represented by the general formula (5) is preferably a monomer (5a) represented by the following general formula (5a):

$$CH_2{=}CF(—CF_2—O—Rf—Y^3) \quad (5a)$$

wherein Rf and $Y^3$ are as described above.

Specific examples of the monomer represented by the general formula (5a) include a monomer represented by the following formula:

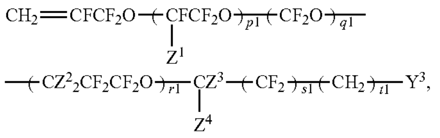

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; and $Y^3$ is as described above, provided that, when both $Z^3$ and $Z^4$ are H, p1+q1+r1+s1 is not 0. More specific examples thereof include:

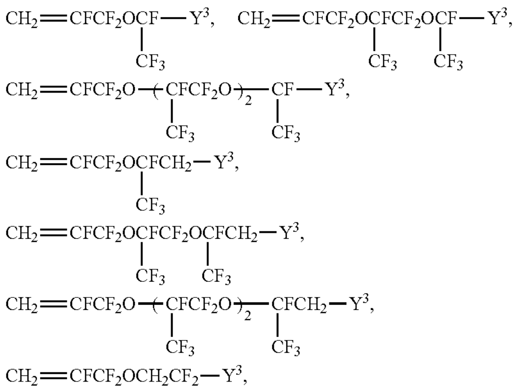

$CH_2{=}CFCF_2OCH_2CF_2—Y^3$, $CH_2{=}CFCF_2O(CH_2CF_2CF_2O)CH_2CF_2—Y^3$, $CH_2{=}CFCF_2OCH_2CF_2CH_2—Y^3$,

-continued $CH_2{=}CFCF_2O(CH_2CF_2CF_2O)CH_2CF_2CH_2—Y^3$, $CH_2{=}CFCF_2OCF_2CF_2—Y^3$, $CH_2{=}CFCF_2O(CF_2CF_2CF_2O)CF_2CF_2—Y^3$, $CH_2{=}CFCF_2OCF_2CF_2CH_2—Y^3$, $CH_2{=}CFCF_2O(CF_2CF_2CF_2O)CF_2CF_2CH_2—Y^3$, $CH_2{=}CFCF_2OCF_2—Y^3$, $CH_2{=}CFCF_2O(CF_2CF_2O)CF_2—Y^3$, $CH_2{=}CFCF_2OCF_2CH_2—Y^3$, $CH_2{=}CFCF_2O(CF_2CF_2O)CF_2CH_2—Y^3$, Of these, preferred are:

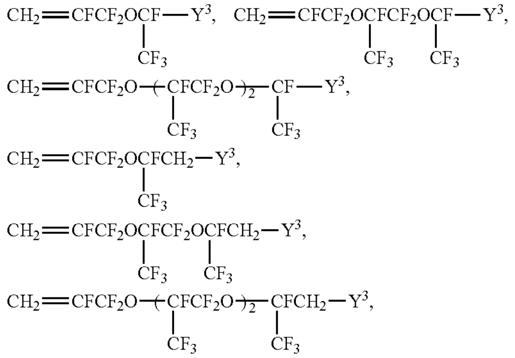

The monomer represented by the general formula (5a) is preferably one in which $Y^3$ in the formula (5a) is —COOM, and in particular, is preferably at least one selected from the group consisting of $CH_2{=}CFCF_2OCF(CF_3)COOM$ and $CH_2{=}CFCF_2OCF(CF_3)CF_2OCF(CF_3)COOM$ (where M is as defined above), and more preferably $CH_2{=}CFCF_2OCF(CF_3)COOM$.

The monomer represented by the general formula (5) is preferably a monomer (5b) represented by the following general formula (5b):

$$CX^2_2{=}CFCF_2—O—(CF(CF_3)CF_{20})_{n5}—CF(CF_3)—Y^3 \quad (5b)$$

wherein each $X^2$ is the same and represents F or H, and n5 represents an integer of 0 or 1 to 10, and $Y^3$ is the same as defined above.

In the formula (5b), n5 is preferably an integer of 0 or 1 to 5, more preferably 0, 1 or 2, and still more preferably 0 or 1 in terms of stability of the resulting aqueous dispersion. $Y^3$ is preferably —COOM in terms of appropriate water-solubility and stability of the aqueous dispersion can be obtained, and M is preferably H or $NH^4$ in terms of hardly remaining as impurities and improving heat resistance of the resulting molded body.

Examples of the monomer represented by the general formula (5b) include $CH_2{=}CFCF_2OCF(CF_3)COOM$ and $CH_2{=}CFCF_{20}CF(CF_3)CF_2OCF(CF_3)COOM$ (where M is as defined above).

Examples of the monomer represented by the general formula (5) further include a monomer represented by the following general formula (5c):

$$CF_2{=}CFCF_2—O—Rf—Y^3 \quad (5c)$$

wherein Rf and $Y^3$ are as described above.

More specific examples thereof include:

$CF_2{=}CFCF_2OCF_2CF_2CF_2{-}Y^3$, $CF_2{=}CFCF_2OCF_2CF(CF_3){-}Y^3$, $CF_2{=}CFCF_2OCF_2CF_2CF_2CH_2{-}Y^3$, $CF_2{=}CFCF_2OCF_2CF(CF_3)CH_2{-}Y^3$,

In the general formula (6), each X is —H or —F. X may be both —F, or at least one thereof may be —H. For example, one thereof may be —F and the other may be —H, or both may be —H.

In the general formula (6), Y is —H, —F, an alkyl group, or a fluorine-containing alkyl group.

The alkyl group may be a fluorine atom-free alkyl group and may have 1 or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (6), at least one of X and Y preferably contains a fluorine atom. For example, X, Y, and Z may be —H, —F, and —F, respectively.

In the general formula (6), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less carbon atoms, more preferably 20 or less carbon atoms, and still more preferably 10 or less carbon atoms. The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)$ $CF_2$—, and —$CF(CF_3)CH_2$—. The fluorine-containing alkylene group is preferably a perfluoroalkylene group.

In the general formula (6), $Y^3$ is preferably —COOM, —$SO_3M$, or —$OSO_3M$, wherein M is H, a metal atom, $NR^{74}$, imidazolium optionally having a substituent, pyridinium optionally having a substituent, or phosphonium optionally having a substituent, wherein $R^7$ is H or an organic group and may be the same or different; and any two thereof optionally bind to each other to form a ring.

The organic group for $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —Na, —K, or —$NH_4$, particularly preferably —Na or —$NH_4$, and most preferably —$NH_4$.

$Y^3$ is preferably —COOM or —$SO_3M$, and more preferably —COOM.

The monomer represented by the general formula (6) is preferably at least one selected from the group consisting of monomers represented by the following general formulae (6a), (6b), (6c), (6d), and (6e):

$$CF_2{=}CF{-}O{-}(CF_2)_{n1}{-}Y^3 \quad (6a)$$

wherein n1 represents an integer of 1 to 10; and $Y^3$ is as defined above;

$$CF_2{=}CF{-}O{-}(CF_2C(CF_3)F)_{n2}{-}Y^3 \quad (6b)$$

wherein n2 represents an integer of 1 to 5; and $Y^3$ is as defined above;

$$CF_2{=}CF{-}O{-}(CFX^1)_{n3}{-}Y^3 \quad (6c)$$

wherein $X^1$ represents F or $CF_3$; n3 represents an integer of 1 to 10; and $Y^3$ is as defined above;

$$CF_2{=}CF{-}O{-}(CF_2CFX^1O)_{n4}{-}(CF_2)_{n6}{-}Y^3 \quad (6d)$$

wherein n4 represents an integer of 1 to 10; n6 represents an integer of 1 to 3; and $Y^3$ and $X^1$ are as defined above; and $$CF_2{=}CF{-}O{-}(CF_2CF_2CFX^1O)_{n5}{-}CF_2CF_2CF_2{-}Y^3 \quad (6e)$$

wherein n5 represents an integer of 0 to 10; and $Y^3$ and $X^1$ are as defined above.

In the formula (6a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the monomer represented by the formula (6a) include $CF_2{=}CF{-}O{-}CF_2COOM$, $CF_2{=}CF(OCF_2CF_2COOM)$, and $CF_2{=}CF(OCF_2CF_2CF_2COOM)$ (wherein M is as defined above).

In the formula (6b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

In the formula (6c), n3 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$ from the viewpoint of improving dispersion stability.

In the formula (6d), $X^1$ is preferably —$CF_3$ from the viewpoint of stability of the aqueous dispersion, n4 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$.

Examples of the monomer represented by the formula (6d) include $CF_2{=}CFOCF_2CF(CF_3)$ $OCF_2CF_2COOM$, $CF_2{=}CFOCF_2CF(CF_3)$ $OCF_2COOM$, and $CF_2{=}CFOCF_2CF(CF_3)$ $OCF_2CF_2CF_2OOM$ (wherein M represents H, $NH_4$ or an alkali metal).

In the general formula (6e), n5 is preferably an integer of 5 or less in terms of water-solubility, $Y^3$ is preferably —COOM in terms of obtaining appropriate water-solubility and excellent sedimentation stability of the composition, and M is preferably H or $NH_4$.

Examples of the monomer represented by the general formula (6e) include $CF_2{=}CFOCF_2CF_2CF_2COOM$ (wherein M represents H, $NH_4$, or an alkali metal).

In the general formula (7), Rf is preferably a fluorine-containing alkylene group having 1 to 40 carbon atoms. In the general formula (7), at least one of X and Y preferably contains a fluorine atom.

The monomer represented by the general formula (7) is preferably at least one selected from the group consisting of:

a monomer represented by the following general formula (7a):

$$CF_2{=}CF{-}(CF_2)_{n1}{-}Y^3 \quad (7a)$$

wherein n1 represents an integer of 1 to 10; and $Y^3$ is as defined above; and a monomer represented by the following general formula (7b):

$$CF_2{=}CF{-}(CF_2C(CF_3)F)_{n2}{-}Y^3 \quad (7b)$$

wherein n2 represents an integer of 1 to 5; and $Y^3$ is as defined above.

$Y^3$ is preferably —$SO_3M$ or —COOM, and M is preferably H, a metal atom, $NR^7_4$, imidazolium optionally having a substituent, pyridinium optionally having a substituent, or phosphonium optionally having a substituent. $R^7$ represents H or an organic group.

In the formula (7a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the monomer represented by the formula (7a) include $CF_2{=}CFCF_2COOM$ (wherein M is the same as defined above).

In the formula (7b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

The modifying monomer preferably contains a modifying monomer (A), and preferably contains at least one selected from the group consisting of compounds represented by the general formulas (5a), (5b), (6a), (6b), (6c), and (6d), and more preferably contains a compound represented by the general formula (5a) or the general formula (5b).

When the modifying monomer contains the modifying monomer (A), the content of the polymerized unit based on the modifying monomer (A) is preferably in the range of 0.00001 to 1.0% by mass based on all polymerized units of PTFE. The lower limit thereof is more preferably 0.0001% by mass, more preferably 0.0005% by mass, still more preferably 0.001% by mass, and further preferably 0.005% by mass. The upper limit thereof is preferably 0.90% by mass, more preferably 0.50% by mass, still more preferably 0.40% by mass, further preferably 0.30% by mass, still further preferably 0.10% by mass, particularly preferably 0.08% by mass, particularly preferably 0.05% by mass, and most preferably 0.01% by mass.

The PTFE may have a core-shell structure. The core-shell structure is a conventionally known structure, and is a structure of primary particles in an aqueous dispersion that can be produced by the method or the like described in U.S. Pat. No. 6,841,594.

Examples of the polytetrafluoroethylene having a core-shell structure include a core-shell structure including a core portion of a TFE homopolymer and a shell portion of a modified PTFE, a core-shell structure including a core portion of a modified PTFE and a shell portion of a TFE homopolymer, and a core-shell structure including a core portion of a modified PTFE and a shell portion of a modified PTFE having a monomer composition ratio different from that of the modified PTFE constituting the core portion.

The PTFE having a core-shell structure can be obtained, for example, by first polymerizing TFE and optionally a modifying monomer to produce a core portion (TFE homopolymer or modified PTFE), and then polymerizing TFE and optionally a modifying monomer to produce a shell portion (TFE homopolymer or modified PTFE).

The shell portion means a portion constituting a predetermined thickness from the surface of the PTFE primary particle to the inside of the particle, and the core portion means a portion constituting the inside of the shell portion.

In the present specification, the core-shell structure includes all of (1) a core-shell structure including a core portion and a shell portion having different monomer compositional features, (2) a core-shell structure including a core portion and a shell portion having the same monomer compositional features with different number-average molecular weights in both portions, and (3) a core-shell structure including a core portion and a shell portion having different monomer composition ratios with different number-average molecular weights in both portions.

When the shell portion is modified PTFE, the content of the modifying monomer in the shell portion is preferably 0.00001 to 1.0% by mass. The content thereof is more preferably 0.0001% by mass or more, still more preferably 0.001% by mass or more, and further preferably 0.01% by mass or more. Further, the content thereof is more preferably 0.50% by mass or less, and still more preferably 0.30% by mass or less.

When the core portion is modified PTFE, the content of the modifying monomer in the core portion is preferably 0.00001 to 1.0% by mass. The content thereof is more preferably 0.0001% by mass or more, and still more preferably 0.001% by mass or less. Further, the content thereof is more preferably 0.50% by mass or less, and still more preferably 0.30% by mass or less.

The average primary particle size of the PTFE is preferably 1000 nm or less, more preferably 500 nm or less, still more preferably 400 nm or less, and particularly preferably 350 nm or less. By the production method of the present disclosure, PTFE having a small average primary particle size can be obtained. The lower limit of the average primary particle size may be, for example, but not limited to, 50 nm or 100 nm. From the viewpoint of molecular weight, for example, in the case of high-molecular-weight PTFE, it is preferably 100 nm or more, and more preferably 150 nm or more.

The average primary particle size can be determined by dynamic light scattering. The average primary particle size may be determined by preparing a PTFE aqueous dispersion with a solid concentration adjusted to about 1.0% by mass and using a dynamic light scattering method at 25° C. with 70 measurement processes, wherein the solvent (water) has a refractive index of 1.3328 and the solvent has a viscosity of 0.8878 mPa·s. The dynamic light scattering may use, for example, ELSZ-1000S (manufactured by Otsuka Electronics Co., Ltd.).

In the PTFE, the aspect ratio of the primary particles is preferably 1.45 or less. The aspect ratio is more preferably 1.40 or less, still more preferably 1.35 or less, further preferably 1.30 or less, still further preferably 1.25 or less, particularly preferably 1.20 or less, and very particularly preferably 1.15 or less.

When measuring in an aqueous dispersion, the aspect ratio is determined by observing the PTFE aqueous dispersion diluted to have a solid concentration of about 1% by mass with a scanning electron microscope (SEM), performing image processing on 400 or more particles selected at random, and averaging the ratios of the major axis to the minor axis. When measuring PTFE powder, the aspect ratio is obtained by irradiating PTFE powder with an electron beam, adding the PTFE powder to a fluorosurfactant aqueous solution, and redispersing the PTFE powder with ultrasonic waves to obtain a PTFE aqueous dispersion. The aspect ratio is determined from the PTFE aqueous dispersion by the same method as the method for measuring the PTFE aqueous dispersion.

In the PTFE, the standard specific gravity (SSG) and the melt viscosity (MV) used as indices of the molecular weight are not limited.

The PTFE powder obtained by the production method of the present disclosure preferably has an average particle size (average secondary particle size) of 100 to 2,000 μm. The lower limit of the average secondary particle size is more preferably 200 μm or more, and still more preferably 300 μm or more. The upper limit of the average secondary particle size is preferably 1,000 μm or less, more preferably 800 μm or less, and particularly preferably 700 μm or less. The average particle size is a value measured in conformity with JIS K 6891.

The extrusion pressure of the PTFE powder obtained by the production method of the present disclosure is preferably 50.0 MPa or lower, more preferably 40.0 MPa or lower, preferably 10.0 MPa or higher, and still more preferably 15.0 MPa or higher. The extrusion pressure is a value determined by the following method according to a method disclosed in Japanese Patent Laid-Open No. 2002-201217.

To 100 g of PTFE powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The extrusion speed, i.e. ram speed, is 20 inch/min (51 cm/min). The extrusion pressure is a value obtained by measuring the load when the extrusion load becomes balanced in the paste extrusion and dividing the measured load by the cross-sectional area of the cylinder used in the paste extrusion.

The PTFE preferably has a standard specific gravity (SSG) of 2.280 or less, more preferably 2.200 or less, still more preferably 2.190 or less, and further preferably 2.180 or less. The SSG is preferably 2.130 or more. The SSG is determined by the water replacement method in conformity with ASTM D-792 using a sample molded in conformity with ASTM D 4895-89.

The PTFE preferably has a peak temperature of 348° C. or lower, more preferably 346° C. or lower, still more preferably 344° C. or lower, further preferably 342° C. or lower, and particularly preferably 340° C. or lower. The peak temperature is a value measured by the following method.

Approximately 10 mg of powder, which has no history of heating to a temperature of 300° C. or more, is precisely weighed and stored in a dedicated aluminum pan, and the peak temperature is measured using a thermogravimetric—differential thermal analyzer (TG/DTA). The peak temperature is the temperature corresponding to the minimum value of the differential thermal (DTA) curve obtained by heating the aluminum pan under the condition of 10° C./min in the temperature range from 25° C. to 600° C. in the air atmosphere.

The PTFE is usually fibrillatable and non-melt secondary processible.

The term "non-melt secondary processible" means a feature of polymer that the melt flow rate thereof cannot be measured at a temperature higher than the crystal melting point in conformity with ASTM D-1238 and D-2116, that is, a feature that does not easily flow even in the melting temperature region.

The PTFE is preferably stretchable. Whether or not it can be stretched can be confirmed by a stretching test described later.

In production of the PTFE, the hydrocarbon surfactant can be used within the use range described above for the production method of the present disclosure. The concentration of the hydrocarbon surfactant is not limited as long as it is within the above ranges, but is usually added at a critical micelle concentration (CMC) or less at the initiation of polymerization. Too large an amount of the surfactant added may cause generation of needle-shaped particles having a large aspect ratio and gelling of the aqueous dispersion, impairing the stability.

The lower limit of the amount of the hydrocarbon surfactant used is preferably 0.0001% by mass, more preferably 0.001% by mass, still more preferably 0.01% by mass, and particularly preferably 0.1% by mass, based on the aqueous medium. The upper limit of the amount of the surfactant used is preferably 10% by mass, more preferably 5% by mass, still more preferably 3% by mass, and particularly preferably 2% by mass, based on the aqueous medium.

The hydrocarbon surfactant may be added to the reaction vessel at once before the initiation of the polymerization, may be added at once after initiation of the polymerization, may be added in multiple portions during the polymerization, or may be added continuously during the polymerization.

In the production of PTFE, the polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization.

The polymerization initiator to be used may suitably be an oil-soluble radical polymerization initiator, a water-soluble radical polymerization initiator, or a redox initiator described above, and a redox initiator is particularly preferred. All of the embodiments described above may be employed as the redox initiator.

The redox initiator used is preferably an oxidizing agent or a reducing agent capable of adjusting the pH of the redox initiator aqueous solution to 4.0 or more. The redox initiator aqueous solution means a 0.50% by mass aqueous solution of an oxidizing agent or a 0.50% by mass aqueous solution of a reducing agent.

That is, at least one of the 0.50% by mass aqueous solution of the oxidizing agent and the 0.50% by mass aqueous solution of the reducing agent may have a pH of 4.0 or more, and it is preferable that both the 0.50% by mass aqueous solution of the oxidizing agent and the 0.50% by mass aqueous solution of the reducing agent have a pH of 4.0 or more.

The pH of the redox initiator aqueous solution (0.50% by mass aqueous solution of oxidizing agent or 0.50% by mass aqueous solution of reducing agent) is more preferably 5.0 or more, and still more preferably 5.5 or more, and particularly preferably 6.0 or more.

The redox initiator is particularly preferably a combination of an oxidizing agent which is a salt and a reducing agent which is a salt.

For example, the oxidizing agent which is a salt is more preferably at least one selected from the group consisting of a persulfate, a permanganate, a cerium (IV) salt and a bromate, still more preferably the permanganate, and particularly preferably potassium permanganate.

Further, the reducing agent which is a salt is more preferably at least one selected from the group consisting of oxalate, malonate, succinate, glutarate, and bromate, still more preferably oxalate, and particularly preferably ammonium oxalate.

Specifically, the redox initiator is preferably at least one selected from the group consisting of potassium permanganate/ammonium oxalate, potassium bromate/ammonium sulfite, manganese triacetate/ammonium oxalate, and ammonium cerium nitrate/ammonium oxalate, preferably at least one selected from the group consisting of potassium permanganate/ammonium oxalate, potassium bromate/ammonium sulfite, and ammonium cerium nitrate/ammonium oxalate.

In production of the PTFE, a known chain transfer agent may be used. Examples thereof include saturated hydrocarbons such as methane, ethane, propane, and butane, halogenated hydrocarbons such as chloromethane, dichloromethane, and difluoroethane, alcohols such as methanol and ethanol, and hydrogen. The chain transfer agent is preferably one in a gas state at normal temperature and normal pressure.

The amount of the chain transfer agent used is usually 1 to 10,000 ppm, preferably 1 to 5,000 ppm, based on the total amount of TFE fed. The amount used may be 1 to 1,000 ppm, or 1 to 500 ppm.

In production of the PTFE, a saturated hydrocarbon that is substantially inert to the reaction, that is in a liquid state under the reaction conditions, and that has 12 or more carbon atoms may be used as a dispersion stabilizer for the reaction system in an amount of 2 to 10 parts by mass based on 100 parts by mass of the aqueous medium. Aqueous ammonia, ammonium carbonate, ammonium phosphate, or the like may be added as a buffer for adjusting the pH during the reaction.

At completion of the polymerization for the PTFE, an aqueous dispersion having a solid concentration of 1.0 to 70% by mass and an average primary particle size of 50 to 1,000 nm can be obtained. The aqueous dispersion contains the surfactant and the fluoropolymer. Also, the use of the surfactant allows for obtaining an aqueous dispersion having particles of the TFE polymer having a fine particle size as small as 0.5 μm or smaller.

The polymerization step in the production of PTFE also preferably includes a step (I) of obtaining particles containing a polymerized unit based on TFE, and a step (II) of polymerizing TFE in an aqueous medium containing the particles obtained in the step (I) to obtain PTFE.

Obtaining the particles in the step (I) as described above and then polymerizing the TFE in an aqueous medium containing the particles obtained in the step (I) can increase the number of particles of the PTFE, thereby increasing the yield thereof.

For example, in the first production method of PTFE of the present disclosure, the polymerization step is also preferably a step including a step (Ia) of polymerizing TFE in an aqueous medium having a pH of 4.0 or higher in the presence of a hydrocarbon surfactant and a polymerization initiator to obtain particles comprising a polymerized unit based on TFE, and a step (IIa) of polymerizing TFE in an aqueous medium containing the particles obtained in the step (Ia) to obtain PTFE.

In the second production method of PTFE of the present disclosure, the polymerization step is also preferably a step including a step (Ib) of polymerizing TFE in an aqueous medium in the presence of an anionic hydrocarbon surfactant and a polymerization initiator to obtain particles comprising a polymerized unit based on TFE, and a step (IIb) of polymerizing TFE in an aqueous medium containing the particles obtained in the step (Ib) to obtain PTFE.

When the polymerization step includes the step (I) and the step (II), the step (II) may be performed using the aqueous dispersion containing the particles obtained in the step (I) as it is.

Further, the step (II) may be performed after diluting or concentrating the aqueous dispersion containing the particles obtained in the step (I). The dilution or concentration may be performed as it is in the reactor, or may be performed after collecting the aqueous dispersion containing the particles obtained in the step (I) from the reactor. Therefore, the polymerization step may further include a step of collecting the aqueous dispersion containing the particles obtained in the step (I), after the step (I) and before the step (II).

Further, the polymerization step may further include a step of bringing the aqueous dispersion containing the particles obtained in the step (I) to less than 50° C., less than 30° C. or less than 10° C., after the step (I) and before the step (II).

When the step (I) and the step (II) are continuously performed, the stirring may be once stopped after the step (I), and then the stirring may be restarted to continue the step (II).

Further, when the step (I) and the step (II) are continuously performed, the stirring may be optionally stopped after the step (I), and then the stirring may be restarted after changing the pressure in the reactor to continue the step (II).

Further, in order to change the monomer composition ratio of the reactor, the pressure of the reactor may be released to the atmospheric pressure after the step (I), and the step (II) may be continued after charging each monomer into the reactor. After the step (I), the step (II) may be continued after changing the polymerization temperature.

When the polymerization step includes the step (I) and the step (II), it is particularly preferable to use a redox initiator in the step (I). The use of a redox initiator allows for increasing the number of particles of the particles.

When the step (I) and the step (II) are continuously performed, the fluoropolymer can be continuously produced by stopping the charge of the redox initiator in the step (I), and then charging the polymerization initiator in the step (II). Examples of the redox initiator include those described above.

The polymerization temperature and the polymerization pressure in the step (I) are determined as appropriate in accordance with the types of the monomers used, the molecular weight of the target PTFE, and the reaction rate. For example, the conditions described for the above polymerization step can be appropriately adopted.

For example, the polymerization temperature is preferably 10 to 150° C. The polymerization temperature is more preferably 30° C. or higher, and still more preferably 50° C. or higher. Further, the polymerization temperature is more preferably 120° C. or lower, and still more preferably 100° C. or lower.

The polymerization pressure is preferably 0.05 to 10 MPaG. The polymerization pressure is more preferably 0.3 MPaG or higher, still more preferably 0.5 MPaG or higher, and more preferably 5.0 MPaG or lower, still more preferably 3.0 MPaG or lower.

In particular, from the viewpoint of improving the yield of fluoropolymer, the polymerization pressure is preferably 1.0 MPaG or higher, and more preferably 2.0 MPaG or higher.

The step (I) is performed in the presence of a hydrocarbon surfactant.

In the step (I), the amount of the hydrocarbon surfactant is preferably 0.0001 to 15% by mass based on the aqueous medium. The lower limit thereof is more preferably 0.001% by mass, while the upper limit thereof is more preferably 1% by mass. Less than 0.0001% by mass of the surfactant may cause insufficient dispersibility. More than 15% by mass of the surfactant may fail to give the effects corresponding to its amount. The amount of the hydrocarbon surfactant added is appropriately determined depending on the type of monomer used, the molecular weight of the target PTFE, and the like.

The hydrocarbon surfactant may be added to the reaction vessel at once before the initiation of the polymerization, may be added at once after initiation of the polymerization, may be added in multiple portions during the polymerization, or may be added continuously during the polymerization.

Further, in the step (I), all the conditions described as the above-mentioned polymerization steps can be adopted.

When the polymerization step includes the step (I) and the step (II), the step (I) is preferably a step of obtaining an aqueous dispersion having a particle concentration of 20.0% by mass or less. The solid concentration is more preferably 15.0% by mass or less, still more preferably 10.0% by mass or less, further preferably 8.0% by mass or less, and particularly preferably 5.0% by mass or less. The solid concentration is preferably 0.1% by mass or more, more preferably 0.3% by mass or more, still more preferably 0.5% by mass or more, further preferably 0.8% by mass or more, still further preferably 1.0% by mass or more, and particularly preferably 1.5% by mass or more.

The particles may be a TFE homopolymer consisting only of a polymerized unit based on TFE, or a modified PTFE having a polymerized unit based on TFE of 99.0% by mass or more and a polymerized unit based on a modifying monomer of 1.0% by mass or less.

The modified PTFE preferably has a polymerized unit based on the modifying monomer (hereinafter, also referred to as "modifying monomer unit") in the range of 0.00001 to 1.0% by mass. The lower limit of the modifying monomer unit is more preferably 0.0001% by mass, more preferably 0.0005% by mass, and still more preferably 0.001% by mass. The upper limit of the modifying monomer unit is preferably 0.90% by mass, more preferably 0.50% by mass, still more preferably 0.40% by mass, further preferably 0.30% by mass, still further preferably 0.10% by mass, particularly preferably 0.08% by mass, particularly preferably 0.05% by mass, and most preferably 0.01% by mass.

The particles obtained in the step (I) preferably have an average primary particle size of 300 nm or less, more preferably 200 nm or less, and still more preferably 150 nm or less. Further, the average primary particle size is preferably 0.1 nm or more, more preferably 1.0 nm or more, and still more preferably 3.0 nm or more.

The average primary particle size can be determined by dynamic light scattering. The average primary particle size may be determined by preparing a PTFE aqueous dispersion with a solid concentration adjusted to about 1.0% by mass and using a dynamic light scattering method at 25° C. with 70 measurement processes, wherein the solvent (water) has a refractive index of 1.3328 and the solvent has a viscosity of 0.8878 mPa·s. The dynamic light scattering may use, for example, ELSZ-1000S (manufactured by Otsuka Electronics Co., Ltd.).

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

The aqueous medium in the step (II) preferably contains the aqueous medium contained in the aqueous dispersion containing the particles obtained in the step (I). In addition to the aqueous medium contained in the aqueous dispersion containing the particles, another aqueous medium may also be added.

The polymerization temperature and the polymerization pressure in the step (II) are determined as appropriate in accordance with the types of the monomers used, the molecular weight of the target PTFE, and the reaction rate.

For example, the polymerization temperature is preferably 10 to 150° C. The polymerization temperature is more preferably 30° C. or higher, and still more preferably 50° C. or higher. Further, the polymerization temperature is more preferably 120° C. or lower, and still more preferably 100° C. or lower.

The polymerization pressure is preferably 0.05 to 10 MPaG. The polymerization pressure is more preferably 0.3 MPaG or higher, still more preferably 0.5 MPaG or higher, and more preferably 5.0 MPaG or lower, still more preferably 3.0 MPaG or lower.

In particular, from the viewpoint of improving the yield of fluoropolymer, the polymerization pressure is preferably 1.0 MPaG or higher, and more preferably 2.0 MPaG or higher.

The above step (II) may be performed in the presence of a hydrocarbon surfactant or in the absence of a hydrocarbon surfactant.

The step (II) is preferably a step of polymerizing TFE in an aqueous medium containing the particles in the presence of a hydrocarbon surfactant.

In the step (II), the amount of the hydrocarbon surfactant is preferably 0.0001 to 15% by mass based on the aqueous medium. The lower limit thereof is more preferably 0.001% by mass, while the upper limit thereof is more preferably 1% by mass. Less than 0.0001% by mass of the surfactant may cause insufficient dispersibility. More than 15% by mass of the surfactant may fail to give the effects corresponding to its amount. The amount of the hydrocarbon surfactant added is appropriately determined depending on the type of monomer used, the molecular weight of the target PTFE, and the like.

The hydrocarbon surfactant may be added to the reaction vessel at once before the initiation of the polymerization, may be added at once after initiation of the polymerization, may be added in multiple portions during the polymerization, or may be added continuously during the polymerization.

The step (II) preferably further includes a step of continuously adding a hydrocarbon surfactant. Adding the hydrocarbon surfactant continuously means, for example, adding the hydrocarbon surfactant not all at once, but adding over time and without interruption or adding in portions. By including the step of continuously adding, an aqueous dispersion having a smaller average primary particle size and superior stability can be obtained and PTFE having a higher molecular weight can be obtained.

In the step (II), the amount of the hydrocarbon surfactant at the initiation of the polymerization is preferably 1 ppb or more based on the aqueous medium.

The amount of the hydrocarbon surfactant at the initiation of polymerization is preferably 10 ppb or more, more preferably 50 ppb or more, still more preferably 100 ppb or more, and further preferably 200 ppb or more. The upper limit thereof is preferably, but not limited to, 100,000 ppm, and more preferably 50,000 ppm, for example. When the amount of the hydrocarbon surfactant at the initiation of polymerization is in the above range, an aqueous dispersion having a smaller average primary particle size and superior stability can be obtained and PTFE having a higher molecular weight can be obtained.

Also, the aspect ratio of the primary particles can be made smaller.

In the step (II), the step of continuously adding the hydrocarbon surfactant, the hydrocarbon surfactant is preferably started to be added to the aqueous medium when the concentration of PTFE formed in the aqueous medium is 10% by mass or less. The hydrocarbon surfactant is more preferably started to be added when the concentration is 8.0% by mass or less, still more preferably started to be added when the concentration is 5.0% by mass or less, further preferably started to be added when the concentration is 4.0% by mass or less, still further preferably started to be added when the concentration is 3.0% by mass or less, particularly preferably started to be added when the concentration is 2.0% by mass or less, particularly more preferably started to be added when the concentration is 1.5% by mass or less, and very particularly preferably started to be added when the concentration is 1.0% by mass or less. Further, the hydrocarbon surfactant is preferably started to be added when the concentration thereof is less than 0.60% by mass, more preferably started to be added when the concentration is 0.50% by mass or less, still more preferably started to be added when the concentration is 0.36% by mass or less, further preferably started to be added when the concentration is 0.30% by mass or less, still further preferably started to be added when the concentration is 0.20% by mass or less, and particularly preferably started to be added when the concentration is 0.10% by mass or less. Further, the hydrocarbon surfactant is preferably started to be added when the polymerization is initiated in the step (II). The concentration is a concentration based on the total amount of the aqueous medium and the PTFE.

By including the above step, an aqueous dispersion having a smaller average primary particle size and superior stability can be obtained and PTFE having a higher molecular weight can be obtained.

In the step of continuously adding the hydrocarbon surfactant, the amount of the hydrocarbon surfactant added is preferably 0.01 to 10% by mass based on 100% by mass of the aqueous medium. The lower limit thereof is more preferably 0.05% by mass, still more preferably 0.1% by mass while the upper limit thereof is more preferably 5% by mass, still more preferably 1% by mass.

The hydrocarbon surfactant is preferably an anionic hydrocarbon surfactant, and preferably at least one selected from the group consisting of the compound (α), the surfactant (α), the surfactant (b), the surfactant (c), the surfactant (d), the surfactant (1) and the surfactant (1-0A), and those obtained by subjecting these surfactants to a radical treatment or oxidation treatment.

The hydrocarbon surfactant is preferably a carboxylic acid-type hydrocarbon surfactant, and the carboxylic acid-type hydrocarbon surfactant is more preferably a carboxylic acid or a carboxylate.

Specifically, the carboxylic acid-type hydrocarbon emulsifier is preferably at least one selected from the group consisting of a surfactant having a carboxyl group (—COOH) or a group in which the hydrogen atom of the carboxyl group is replaced with an inorganic cation (for example, metal atoms, ammonium, etc.) among the surfactant (1), the anionic surfactant represented by $R^{6z}$ $(\text{-L-M})_2$ described above, the anionic surfactant represented by $R^{7z}$ $(\text{-L-M})_3$ described above, the compound (α), the surfactant (1-0A), and those obtained by radically treating or oxidizing these surfactants. The carboxylic acid-type hydrocarbon surfactant may be used alone or in a mixture of two or more.

The carboxylic acid-type hydrocarbon surfactant is preferably the compound (α), and more preferably at least one selected from the group consisting of a compound represented by the formula (A), a compound in which $A^c$ is —$COOX^c$ in the formula (c), a compound in which $A^d$ is —$COOX^d$ in the formula (d), a compound in which A is —COOM in the formula (1), a compound in which A is —COOM in the formula (1-0A), and those obtained by radically treating or oxidizing any of these compounds, and still more preferably at least one selected from the group consisting of a compound represented by the formula (A) and a compound obtained by radically treating or oxidizing the compound.

In particular, preferred is at least one selected from the group consisting of lauric acid, capric acid, myristic acid, pentadecic acid, palmitic acid, salts thereof, and those obtained by radically treating or oxidizing these compounds. Examples of the salts include, but are not limited to, those in which hydrogen of the carboxyl group is a metal atom, $NR^{101}{}_4$, imidazolium optionally having a substituent, pyridinium optionally having a substituent, or phosphonium optionally having a substituent as M in the formula described above.

The step (II) may be performed by charging a polymerization reactor with an aqueous dispersion containing the particles, TFE, and optionally an aqueous medium, a modifying monomer, a hydrocarbon surfactant, and other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the hydrocarbon surfactant may additionally be added depending on the purpose. The hydrocarbon surfactant may be added after the polymerization reaction is initiated.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target PTFE, and the reaction rate.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization.

The polymerization initiator to be used may suitably be an oil-soluble radical polymerization initiator, a water-soluble radical polymerization initiator, or a redox initiator described above, and a redox initiator is particularly preferred. All of the embodiments described above may be employed as the redox initiator.

The redox initiator used is preferably an oxidizing agent or a reducing agent capable of adjusting the pH of the redox initiator aqueous solution to 4.0 or more. The redox initiator aqueous solution means a 0.50% by mass aqueous solution of an oxidizing agent or a 0.50% by mass aqueous solution of a reducing agent.

That is, at least one of the 0.50% by mass aqueous solution of the oxidizing agent and the 0.50% by mass aqueous solution of the reducing agent may have a pH of 4.0 or more, and it is preferable that both the 0.50% by mass aqueous solution of the oxidizing agent and the 0.50% by mass aqueous solution of the reducing agent have a pH of 4.0 or more.

The pH of the redox initiator aqueous solution (0.50% by mass aqueous solution of oxidizing agent or 0.50% by mass aqueous solution of reducing agent) is more preferably 5.0 or more, and still more preferably 5.5 or more, and particularly preferably 6.0 or more.

The redox initiator is particularly preferably a combination of an oxidizing agent which is a salt and a reducing agent which is a salt.

For example, the oxidizing agent which is a salt is more preferably at least one selected from the group consisting of a persulfate, a permanganate, a cerium (IV) salt and a bromate, still more preferably the permanganate, and particularly preferably potassium permanganate.

Further, the reducing agent which is a salt more is preferably at least one selected from the group consisting of oxalate, malonate, succinate, glutarate, and bromate, still more preferably oxalate, and particularly preferably ammonium oxalate.

Specifically, the redox initiator is preferably at least one selected from the group consisting of potassium permanganate/ammonium oxalate, potassium bromate/ammonium sulfite, manganese triacetate/ammonium oxalate, and ammonium cerium nitrate/ammonium oxalate, preferably at least one selected from the group consisting of potassium permanganate/ammonium oxalate, potassium bromate/ammonium sulfite, and ammonium cerium nitrate/ammonium oxalate.

The step (II) is preferably a step of polymerizing TFE and optionally a modifying monomer substantially in the absence of a fluorine-containing surfactant. The expression "substantially in the absence of a fluorine-containing surfactant" means that the fluorine-containing surfactant is 1 ppm or less based on the PTFE obtained by the polymerization, preferably 100 ppb or less, more preferably 10 ppb or less, and still more preferably 1 ppb or less.

The PTFE powder (for example, PTFE fine powder) obtained by the production method of the present disclosure may be used as a powder or may be added to water and used as an aqueous dispersion.

The resulting fine PTFE fine powder is preferred for molding, and suitable applications thereof include tubes for hydraulic systems or fuel systems of aircraft or automobiles, flexible hoses for chemicals or vapors, and electric wire coating.

The PTFE aqueous dispersion obtained by the production method of the present disclosure is preferably mixed with a nonionic surfactant to stabilize and further concentrate the aqueous dispersion, and then further mixed with, depending on its purpose, an organic or inorganic filler to form a composition and used in a variety of applications. The composition, when applied to a metal or ceramic base material, can provide a coating surface having non-stickiness, a low coefficient of friction, and excellent gloss, smoothness, abrasion resistance, weather resistance, and heat resistance, which is suitable for coating of rolls and cooking utensils and impregnation of glass cloth.

The PTFE aqueous dispersion may also be used to prepare an organosol of PTFE. The organosol may contain the PTFE and an organic solvent, and examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethylacetamide. The organosol may be prepared by the method disclosed in International Publication No. WO2012/002038, for example.

The aqueous dispersion of the PTFE or the PTFE fine powder is also preferably used as a processing aid.

When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of the PTFE or the PTFE fine powder is also preferably used as a binder for batteries or used for dustproof applications.

The aqueous dispersion of the PTFE or the PTFE fine powder is also preferably combined with a resin other than PTFE to form a processing aid before use. The aqueous dispersion or the fine powder is suitable as a material of the PTFEs disclosed in, for example, Japanese Patent Laid-Open No. 11-49912, U.S. Pat. No. 5,804,654, Japanese Patent Laid-Open No. 11-29679, and Japanese Patent Laid-Open No. 2003-2980. Processing aids containing the aqueous dispersion or the fine powder are not inferior in any way to the processing aids disclosed in the publications.

The aqueous dispersion of the PTFE is also preferably mixed with an aqueous dispersion of a melt-fabricable fluororesin so that the components coagulate to form ω-coagulated powder. The ω-coagulated powder is suitable as a processing aid.

Examples of the melt-fabricable fluororesin include FEP, PFA, TFE/perfluoroallyl ether copolymers, ETFE, and ethylene/TFE/HFP copolymers (EFEPs), of which FEP is preferred.

The aqueous dispersion also preferably contains a melt-fabricable fluororesin. Examples of the melt-fabricable fluororesin include FEP, PFA, TFE/perfluoroallyl ether copolymer, ETFE, and EFEP. The aqueous dispersion containing the melt-fabricable fluororesin may be used as a coating material. The melt-fabricable fluororesin enables sufficient fusion of the TFE polymer particles, improving the film-formability and providing the resulting film with gloss.

The fluorine-free resin to which the ω-coagulated powder is added may be in the form of powder, pellets, or emulsion. In order to achieve sufficient mixing of the resins, the addition is preferably performed by a known method such as extrusion kneading or roll kneading under a shearing force.

Examples of the applications of the aqueous dispersion include, but are not limited to, those in which the aqueous dispersion is directly used, such as coating achieved by applying the aqueous dispersion to a base material, drying the dispersion, and optionally sintering the workpiece; impregnation achieved by impregnating a porous support such as nonwoven fabric or a resin molded article into the aqueous dispersion, drying the dispersion, and preferably sintering the workpiece; and casting achieved by applying the aqueous dispersion to a base material such as glass, drying the dispersion, optionally immersing the workpiece into water to remove the substrate and to thereby provide a thin film. Examples of such applications include aqueous dispersion-type coating materials, tent membranes, conveyor belts, printed circuit boards (CCL), binders for electrodes, and water repellents for electrodes.

The aqueous dispersion may be used in the form of an aqueous coating material for coating by mixing with a known compounding agent such as a pigment, a thickener, a dispersant, a defoaming agent, an antifreezing agent, a film-forming aid, or by compounding another polymer compound.

In addition, the aqueous dispersion may be used for additive applications, for example, for a binder application for preventing the active material of an electrode from falling off, for a compound application such as a drip inhibitor, or for a dust suppression treatment application for preventing floating of sand, dust, and the like.

For the purpose of adjusting the viscosity of the aqueous dispersion or improving the miscibility with a pigment or filler, the aqueous dispersion may preferably contain an anionic surfactant. The anionic surfactant may be appropriately added to an extent that causes no problems from the economic and environmental viewpoints.

Examples of the anionic surfactant include non-fluorinated anionic surfactants and fluorine-containing anionic surfactants. Preferred are fluorine-free, non-fluorinated anionic surfactants, i.e., hydrocarbon anionic surfactants.

For the purpose of adjusting the viscosity, any known anionic surfactants may be used, for example, anionic surfactants disclosed in International Publication No. WO2013/146950 and International Publication No. WO2013/146947. Examples thereof include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferred are alkyl sulfonates, alkyl sulfates, and aliphatic carboxylic acids, or salts thereof.

Preferred examples of the alkyl sulfates or salts thereof include ammonium lauryl sulfate and sodium lauryl sulfate.

Preferred examples of the aliphatic carboxylic acids or salts thereof include succinic acid, decanoic acid, undecanoic acid, undecenoic acid, lauric acid, hydrododecanoic acid, or salts thereof.

The amount of the anionic surfactant added depends on the types of the anionic surfactant and other compounding agents, and is preferably 10 ppm to 5,000 ppm based on the mass of the solid of the fluoropolymer.

The lower limit of the amount of the anionic surfactant added is more preferably 50 ppm or more, still more preferably 100 ppm or more. Too small amount of the anionic surfactant may result in a poor viscosity adjusting effect.

The upper limit of the amount of the anionic surfactant added is more preferably 3,000 ppm or less, still more preferably 2,000 ppm or less. Too large amount of the anionic surfactant may impair mechanical stability and storage stability of the aqueous dispersion.

For the purpose of adjusting the viscosity of the aqueous dispersion, components other than the anionic surfactants, such as methyl cellulose, alumina sol, polyvinyl alcohol, and carboxylated vinyl polymers may also be added.

For the purpose of adjusting the pH of the aqueous dispersion, a pH adjuster such as aqueous ammonia may also be added.

The aqueous dispersion may optionally contain other water-soluble polymer compounds to an extent that does not impair the characteristics of the aqueous dispersion.

Examples of the other water-soluble polymer compound include, but are not limited to, polyethylene oxide (dispersion stabilizer), polyethylene glycol (dispersion stabilizer), polyvinylpyrrolidone (dispersion stabilizer) phenol resin, urea resin, epoxy resin, melamine resin, polyester resin, polyether resin, silicone acrylic resin, silicone resin, silicone polyester resin, and polyurethane resin. The aqueous dispersion may further contain a preservative, such as isothiazolone-based, azole-based, pronopol, chlorothalonil, methylsulfonyltetrachloropyridine, carbendazim, fluorfolpet, sodium diacetate, and diiodomethylparatolylsulfone.

The PTFE aqueous dispersion is also preferably used as a dust suppression treatment agent. The dust suppression treatment agent may be used in a method for suppressing dust from a dust-generating substance by mixing the dust suppression treatment agent with the dust-generating substance and subjecting the mixture to a compression-shear action at a temperature of 20 to 200° C. to fibrillate the TFE polymer, for example, methods disclosed in Japanese Patent No. 2,827,152 and Japanese Patent No. 2,538,783.

The aqueous dispersion of the PTFE can suitably be used for the dust suppression treatment agent composition disclosed in International Publication No. WO2007/004250, and can also suitably be used for the method of dust suppression treatment disclosed in International Publication No. WO2007/000812.

The dust suppression treatment agent is suitably used for dust suppression treatment in the fields of building-products, soil stabilizers, solidifying materials, fertilizers, landfill of incineration ash and harmful substance, explosion proof equipment, cosmetics, sands for pet excretion represented by cat sand, and the like.

The aqueous dispersion of the PTFE is also preferably used as a raw material for producing TFE polymer fibers by a dispersion spinning method. The dispersion spinning method is a method in which the aqueous dispersion of the TFE polymer and an aqueous dispersion of a matrix polymer are mixed and the mixture is extruded to form an intermediate fiber structure, and then the intermediate fiber structure is fired to decompose the matrix polymer and sinter the TFE polymer particles, thereby providing TFE polymer fibers.

High-molecular-weight PTFE can also be produced by the production method of the present disclosure. The production method of the present disclosure can produce PTFE having a molecular weight equivalent to that of PTFE obtained by a production method using a conventional fluorine-containing surfactant without using a conventional fluorine-containing surfactant.

When producing a high-molecular-weight PTFE, the polymerization temperature is preferably 30° C. or higher, more preferably 40° C. or higher, and still more preferably 50° C. or higher. Further, the polymerization temperature is preferably 100° C. or lower, and more preferably 95° C. or lower. The polymerization pressure is preferably 0.5 MPaG or higher, preferably 0.7 MPaG or higher, and preferably 1.0 MPaG or higher, and preferably 5.0 MPaG or lower, more preferably 4.0 MPaG or lower, and still more preferably 3.0 MPaG or lower.

The high-molecular-weight PTFE powder obtained by polymerization has stretchability and non melt processability, and is also useful as a material for a stretched body (porous body). When the stretched body is in the form of a film (PTFE stretched film or PTFE porous film), the stretched body can be formed by stretching by a known PTFE stretching method. Stretching allows easy formation of fibrils of PTFE, resulting in a high-molecular-weight PTFE porous body (film) including nodes and fibers.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

This PTFE stretched body is a porous body having a high porosity, and can suitably be used as a filter material for a variety of microfiltration filters such as air filters and chemical filters and a support member for polymer electrolyte films.

The PTFE stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example) filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid Filter Field

Examples of the applications in this field include liquid filters for semiconductors (for production of semiconductors), hydrophilic PTFE filters (for production of semiconductors), filters for chemicals (for chemical treatment), filters for pure water production lines (for production of pure water), and back-washing liquid filters (for treatment of industrial discharge water).

Consumer Goods Field

Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).

Textile Field

Examples of the applications in this field include PTFE fibers (fiber materials), machine threads (textiles) weaving yarns (textiles), and ropes.

Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

Low-molecular-weight PTFE can also be produced by the production method of the present disclosure.

The low-molecular-weight PTFE may be produced by polymerization, or may be produced by reducing the molecular weight of a high-molecular-weight PTFE obtained by polymerization by a known method (e.g., thermolysis, radiolysis).

When producing a low-molecular-weight PTFE, the polymerization temperature is preferably 30° C. or higher, more preferably 40° C. or higher, and still more preferably 50° C. or higher. Further, the polymerization temperature is preferably 100° C. or lower, more preferably 90° C. or lower, and still more preferably 80° C. or lower. The polymerization pressure is preferably 0.3 MPaG or higher, preferably 0.4 MPaG or higher, and preferably 0.5 MPaG or higher, and preferably 5.0 MPaG or lower, more preferably 4.0 MPaG or lower, and still more preferably 3.0 MPaG or lower.

A low-molecular-weight PTFE having a molecular weight of 600,000 or less (also referred to as PTFE micropowder) has excellent chemical stability and a very low surface energy, and is less likely to generate fibrils, and is therefore suitably used as an additive for improving the lubricity and the texture of the coating surface in production of plastics, inks, cosmetics, coating materials, greases, parts of office automation equipment, and toners (e.g., see Japanese Patent Laid-Open No. 10-147617).

A low-molecular-weight PTFE may be obtained by dispersing a polymerization initiator and the hydrocarbon surfactant in an aqueous medium in the presence of a chain transfer agent, and then polymerizing TFE alone or TFE and a monomer copolymerizable with TFE.

In the present disclosure, the high-molecular-weight PTFE means a non melt-processible and fibrillatable PTFE. The low-molecular-weight PTFE as used herein means a melt-fabricable and non-fibrillatable PTFE.

The term "non melt-processible" means a feature of polymer that the melt flow rate thereof cannot be measured at a temperature higher than the crystal melting point in conformity with ASTM D 1238.

The high-molecular-weight PTFE preferably has a standard specific gravity (SSG) of 2.130 to 2.280. The standard specific gravity is determined by the water replacement method in conformity with ASTM D 792 using a sample molded in conformity with ASTM D 4895-89. The "high-molecular-weight" in the present disclosure means that the standard specific gravity is within the above range.

The low-molecular-weight PTFE has a melt viscosity at 380° C. of $1\times10^2$ to $7\times10^5$ Pa·s. The "low-molecular-weight" in the present disclosure means that the melt viscosity is within the above range.

The high-molecular-weight PTFE has a melt viscosity significantly higher than that of the low-molecular-weight PTFE, and the melt viscosity thereof is difficult to measure accurately. The melt viscosity of the low-molecular-weight PTFE is measurable, but the low-molecular-weight PTFE has difficulty in providing a molded article to be used in measurement of the standard specific gravity. Thus, it is difficult to measure its accurate standard specific gravity. Accordingly, in the present disclosure, the standard specific gravity is used as an index of the molecular weight of the high-molecular-weight PTFE, while the melt viscosity is used as an index of the molecular weight of the low-molecular-weight PTFE. It should be noted that there is no known measuring method for directly specifying the molecular weight of either the high-molecular-weight PTFE or the low-molecular-weight PTFE.

The high-molecular-weight PTFE preferably has a peak temperature of 333 to 347° C., more preferably 335 to 345° C. The low-molecular-weight PTFE preferably has a peak temperature of 322 to 333° C., more preferably 324 to 332° C.

Approximately 10 mg of powder, which has no history of heating to a temperature of 300° C. or more, is precisely weighed and stored in a dedicated aluminum pan, and the peak temperature is measured using a thermogravimetric—differential thermal analyzer (TG/DTA). The peak temperature is the temperature corresponding to the maximum value of the differential thermal (DTA) curve obtained by heating the aluminum pan under the condition of 10° C./min in the temperature range from 25° C. to 600° C. in the air atmosphere.

Preferably, the high-molecular-weight PTFE has at least one endothermic peak in a range of 333 to 347° C. on a heat-of-fusion curve with a temperature-increasing rate of 10° C./min using a differential scanning calorimeter (DSC) for a PTFE which has never been heated up to 300° C. or higher, and has an enthalpy of fusion of 62 mJ/mg or higher at 290 to 350° C. calculated from the heat-of-fusion curve.

The PTFE fine powder obtained by using the surfactant described above may also be used to produce unfired tape (green tape).

The hydrocarbon surfactant, decomposition products and by-products of the hydrocarbon surfactant by-produced by the hydrocarbon surfactant, and residual monomers may be collected from discharge water generated in the coagulation or the washing and/or from off gas generated in the drying, and then purified to reuse the hydrocarbon surfactant, the decomposition products and by-products of the hydrocarbon surfactant by-produced from the hydrocarbon surfactant, the residual monomers, and the like. The collection and the purification may be performed by known methods, although not limited thereto. For example, they may be performed by the methods disclosed in National Publication of International Patent Application No. 2011-520020.

(II) Melt-Fabricable Fluororesins (1) In the production method of the present disclosure, the polymerization for FEP is preferably performed at a polymerization temperature of 10 to 150° C. and a polymerization pressure of 0.3 to 6.0 MPaG.

FEP preferably has a monomer composition ratio (% by mass) of TFE:HFP=(60 to 95):(5 to 40), more preferably (85 to 92):(8 to 15). The FEP may be modified with a perfluoro (alkyl vinyl ether) as a third component within a range of 0.1 to 2% by mass of all monomers.

In the polymerization for FEP, the hydrocarbon surfactant may be used within the use range of the production method of the present disclosure, and is usually added in an amount of 0.0001 to 10% by mass based on 100% by mass of the aqueous medium.

In the polymerization for FEP, the chain transfer agent used is preferably cyclohexane, methanol, ethanol, propanol, ethane, propane, butane, pentane, hexane, carbon tetrachloride, chloroform, methylene chloride, methyl chloride, or the like, and the pH buffer used is preferably ammonium carbonate, disodium hydrogen phosphate, or the like.

The aqueous dispersion of FEP obtained by the production method of the present disclosure may optionally be subjected to post-treatment such as concentration, and then the concentrate may be dried and powdered, and the powder may be melt-extruded into pellets. The aqueous medium in the aqueous dispersion of FEP may contain an additive such as a nonionic surfactant as necessary, but may contain a water-soluble organic solvent such as a water-soluble alcohol, or may contain no water-soluble organic solvent.

The melt extrusion may be performed under any appropriately set extrusion conditions usually capable of providing pellets.

In the production method of the present disclosure, although the resulting FEP may contain an end group such as $-CF_3$ or $-CF_2H$ on at least one of the polymer main chain and a polymer side chain, it is preferred that the content of thermally unstable groups such as $-COOH$, $-CH_2OH$, $-COF$, $-CF{=}CF-$, $-CONH_2$, or $-COOCH_3$ (hereinafter, referred to as an "unstable end group") is low or absent.

The unstable end group is chemically unstable, and thus not only reduces the heat resistance of the resin but also causes increase in the attenuation of the resulting electric wire.

The production method of the present disclosure is preferably performed in such a way that a polymer in which the total number of unstable end groups and $-CF_2H$ end groups at the completion of the polymerization is 50 or less per $1\times10^6$ carbon atoms is produced. The number of such groups is more preferably less than 20, still more preferably 5 or less, per $1\times10^6$ carbon atoms. There may also be neither unstable end groups nor $-CF_2H$ end groups, i.e. all end groups may be $-CF_3$ end groups.

The unstable end groups and the $-CF_2H$ end groups may be fluorinated and converted into the $-CF_3$ end groups and thereby stabilized. Examples of the fluorination method include, but not limited to, methods of exposing the polymer to a fluorine radical source that generates fluorine radicals under fluorination conditions. Examples of the fluorine radical source include fluorine gas, $CoF_3$, $AgF_2$, $UF_6$, $OF_2$, $N_2F_2$, $CF_3OF$, and halogen fluorides such as $IF_5$ and $ClF_3$. Of these, preferred is a method of bringing a fluorination gas and the FEP obtained by the production method of the present disclosure into direct contact with each other. In order to control the reaction, the contact is preferably performed using a diluted fluorine gas having a fluorine gas concentration of 10 to 50% by mass. The diluted fluorine gas is obtainable by diluting fluorine gas with an inert gas such as nitrogen gas or argon gas. The fluorine gas treatment may be performed at a temperature of 100 to 250° C. The treatment temperature is not limited to this range and may be appropriately set in accordance with the situation. The fluorine gas treatment is preferably performed by feeding a diluted fluorine gas into the reactor continuously or intermittently. This fluorination may be performed on dry powder after the polymerization or on melt-extruded pellets.

The FEP obtained by the production method of the present disclosure has good moldability and is less likely to cause molding defects, as well as has excellent properties such as heat resistance, chemical resistance, solvent resistance, insulation, and electric properties.

The FEP powder may be produced by a method of drying the FEP obtained by the above-described production method of the present disclosure to powder the FEP.

The powder may be fluorinated. The fluorinated powder may be produced by a method of feeding a fluorine gas to the powder obtained by the above-described method for producing a powder to fluorinate the powder to obtain a fluorinated powder.

The FEP pellets may be produced by a method of pelletizing the FEP obtained by the above-described production method of the present disclosure.

The pellets may be fluorinated. The fluorinated pellets may be produced by a method of feeding a fluorine gas to the pellets obtained by the above-described method for producing pellets to fluorinate the pellets to obtain fluorinated pellets.

Thus, this FEP may be used in production of a variety of molded articles such as coating materials for electric wires, foamed electric wires, cables, and wires, tubes, films, sheets, and filaments.

(2) In the production method of the present disclosure, the polymerization for a TFE/perfluoro(alkyl vinyl ether) copolymer such as PFA or MFA and TFE/perfluoroallyl ether copolymer is usually preferably performed at a polymerization temperature of 10 to 100° C. and a polymerization pressure of 0.3 to 6.0 MPaG.

The TFE/perfluoro(alkyl vinyl ether) copolymer preferably has a monomer composition ratio (mol %) of TFE: perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2{=}CFORf^4$, wherein $Rf^4$ is a perfluoroalkyl group having 1 to 6 carbon atoms.

The TFE/perfluoroallyl ether copolymer preferably has a monomer composition ratio (mol %) of TFE:perfluoroallyl ether=(90 to 99.7):(0.3 to 10), more preferably (97 to 99):(1 to 3). The perfluoroallyl ether used is preferably one represented by the formula: $CF_2{=}CFCF_2ORf^4$, wherein $Rf^4$ is a perfluoroalkyl group having 1 to 6 carbon atoms.

In the polymerization for the TFE/perfluoro(alkyl vinyl ether) copolymer and the TFE/perfluoroallyl ether copolymer, the surfactant may be used within the use range of the production method of the present disclosure, and is usually preferably added in an amount of 0.0001 to 10% by mass based on 100% by mass of the aqueous medium.

In the polymerization for the TFE/perfluoro(alkyl vinyl ether) copolymer and the TFE/perfluoroallyl ether copolymer, the chain transfer agent used is preferably cyclohexane, methanol, ethanol, propanol, propane, butane, pentane, hexane, carbon tetrachloride, chloroform, methylene chloride, methyl chloride, methane, ethane, or the like, and the pH buffer used is preferably ammonium carbonate, disodium hydrogen phosphate, or the like.

The aqueous dispersion of the TFE/perfluoro(alkyl vinyl ether) copolymer such as PFA or MFA obtained by the production method of the present disclosure may optionally be subjected to post-treatment such as concentration, and then the concentrate may be dried and powdered, and the powder may be melt-extruded into pellets. The aqueous medium in the aqueous dispersion described above may contain an additive such as a nonionic surfactant as necessary, but may contain a water-soluble organic solvent such as a water-soluble alcohol, or may contain no water-soluble organic solvent.

The melt extrusion may be performed under any appropriately set extrusion conditions usually capable of providing pellets.

In order to improve the heat resistance of the copolymer and to reinforce a chemical permeation suppression effect of a molded article, the copolymer is preferably subjected to a fluorine gas treatment.

The fluorine gas treatment is performed by bringing fluorine gas into contact with a chemical permeation suppressant. However, since the reaction with fluorine is extremely exothermic, it is preferable to dilute fluorine with an inert gas such as nitrogen. The amount of fluorine in the fluorine gas/inert gas mixture is 1 to 100% by mass, preferably 10 to 25% by mass. The treatment temperature is 150 to 250° C., preferably 200 to 250° C. and the fluorine gas treatment duration is 3 to 16 hours, preferably 4 to 12 hours. The fluorine gas treatment is performed at a gas pressure in the range of 1 to 10 atm, preferably atmospheric pressure. In the case of using a reactor at atmospheric pressure, the fluorine gas/inert gas mixture may be continuously passed through the reactor. This results in conversion of unstable ends of the copolymer into $-CF_3$ ends, thermally stabilizing the copolymer.

The copolymer and the composition thereof may be molded by compression molding, transfer molding, extrusion molding, injection molding, blow molding, or the like as in the case of conventional PFA.

Such a molding technique can provide a desired molded article. Examples of the molded article include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires.

Preferred among these are tubes, pipes, tanks, connectors, and the like to be used for a variety of chemical reaction devices, semiconductor manufacturing devices, and acidic or alkaline chemical feeding devices each requiring chemical impermeability.

The aqueous dispersion of the TFE/perfluoro(alkyl vinyl ether) copolymer and the TFE/perfluoroallyl ether copolymer such as PFA or MFA may also be appropriately mixed with a nonionic surfactant, and optionally polyethersulfone, polyamide-imide, and/or polyimide and metal powder are dissolved or dispersed in an organic solvent. Thereby, a primer composition can be obtained. This primer composition may be used for a method of applying a fluororesin to a metal surface. The method includes applying the primer composition to a metal surface, applying a melt-fabricable fluororesin composition to the resulting primer layer, and firing the melt-fabricable fluororesin composition layer together with the primer layer.

(3) In the production method of the present disclosure, the polymerization for ETFE is preferably performed at a polymerization temperature of 10° C. to 100° C. and a polymerization pressure of 0.3 to 2.0 MPaG.

The ETFE preferably has a monomer composition ratio (mol %) of TFE:ethylene=(50 to 99):(50 to 1). The ETFE may be modified with a third monomer within a range of 0 to 20% by mass of all monomers. The composition ratio thereof is preferably TFE:ethylene:third monomer=(63 to 94):(27 to 2):(1 to 10). The third monomer is preferably perfluorobutyl ethylene, perfluorohexyl ethylene, 3,3,4,4,5,5,6,6,7,7,8,8,8-tridecafluorooct-1-ene, 2,3,3,4,4,5,5-heptafluoro-1-pentene ($CH_2=CFCF_2CF_2CF_2H$), or 2-trifluoromethyl-3,3,3-trifluoropropene ($(CF_3)_2C=CH_2$).

In the polymerization for ETFE, the surfactant may be used within the use range of the production method of the present disclosure, and is usually added in an amount of 0.0001 to 10% by mass based on 100% by mass of the aqueous medium.

In the polymerization for ETFE, the chain transfer agent used is preferably cyclohexane, methanol, ethanol, propanol, ethane, propane, butane, pentane, hexane, carbon tetrachloride, chloroform, methylene chloride, methyl chloride, or the like.

The aqueous dispersion of ETFE obtained by the production method of the present disclosure may optionally be subjected to post-treatment such as concentration, and then the concentrate may be dried and powdered, and the powder may be melt-extruded into pellets. The aqueous medium in the aqueous dispersion described above may contain an additive such as a nonionic surfactant as necessary, but may contain a water-soluble organic solvent such as a water-soluble alcohol, or may contain no water-soluble organic solvent.

The melt extrusion may be performed under any appropriately set extrusion conditions usually capable of providing pellets.

The ETFE may be extrusion-molded into a sheet. In other words, powder or pellets of ETFE in a molten state may be continuously extruded through a die and then cooled to provide a sheet-shaped molded article. The ETFE may be mixed with an additive.

Known additives may be incorporated as appropriate. Specific examples thereof include ultraviolet absorbers, photostabilizers, antioxidants, infrared absorbers, flame retarders, flame-retardant fillers, organic pigments, inorganic pigments, and dyes. From the viewpoint of excellent weather resistance, inorganic additives are preferred.

The content of the additive in the ETFE sheet is preferably 20% by mass or less, and particularly preferably 10% by mass or less, based on the total mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for, for example, outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, vessel inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

(4) The production method of the present disclosure may be used to produce an electrolyte polymer precursor. In the production method of the present disclosure, the polymerization for the electrolyte polymer precursor is preferably performed at a polymerization temperature of 10° C. to 100° C. and a polymerization pressure of 0.1 to 2.0 MPaG. The electrolyte polymer precursor contains a vinyl ether monomer as described below and can be converted into an ion-exchangeable polymer through a hydrolysis treatment.

An example of the vinyl ether monomer to be used for the electrolyte polymer precursor is a fluoromonomer represented by the above-described general formula (150): $CF_2=CF-O-(CF_2CFY^{151}-O)_n-(CFY^{152})_m-A^{151}$.

The electrolyte polymer precursor preferably has a monomer composition ratio (mol %) of TFE:vinyl ether=(50 to 99):(50 to 1), more preferably TFE:vinyl ether=(50 to 93):(50 to 7).

The electrolyte polymer precursor may be modified with a third monomer within a range of 0 to 20% by mass of all monomers. Examples of the third monomer include multifunctional monomers such as CTFE, vinylidene fluoride, perfluoroalkyl vinyl ether, and divinylbenzene.

The electrolyte polymer precursor thereby obtained may be molded into a film, followed by hydrolysis using an alkali solution and a treatment using a mineral acid, and thereby used as a polymer electrolyte film for fuel cells, electrolysis devices, redox flow batteries, and the like.

The electrolyte polymer precursor may be hydrolyzed using an alkali solution while the dispersed state thereof is maintained, thereby providing an electrolyte polymer dispersion.

This dispersion may be then heated up to 120° C. or higher in a pressurized vessel and thereby dissolved in, for example, a solvent mixture of water and an alcohol, i.e., converted into a solution state.

The solution thereby obtained may be used as a binder for electrodes. Also, the solution may be combined with a variety of additives and cast to form a film, and the film may be used for antifouling films, organic actuators, or the like.

(5) TFE/VDF Copolymer

In the production method of the present disclosure, the polymerization for the TFE/VDF copolymer may be performed at any polymerization temperature, for examples, 0 to 100° C. The polymerization pressure is determined as appropriate in accordance with the other polymerization conditions such as the polymerization temperature, and may be usually 0 to 9.8 MPaG.

The TFE/VDF copolymer preferably has a monomer composition ratio (mol %) of TFE:VDF=(5 to 90):(95 to 10). The TFE/VDF copolymer may be modified with a third monomer within a range of 0 to 50 mol % of all monomers. The composition ratio thereof is preferably TFE:ethylene: third monomer=(30 to 85):(10 to 69.9):(0.1 to 10).

The third monomer is preferably a monomer represented by the formula:

$$CX^{11}X^{12}{=}CX^{13}(CX^{14}X^{15})_{n11}X16$$

wherein $X^{11}$ to $X^{16}$ are the same as or different from each other, and each represent H, F, or Cl; n11 represents an integer of 0 to 8, with the proviso that the third monomer is other than TFE and VDF; or a monomer represented by the formula:

$$CX^{21}X^{22}{=}CX^{23}{-}O(CX^{24}X^{25})_{n21}X^{26}$$

wherein $X^{21}$ to $X^{26}$ are the same as or different from each other, and each represent H, F, or Cl; and n21 represents an integer of 0 to 8.

The third monomer may be a fluorine-free ethylenic monomer. From the viewpoint of maintaining the heat resistance and the chemical resistance, the fluorine-free ethylenic monomer is preferably selected from ethylenic monomers having 6 or less carbon atoms. Examples thereof include ethylene, propylene, 1-butene, 2-butene, vinyl chloride, vinylidene chloride, alkyl vinyl ethers (e.g., methyl vinyl ether, ethyl vinyl ether, and propyl vinyl ether), maleic acid, itaconic acid, 3-butenoic acid, 4-pentenoic acid, vinylsulfonic acid, acrylic acid, and methacrylic acid.

In the polymerization for the TFE/VDF copolymer, the surfactant may be used within the use range of the production method of the present disclosure, and is usually added in an amount of 0.0001 to 5% by mass based on 100% by mass of the aqueous medium.

The TFE/VDF copolymer obtained by the polymerization may be amidated by bringing it into contact with a nitrogen compound capable of generating ammonia water, ammonia gas, or ammonia.

The TFE/VDF copolymer obtained by the above-described method may also preferably be used as a material for providing TFE/VDF copolymer fibers by a spinning-drawing method. The spinning-drawing method is a method for obtaining a TFE/VDF copolymer fiber by melt spinning a TFE/VDF copolymer, cooling and solidifying it to obtain an undrawn yarn, and then running the undrawn yarn in a heating cylinder to draw the undrawn yarn.

The TFE/VDF copolymer may be dissolved in an organic solvent to provide a solution of the TFE/VDF copolymer. Examples of the organic solvent include nitrogen-containing organic solvents such as N-methyl-2-pyrrolidone, N,N-dimethyl acetamide, and dimethyl formamide; ketone-based solvents such as acetone, methyl ethyl ketone, cyclohexanone, and methyl isobutyl ketone; ester-based solvents such as ethyl acetate and butyl acetate; ether-based solvents such as tetrahydrofuran and dioxane; and general-purpose organic solvents having a low boiling point such as solvent mixtures thereof. The solution may be used as a binder for batteries.

The aqueous dispersion of the TFE/VDF copolymer may preferably be used to coat a porous base material formed from a polyolefin resin to provide a composite porous film. The aqueous dispersion may also preferably contain inorganic particles and/or organic particles dispersed therein and be used to coat a porous base material to provide a composite porous film. The composite porous film thereby obtained may be used as a separator for lithium secondary batteries.

The powder of the melt-fabricable fluororesin is suitably used as a powdery coating material. When applied to a base material, the powdery coating material made of the melt-fabricable fluororesin powder can provide a film having a smooth surface. The melt-fabricable fluororesin powder having an average particle size of 1 μm or greater and smaller than 100 μm is particularly suitable as a powdery coating material used for electrostatic coating. The melt-fabricable fluororesin powder having an average particle size of 100 μm or greater and 1,000 μm or smaller is particularly suitable as a powdery coating material used for rotational coating or rotational molding.

The melt-fabricable fluororesin powder can be produced by a method of drying the melt-fabricable fluororesin obtained by the production method of the present disclosure to powder the melt-fabricable fluororesin. The production method for producing the melt-fabricable fluororesin powder is also one aspect of the present disclosure.

(III) Fluoroelastomers

In the production method of the present disclosure, the polymerization reaction for the fluoroelastomer is initiated by charging pure water and the hydrocarbon surfactant into a pressure-resistant reaction vessel equipped with a stirrer, deoxidizing the system, charging the monomers, increasing the temperature to a predetermined level, and adding a polymerization initiator. The pressure decreases as the reaction progresses, and additional monomers are fed continuously or intermittently to maintain the initial pressure. When the amount of the monomers fed reaches a predetermined level, feeding is stopped, and the monomers in the reaction vessel are purged and the temperature is returned to room temperature, whereby the reaction is completed. In this case, polymer latex can be continuously taken out of the reaction vessel.

In particular, in the case of producing a thermoplastic elastomer as the fluoroelastomer, it is also possible to use a method in which fluoropolymer fine particles are synthesized at a high concentration defined as described above and then diluted for further polymerization as disclosed in International Publication No. WO00/01741, whereby the final polymerization rate can be increased as compared with ordinary polymerization.

The polymerization for the fluoroelastomer may be performed under conditions appropriately selected from the viewpoints of physical properties of the target polymer and control of the polymerization rate, and is performed at a polymerization temperature of usually −20 to 200° C., preferably 5 to 150° C., and a polymerization pressure of usually 0.5 to 10 MPaG, preferably 1 to 7 MPaG. The polymerization medium preferably has a pH usually maintained at 4.0 to 13 using a pH adjuster to be described later by a known method, for example.

Examples of the monomer used in the polymerization for the fluoroelastomer include vinylidene fluoride, as well as fluorine-containing ethylenically unsaturated monomers having fluorine atoms at least as much as the carbon atoms therein and copolymerizable with vinylidene fluoride. Examples of the fluorine-containing ethylenically unsaturated monomers include trifluoropropene, pentafluoropropene, hexafluorobutene, and octafluorobutene. Of these, hexafluoropropene is particularly preferred because of the properties of the elastomer obtained when hexafluoropropene blocks the crystal growth of the polymer. Examples of the fluorine-containing ethylenically unsaturated monomers also include trifluoroethylene, TFE, and CTFE. Fluorine-containing monomers containing one or two or more chlorine and/or bromine substituents may also be used. Perfluoro (alkyl vinyl ethers) such as perfluoro(methyl vinyl ether) may also be used. TFE and HFP are preferred for producing fluoroelastomer.

The fluoroelastomer preferably has a monomer composition ratio (% by mass) of vinylidene fluoride:HFP:TFE=(20 to 70):(30 to 48):(0 to 32). The fluoroelastomer having this composition ratio exhibits good elastomeric characteristics, chemical resistance, and thermal stability.

In the polymerization for the fluoroelastomer, the surfactant may be used within the use range of the production method of the present disclosure, and is usually added in an amount of 0.0001 to 20% by mass based on 100% by mass of the aqueous medium, preferably 10% by mass or less, and more preferably 2% by mass or less, based on 100% by mass of the aqueous medium.

In the polymerization for the fluoroelastomer, the polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization.

The polymerization initiator to be used may suitably be an oil-soluble radical polymerization initiator, a water-soluble radical polymerization initiator, or a redox initiator described above, and a redox initiator is particularly preferred. All of the embodiments described above may be employed as the redox initiator.

Examples of the redox initiator include combinations of potassium permanganate/oxalic acid, potassium permanganate/ammonium oxalate, manganese triacetate/oxalic acid, manganese triacetate/ammonium oxalate, ammonium cerium nitrate/oxalic acid, and ammonium cerium nitrate/ammonium oxalate.

The redox initiator used is preferably an oxidizing agent or a reducing agent capable of adjusting the pH of the redox initiator aqueous solution to 4.0 or more. The redox initiator aqueous solution means a 0.50% by mass aqueous solution of an oxidizing agent or a 0.50% by mass aqueous solution of a reducing agent.

That is, at least one of the 0.50% by mass aqueous solution of the oxidizing agent and the 0.50% by mass aqueous solution of the reducing agent may have a pH of 4.0 or more, and it is preferable that both the 0.50% by mass aqueous solution of the oxidizing agent and the 0.50% by mass aqueous solution of the reducing agent have a pH of 4.0 or more.

The pH of the redox initiator aqueous solution (0.50% by mass aqueous solution of oxidizing agent or 0.50% by mass aqueous solution of reducing agent) is more preferably 5.0 or more, and still more preferably 5.5 or more, and particularly preferably 6.0 or more.

The redox initiator is particularly preferably a combination of an oxidizing agent which is a salt and a reducing agent which is a salt.

For example, the oxidizing agent which is a salt is more preferably at least one selected from the group consisting of a persulfate, a permanganate, a cerium (IV) salt and a bromate, still more preferably the permanganate, and particularly preferably potassium permanganate.

Further, the reducing agent which is a salt is more preferably at least one selected from the group consisting of oxalate, malonate, succinate, glutarate, and bromate, still more preferably oxalate, and particularly preferably ammonium oxalate.

Specifically, the redox initiator is preferably at least one selected from the group consisting of potassium permanganate/ammonium oxalate, potassium bromate/ammonium sulfite, manganese triacetate/ammonium oxalate, and ammonium cerium nitrate/ammonium oxalate, preferably at least one selected from the group consisting of potassium permanganate/ammonium oxalate, potassium bromate/ammonium sulfite, and ammonium cerium nitrate/ammonium oxalate.

The concentration of the polymerization initiator added is appropriately determined in accordance with the molecular weight of the target fluoroelastomer and the polymerization reaction rate, and is set to 0.0001 to 10% by mass, preferably 0.01 to 5% by mass, based on 100% by mass of the total amount of the monomers.

In the polymerization for the fluoroelastomer, a known chain transfer agent may be used, and examples thereof include hydrocarbons, esters, ethers, alcohols, ketones, chlorine compounds, and carbonates. A hydrocarbon, an ester, an ether, an alcohol, a chlorine compound, an iodine compound, or the like may be used as the thermoplastic elastomer, for example. Of these, preferred are acetone and isopropyl alcohol. From the viewpoint of reducing a reaction rate drop in polymerization for a thermoplastic elastomer, isopentane, diethyl malonate, and ethyl acetate are preferred. Diiodine compounds such as $I(CF_2)_4I$, $I(CF_2)_6I$, and $ICH_2I$ are preferred because they can iodize ends of the polymer and allow the resulting polymer to serve as a reactive polymer.

The amount of the chain transfer agent used is usually $0.5\times10^{-3}$ to $5\times10^{-3}$ mol %, preferably $1.0\times10^{-3}$ to $3.5\times10^{-3}$ mol %, based on the total amount of the monomers fed.

Paraffin wax may preferably be used as an emulsification stabilizer on the polymerization for the fluoroelastomer, for example. A phosphate, sodium hydroxide, potassium hydroxide, or the like may preferably be used as a pH adjuster in the polymerization for a thermoplastic elastomer, for example.

At completion of the polymerization, the fluoroelastomer obtained by the production method of the present disclosure has a solid concentration of 1.0 to 40% by mass, an average particle size of 0.03 to 1 μm, preferably 0.05 to 0.5 μm, and a number-average molecular weight of 1,000 to 2,000,000.

The fluoroelastomer obtained by the production method of the present disclosure may optionally be mixed with a dispersion stabilizer such as a hydrocarbon surfactant or be concentrated, for example, to form a dispersion suitable for rubber molding. The dispersion is subjected to treatments such as pH adjustment, solidification, and heating. The treatments are performed as follows.

The pH adjustment is performed such that a mineral acid such as nitric acid, sulfuric acid, hydrochloric acid, or phosphoric acid and/or a carboxylic acid or the like having 5 or less carbon atoms and having pK=4.2 or lower is added to adjust the pH to 2 or lower.

The solidification is performed by adding an alkaline earth metal salt. Examples of the alkaline earth metal salt include nitrates, chlorates, and acetates of calcium or magnesium.

Although the pH adjustment and the solidification may be performed in any order, the pH adjustment is preferably performed prior to performing the solidification.

These operations are followed by washing with the same volume of water as the fluoroelastomer to remove a small amount of impurities such as buffer solution and salts present in the fluoroelastomer and drying of the fluoroelastomer. The drying is usually performed at about 70 to 200° C. while the air is circulated in a drying furnace at high temperature.

The fluoroelastomer may be either a partially fluorinated elastomer or a perfluoroelastomer.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, and ethylene/hexafluoropropylene (HFP)/tetrafluoroethylene (TFE)-based fluoroelastomers. Of these, the partially fluorinated elastomer is preferably at least one selected from the group consisting of vinylidene fluoride-based fluoroelastomers and tetrafluoroethylene/propylene-based fluoroelastomers.

The vinylidene fluoride-based fluoroelastomer is preferably a copolymer containing 45 to 85 mol % of vinylidene fluoride and 55 to 15 mol % of at least one monomer copolymerizable with and different from vinylidene fluoride. The vinylidene fluoride-based fluoroelastomer is more preferably a copolymer containing 50 to 80 mol % of vinylidene fluoride and 50 to 20 mol % of at least one monomer copolymerizable with and different from vinylidene fluoride.

Examples of the at least one monomer copolymerizable with and different from vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluorisobutene, vinyl fluoride, a fluoromonomer represented by the general formula (100): $CH_2{=}CFRf^{101}$ (wherein $Rf^{101}$ is a linear or branched fluoroalkyl group having 1 to 12 carbon atoms), a fluoromonomer represented by the general formula (170): $CH_2{=}CH{-}(CF_2)_n{-}X^{171}$ (wherein $X^{171}$ is H or F; and n is an integer of 3 to 10), and a monomer that provides a crosslinking site; and non-fluorinated monomers such as ethylene, propylene, and alkyl vinyl ethers. These may be used alone or in any combination thereof. Of these, preferred is at least one selected from the group consisting of TFE, HFP, fluoroalkyl vinyl ether, and CTFE. The fluoroalkyl vinyl ether is preferably a fluoromonomer represented by the general formula (160).

Specific examples of the vinylidene fluoride-based fluoroelastomers include VdF/HFP-based rubber, VdF/HFP/TFE-based rubber, VdF/CTFE-based rubber, VdF/CTFE/TFE-based rubber, rubber based on VDF and a fluoromonomer represented by the general formula (100), rubber based on VDF, a fluoromonomer represented by the general formula (100), and TFE, rubber based on VDF and perfluoro(methyl vinyl ether)(PMVE), VDF/PMVE/TFE-based rubber, and VDF/PMVE/TFE/HFP-based rubber. The rubber based on VDF and a fluoromonomer represented by the general formula (100) is preferably VDF/$CH_2{=}CFCF_3$-based rubber. The rubber based on VDF, a fluoromonomer represented by the formula (100), and TFE is preferably VDF/TFE/$CH_2{=}CFCF_3$-based rubber.

The VDF/$CH_2{=}CFCF_3$-based rubber is preferably a copolymer containing 40 to 99.5 mol % of VDF and 0.5 to 60 mol % of $CH_2{=}CFCF_3$, more preferably a copolymer containing 50 to 85 mol % of VDF and 20 to 50 mol % of $CH_2{=}CFCF_3$.

The tetrafluoroethylene/propylene-based fluoroelastomer is preferably a copolymer containing 45 to 70 mol % of tetrafluoroethylene, 55 to 30 mol % of propylene, and 0 to 5 mol % of a fluoromonomer that provides a crosslinking site.

The fluoroelastomer may be a perfluoroelastomer. The perfluoroelastomer is preferably at least one selected from the group consisting of perfluoroelastomers containing TFE, such as a copolymer containing TFE and a fluoromonomer represented by the general formula (160), (130), or (140) and a copolymer containing TFE, a fluoromonomer represented by the general formula (160), (130), or (140), and a monomer that provides a crosslinking site.

In the case of the TFE/PMVE copolymer, the composition ratio thereof is preferably 45 to 90/10 to 55 (mol %), more preferably 55 to 80/20 to 45, and still more preferably 55 to 70/30 to 45.

In the case of the copolymer of TFE, PMVE, and a monomer that provides a crosslinking site, the composition ratio thereof is preferably 45 to 89.9/10 to 54.9/0.01 to 4 (mol %), more preferably 55 to 77.9/20 to 49.9/0.1 to 3.5, and still more preferably 55 to 69.8/30 to 44.8/0.2 to 3.

In the case of the copolymer of TFE and a fluoromonomer represented by the general formula (160), (130), or (140) having 4 to 12 carbon atoms, the composition ratio thereof is preferably 50 to 90/10 to 50 (mol %), more preferably 60 to 88/12 to 40, and still more preferably 65 to 85/15 to 35.

In the case of the copolymer of TFE, a fluoromonomer represented by the general formula (160), (130), or (140) having 4 to 12 carbon atoms, and a monomer that provides a crosslinking site, the composition ratio thereof is preferably 50 to 89.9/10 to 49.9/0.01 to 4 (mol %), more preferably 60 to 87.9/12 to 39.9/0.1 to 3.5, and still more preferably 65 to 84.8/15 to 34.8/0.2 to 3.

When these copolymers have compositional features outside these ranges, the properties as a rubber elastic body are lost, and the properties tend to be close to those of a resin.

The perfluoroelastomer is preferably at least one selected from the group consisting of copolymers of TFE, a fluoromonomer represented by the general formula (140), and a fluoromonomer that provides a crosslinking site, copolymers of TFE and a perfluorovinyl ether represented by the general formula (140), copolymers of TFE and a fluoromonomer represented by the general formula (160), and copolymers of TFE, a fluoromonomer represented by the general formula (160), and a monomer that provides a crosslinking site.

Examples of the perfluoroelastomer further include the perfluoroelastomers disclosed in documents such as International Publication No. WO97/24381, Japanese Patent Publication No. 61-57324, Japanese Patent Publication No. 04-81608, and Japanese Patent Publication No. 05-13961.

From the viewpoint of achieving an excellent compression set at high temperature, the fluoroelastomer preferably has a glass transition temperature of −70° C. or higher, more preferably −60° C. or higher, and still more preferably −50° C. or higher. From the viewpoint of achieving good cold resistance, the glass transition temperature is preferably 5° C. or lower, more preferably 0° C. or lower, and still more preferably −3° C. or lower.

The glass transition temperature can be determined as follows. Specifically, using a differential scanning calorimeter (DSC822e, manufactured by Mettler-Toledo International Inc.), 10 mg of a sample is heated at a rate of 10° C./min to give a DSC curve, and the temperature is read at the midpoint of two intersections between each of the extension lines of the base lines before and after the secondary transition of the DSC curve and the tangent line at the inflection point of the DSC curve.

From the viewpoint of achieving good heat resistance, the fluoroelastomer preferably has a Mooney viscosity ML (1+20) at 170° C. of 30 or higher, more preferably 40 or higher, and still more preferably 50 or higher. From the viewpoint of achieving good processability, the Mooney viscosity is preferably 150 or lower, more preferably 120 or lower, and still more preferably 110 or lower.

From the viewpoint of achieving good heat resistance, the fluoroelastomer preferably has a Mooney viscosity ML (1+20) at 140° C. of 30 or higher, more preferably 40 or higher, and still more preferably 50 or higher. From the viewpoint of achieving good processability, the Mooney viscosity is preferably 180 or lower, more preferably 150 or lower, and still more preferably 110 or lower.

From the viewpoint of achieving good heat resistance, the fluoroelastomer preferably has a Mooney viscosity ML (1+10) at 100° C. of 10 or higher, more preferably 20 or higher, and still more preferably 30 or higher. From the viewpoint of achieving good processability, the Mooney viscosity is preferably 120 or lower, more preferably 100 or lower, and still more preferably 80 or lower.

The Mooney viscosity can be determined using a Mooney viscometer MV2000E manufactured by Alpha Technologies Inc. at 170° C., 140° C., or 100° C. in conformity with JIS K 6300.

The fluoroelastomer obtained by the production method of the present disclosure may be in any form as long as it is obtainable by the polymerization. The fluoroelastomer may be in the form of an aqueous dispersion as polymerized, or may be used in the form of a gum or a crumb obtained by conventional coagulation, drying, and any other treatment on the aqueous dispersion as polymerized. The hydrocarbon surfactant used in the production method of the present disclosure can improve the stability of the aqueous dispersion, and is more preferably used in a polymerization method in which substances insoluble in water such as an initiator, including an organic peroxide, and a chain transfer agent, including an iodine or bromine compound, are added during the polymerization defined as described above.

The gum is a small particulate mass of the fluoroelastomer. The crumb is an amorphous mass of the fluoroelastomer resulting from fusion of particles that cannot maintain the form of small particles as gum at room temperature.

The fluoroelastomer may be mixed with an additive such as a curing agent and a filler to be processed into a fluoroelastomer composition.

Examples of the curing agent include polyols, polyamines, organic peroxides, organotins, bis(aminophenol)tetraamine, and bis(thioaminophenol).

The fluoroelastomer composition is made of the above fluoroelastomer, and thus is substantially free of an emulsifier and is excellent in that it is easily crosslinked during molding.

The fluoroelastomer may be molded to form a fluoroelastomer molded body. The molding may be performed by any method such as a known method using the above-mentioned curing agent.

The fluoroelastomer molded body is suitable for seals, gaskets, electric wire coatings, hoses, tubes, laminated products, and accessories, particularly parts for semiconductor manufacturing devices and automobile parts.

The fluoropolymer obtained by the production method of the present disclosure is preferably a fluororesin, still more preferably a fluororesin having a fluorine substitution percentage of 50% or higher, further preferably a fluororesin having a fluorine substitution percentage of higher than 50%, further preferably a fluororesin having a fluorine substitution percentage of 55% or higher, further preferably a fluororesin having a fluorine substitution percentage of 60% or higher, further preferably a fluororesin having a fluorine substitution percentage of 75% or higher, particularly preferably a fluororesin having a fluorine substitution percentage of 80% or higher, and most preferably a fluororesin having a fluorine substitution percentage of 90 to 100%, i.e., a perfluororesin. The perfluororesin is more preferably a fluororesin having a fluorine substitution percentage of 95 to 100%, still more preferably PTFE, FEP, or PFA, particularly preferably PTFE, and still further preferably high-molecular-weight PTFE.

The present disclosure also provides a PTFE composition comprising polytetrafluoroethylene and at least one atom selected from the group consisting of manganese, bromine, and cerium, and being substantially free from a fluorine-containing surfactant.

The PTFE composition of the present disclosure can be obtained, for example, by polymerizing TFE in the presence of a hydrocarbon surfactant and substantially in the absence of a fluorine-containing surfactant, using a redox initiator as a polymerization initiator, and using a compound containing manganese, cerium or bromine, such as permanganic acid, permanganate, manganese triacetate, cerium salt, bromic acid or bromate, as an oxidizing agent of the redox initiator.

The PTFE composition of the present disclosure is more preferably obtained by using a compound containing manganese or bromine, such as permanganate or bromate as the oxidizing agent of the redox initiator, and still more preferably obtained by using a compound containing manganese, such as permanganate.

In the PTFE composition of the present disclosure, at least one atom selected from the group consisting of manganese, bromine, and cerium is preferably manganese.

In other words, it is preferable that the PTFE composition of the present disclosure contains PTFE and manganese, and substantially free from a fluorine-containing surfactant.

The PTFE composition of the present disclosure preferably has a total content of manganese, bromine and cerium of 0.10% by mass or less. The content thereof is more preferably 0.05% by mass or less, and still more preferably 0.03% by mass or less. The lower limit of the total content is not limited, but may be, for example, 0.0001% by mass or more. In this case, the at least one atom selected from the group consisting of manganese, bromine, and cerium is preferably manganese. The contents of manganese, bromine and cerium in the PTFE compositions of the present disclosure can be determined, for example, by dissolving the residue obtained by thermal decomposition of the PTFE composition at 600° C. in hydrochloric acid and performing inductively coupled plasma mass spectrometry (ICP-MS) or inductively coupled plasma emission spectrometry (ICP-AES) on the resulting solution.

The PTFE composition of the present disclosure also preferably has a manganese content of 0.10% by mass or less. The content thereof is more preferably 0.05% by mass or less, and still more preferably 0.03% by mass or less. The lower limit of the content is not limited, but may be, for example, 0.0001% by mass or more.

The PTFE in the PTFE composition of the present disclosure may have all the characteristics of PTFE described in the production method of the present disclosure described above. In particular, high-molecular-weight PTFE is preferable.

In the PTFE composition of the present disclosure, the PTFE is preferably non melt-processible. The term "non melt-processible" means a feature of polymer that the melt flow rate thereof cannot be measured at a temperature higher than the crystal melting point in conformity with ASTM D-1238.

Further, the PTFE is preferably fibrillatable. The fibrillability of PTFE can be determined by whether or not paste extrusion is possible as described above. Therefore, the PTFE is preferably paste-extrudable.

In the PTFE composition of the present disclosure, the PTFE is preferably obtained by emulsion polymerization. The PTFE powder obtained by emulsion polymerization is generally referred to as PTFE fine powder.

In the PTFE composition of the present disclosure, the average primary particle size of the PTFE is preferably 1000 nm or less, more preferably 500 nm or less, still more preferably 400 nm or less, and particularly preferably 350 nm or less. The lower limit of the average primary particle size may be, for example, but not limited to, 50 nm or 100 nm. From the viewpoint of molecular weight, for example, in the case of high-molecular-weight PTFE, it is preferably 100 nm or more, and more preferably 150 nm or more.

The average primary particle size can be determined by dynamic light scattering. The average primary particle size may be determined by preparing a PTFE aqueous dispersion with a solid concentration adjusted to about 1.0% by mass and using a dynamic light scattering method at 25° C. with 70 measurement processes, wherein the solvent (water) has a refractive index of 1.3328 and the solvent (water) has a viscosity of 0.8878 mPa·s. The dynamic light scattering may use, for example, ELSZ-1000S (manufactured by Otsuka Electronics Co., Ltd.).

Such PTFE can be obtained by emulsion polymerization and is distinguished from PTFE obtained by suspension polymerization.

In the PTFE composition of the present disclosure, the PTFE is preferably a modified PTFE containing 99.0% by mass or more of a polymerized unit based on TFE and 1.0% by mass or less of a polymerized unit based on a modifying monomer. In particular, the modifying monomer preferably contains at least one selected from the group consisting of hexafluoropropylene, perfluoro(alkyl vinyl ether) and (perfluoroalkyl)ethylene from the viewpoint of reactivity with TFE. The modifying monomer more preferably contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, the perfluoro(alkyl vinyl ether) unit and the (perfluoroalkyl) ethylene unit is preferably in the range of 0.00001 to 1% by mass based on PTFE. The lower limit of the total amount is more preferably 0.0001% by mass, and still more preferably 0.001% by mass. The upper limit thereof is more preferably 0.50% by mass, still more preferably 0.40% by mass, further preferably 0.30% by mass, still further preferably 0.10% by mass, particularly preferably 0.05% by mass, and most preferably 0.01% by mass.

In the PTFE composition of the present disclosure, the total content of PTFE and at least one selected from the group consisting of manganese, bromine and cerium is preferably 99.0% by mass or more, more preferably 99.5% by mass or more, still more preferably 99.9% by mass or more, and may be substantially 100.0% by mass. In the PTFE composition of the present disclosure, "substantially 100.0% by mass" means that the components other than PTFE, manganese, bromine and cerium are 1 ppm or less.

The present disclosure also provides a PTFE powder (hereinafter also referred to as "first PTFE powder of the present disclosure") having a breaking strength of 29.0N or more measured under the following condition (X) of a stretched beading produced under the following condition (A) by a heat treatment at a temperature of 240° C., and substantially free from a fluorine-containing surfactant:

Condition (A):

To 100 g of a PTFE powder, 21.7 g of a lubricant is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The extrusion speed, i.e. ram speed, is 20 inch/min (51 cm/min).

The PTFE extruded beading containing the lubricant obtained by paste extrusion is dried at 230° C. for 30 minutes to remove the lubricant from the beading and thereby to obtain a dried PTFE extruded beading. Next, the dried PTFE extruded beading is cut in an appropriate length and clamped at each end leaving a space of 1.5 inch (38 mm) between clamps, and heated to 300° C. in an air circulation furnace. Then, the clamps are moved apart from each other at 1,000%/sec until the separation distance corresponds to 2,400% to perform the stretching test and obtain a stretched beading. This stretch method essentially follows a method disclosed in U.S. Pat. No. 4,576,869, except that the extrusion speed is different (51 cm/min instead of 84 cm/min). "Stretch" is an increase in length due to stretching, usually expressed as a ratio to the original length.

Condition (X):

The stretched beading (produced by stretching the beading) is clamped by movable jaws having a gauge length of 5.0 cm, and a tensile test is performed at 25° C. at a rate of 300 mm/min, and the strength at the time of breaking is taken as the breaking strength.

The lubricant to be used may be a lubricant which is made of 100% isoparaffin hydrocarbon, has an initial boiling point of 180° C., a dry point of 188° C., a flash point of 54° C., a density (15° C.) of 0.758 g/$cm^3$, KB (Kauri-butanol level)$_{26}$, an aniline point of 85° C., and an aromatic content of <0.01% by mass, and specifically, Isopar H® manufactured by Exxon can be used as such lubricant.

The present disclosure further provides a PTFE powder (hereinafter also referred to as "second PTFE powder of the present disclosure") having a breaking strength of 29.0N or more measured under the following condition (X) of a stretched beading (stretched body) produced under the condition (A) by a heat treatment at a temperature of 240° C., and having a thermal instability index (TII) of 20 or more.

The first and second PTFE powders of the present disclosure have a breaking strength of 29.0N or more measured under the condition (X) of the stretched beading (stretched body) produced under the condition (A). The breaking strength is more preferably 30.0N or more, still more preferably 32.0N or more, and more preferably 35.0N or more. The higher the breaking strength, the better, and the upper limit of the breaking strength is not limited, but may be, for example, 80.0N or less, or 50.0N or less. The breaking strength is a value determined by the following method.

The breaking strength of the stretched body is determined by clamping the stretched body produced under the condition (A) after the heat treatment by movable jaws having a gauge length of 5.0 cm and performing a tensile test at 25° C. at a rate of 300 mm/min, in which the strength at the time of breaking is taken as the breaking strength.

The present disclosure also provides a polytetrafluoroethylene powder (hereinafter also referred to as "third PTFE powder of the present disclosure") having a breaking strength of 22.0N or more measured under the condition (X) of a stretched beading produced under the following condition (B) by a heat treatment at a temperature of 240° C., and substantially free from a fluorine-containing surfactant:

Condition (B):

To 100 g of a PTFE powder, 21.7 g of a lubricant is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The extrusion speed, i.e. ram speed, is 20 inch/min (51 cm/min).

The PTFE extruded beading containing the lubricant obtained by paste extrusion is dried at 230° C. for 30 minutes to remove the lubricant from the beading and thereby to obtain a dried PTFE extruded beading. Next, the dried PTFE extruded beading is cut in an appropriate length and clamped at each end leaving a space of 2.0 inch (51 mm) between clamps, and heated to 300° C. in an air circulation furnace. Then, the clamps are moved apart from each other at 100%/sec until the separation distance corresponds to 2,400% to perform the stretching test and obtain a stretched beading. This stretch method essentially follows a method disclosed in U.S. Pat. No. 4,576,869, except that the extrusion speed is different (51 cm/min instead of 84 cm/min). "Stretch" is an increase in length due to stretching, usually expressed as a ratio to the original length.

Condition (X):

The stretched beading (produced by stretching the beading) is clamped by movable jaws having a gauge length of 5.0 cm, and a tensile test is performed at 25° C. at a rate of 300 mm/min, and the strength at the time of breaking is taken as the breaking strength.

The lubricant to be used may be a lubricant which is made of 100% isoparaffin hydrocarbon, has an initial boiling point of 180° C., a dry point of 188° C., a flash point of 54° C., a density (15° C.) of 0.758 g/cm$^3$, KB (Kauri-butanol level)$_{26}$, an aniline point of 85° C., and an aromatic content of <0.01% by mass, and specifically, Isopar H® manufactured by Exxon can be used as such lubricant.

The present disclosure further provides a PTFE powder (hereinafter also referred to as "fourth PTFE powder of the present disclosure") having a breaking strength of 22.0N or more of a stretched body produced under the condition (B) by a heat treatment at a temperature of 240° C., and having a thermal instability index (TII) of 20 or more.

The third and fourth PTFE powders of the present disclosure have a breaking strength of 22.0N or more measured under the condition (X) of the stretched beading (stretched body) produced under the condition (B). The breaking strength is more preferably 23.0N or more, still more preferably 25.0N or more, more preferably 28.0N or more, and particularly preferably 30.0N or more. The higher the breaking strength, the better, and the upper limit of the breaking strength is not limited, but may be, for example, 80.0N or less, or 50.0N or less.

The first to fourth PTFE powders of the present disclosure preferably contain, based on the total mass of solid content, 99.0% by mass or more of PTFE and 1.0% by mass or less of components other than PTFE, more preferably 99.5% by mass or more of PTFE and 0.5% by mass or less of components other than PTFE, still more preferably 99.9% by mass or more of PTFE and 0.1% by mass or less of components other than PTFE, and particularly preferably substantially 100.0% by mass of PTFE.

The first to fourth PTFE powders of the present disclosure may be a wet powder and may contain 0.0001 to 50% by mass of an aqueous medium. The amount of the aqueous medium may be 0.0001 to 1.0% by mass or 0.0001 to 0.01% by mass.

The amount of the aqueous medium can be determined by weight loss when dried at 150° C. for 60 minutes.

For the first to fourth PTFE powders of the present disclosure, the heat treatment is performed at 240° C. More specifically, the heat treatment is performed under the conditions of 240° C. and 18 hours.

The heat treatment may be for drying the first to fourth PTFE powders of the present disclosure. For example, when the first to fourth PTFE powders of the present disclosure are wet powders of PTFE, the moisture contained in the wet powder may be dried.

In the first to fourth PTFE powders of the present disclosure, the stretched body is preferably produced under the above conditions (A) or (B).

The first to fourth PTFE powders of the present disclosure can be obtained by the production method of the present disclosure. In the production method of the present disclosure, high-molecular-weight PTFE can be produced even in the presence of a hydrocarbon surfactant and substantially in the absence of a fluorine-containing surfactant, and thus PTFE powder substantially free from the hydrocarbon surfactant can be produced while satisfying the above breaking strength. Further, the instability index (TII) can be set to 20 or more by polymerizing in the presence of a hydrocarbon surfactant.

The present disclosure further provides a polytetrafluoroethylene powder (hereinafter also referred to as "fifth PTFE powder of the present disclosure") having an extrusion pressure of 50.0 MPa or lower, having a breaking strength of 29.0N or more measured under the condition (X) of a stretched beading (stretched body) produced under the condition (A), and substantially free from a fluorine-containing surfactant:

In the fifth PTFE powder of the present disclosure, the thermal instability index (TII) may be 20 or more.

Such PTFE can be obtained by using a hydrocarbon surfactant. The TII is measured in conformity with ASTM D 4895-89.

The present disclosure further provides a polytetrafluoroethylene powder (hereinafter also referred to as "sixth PTFE powder of the present disclosure") having an extrusion pressure of 50.0 MPa or lower, having a breaking strength of 29.0N or more measured under the condition (X) of a stretched beading (stretched body) produced under the condition (A), and having a thermal instability index (TII) of 20 or more:

The sixth PTFE powder of the present disclosure is preferably substantially free from a fluorine-containing surfactant.

The fifth and sixth PTFE powders of the present disclosure preferably have a breaking strength of 29.0N or more measured under the condition (X) of the stretched beading (stretched body) produced under the condition (A) The breaking strength is more preferably 30.0N or more, still more preferably 32.0N or more, and more preferably 35.0N or more. The higher the breaking strength, the better, but the upper limit of the breaking strength is, for example, 80.0N.

The fifth and sixth PTFE powders of the present disclosure preferably have a breaking strength of 22.0N or more measured under the condition (X) of the stretched beading (stretched body) produced under the condition (B) The breaking strength is more preferably 23.0N or more, still more preferably 25.0N or more, more preferably 28.0N or more, and particularly preferably 30.0N or more. The higher the breaking strength, the better, and the upper limit of the breaking strength is not limited, but may be, for example, 80.0N or less, or 50.0N or less.

The present disclosure further provides a polytetrafluoroethylene powder (hereinafter also referred to as "seventh PTFE powder of the present disclosure") having a breaking strength of 34.0N or more measured under the condition (X) of a stretched beading (stretched body) produced under the condition (A), and substantially free from a fluorine-containing surfactant:

In the seventh PTFE powder of the present disclosure, the thermal instability index (TII) may be 20 or more. Such PTFE can be obtained by using a hydrocarbon surfactant. The TII is measured in conformity with ASTM D 4895-89.

The present disclosure also provides a polytetrafluoroethylene powder (hereinafter also referred to as "eighth PTFE powder of the present disclosure") having a breaking strength of 34.0N or more measured under the above condition (X) of a stretched beading (stretched body) produced under the condition (A), and having a thermal instability index (TII) of 20 or more:

The eighth PTFE powder of the present disclosure is preferably substantially free from a fluorine-containing surfactant.

The present disclosure further provides a polytetrafluoroethylene powder (hereinafter also referred to as "ninth PTFE powder of the present disclosure") having a breaking strength of 29.0N or more measured under the condition (X) of a stretched beading (stretched body) produced under the condition (B), and substantially free from a fluorine-containing surfactant.

In the ninth PTFE powder of the present disclosure, the thermal instability index (TII) may be 20 or more.

Such PTFE can be obtained by using a hydrocarbon surfactant. The TII is measured in conformity with ASTM D 4895-89.

The present disclosure also provides a polytetrafluoroethylene powder (hereinafter also referred to as "tenth PTFE powder of the present disclosure") having a breaking strength of 29.0N or more measured under the above condition (X) of a stretched beading (stretched body) produced under the condition (B), and having a thermal instability index (TII) of 20 or more:

The tenth PTFE powder of the present disclosure is preferably substantially free from a fluorine-containing surfactant.

The seventh to tenth PTFE powders of the present disclosure preferably have a breaking strength of 34.0N or more measured under the condition (X) of the stretched beading (stretched body) produced under the condition (A) The breaking strength is more preferably 35.0N or more, still more preferably 37.0N or more, and more preferably 40.0N or more. The higher the breaking strength, the better, but the upper limit of the breaking strength is, for example, 100.0N.

The seventh to tenth PTFE powders of the present disclosure preferably have a breaking strength of 29.0N or more measured under the condition (X) of the stretched beading (stretched body) produced under the condition (B) The breaking strength is more preferably 30.0N or more, still more preferably 32.0N or more, and more preferably 35.0N or more. The higher the breaking strength, the better, and the upper limit of the breaking strength is not limited, but may be, for example, 100.0N or less, or 80.0N or less.

The fifth to tenth PTFE powders of the present disclosure contain PTFE. The PTFE may have all the configurations of PTFE described in the production method of the present disclosure.

The fifth to tenth PTFE powders of the present disclosure preferably contain 99.0% by mass or more of PTFE and 1.0% by mass or less of components other than PTFE, more preferably 99.5% by mass or more of PTFE and 0.5% by mass or less of components other than PTFE, still more preferably 99.9% by mass or more of PTFE and 0.1% by mass or less of components other than PTFE, and particularly preferably substantially 100.0% by mass of PTFE.

The fifth to tenth PTFE powders of the present disclosure can be obtained by the production method of the present disclosure. In the production method of the present disclosure, high-molecular-weight PTFE can be produced even in the presence of a hydrocarbon surfactant and substantially in the absence of a fluorine-containing surfactant, and thus PTFE powder substantially free from the hydrocarbon surfactant can be produced while satisfying the above breaking strength. Further, the instability index (TII) can be set to 20 or more by polymerizing in the presence of a hydrocarbon surfactant.

The first to tenth PTFE powders of the present disclosure may have a thermal instability index (TII) of 25 or more, 30 or more, 35 or more, and 40 or more.

The first to tenth PTFE powders of the present disclosure preferably have an extrusion pressure of 50.0 MPa or lower, more preferably 40.0 MPa or lower, preferably 8.0 MPa or higher, and still more preferably 10.0 MPa or higher. The extrusion pressure is a value determined by the following method according to a method disclosed in Japanese Patent Laid-Open No. 2002-201217.

To 100 g of PTFE powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The extrusion speed, i.e. ram speed, is 20 inch/min (51 cm/min). The extrusion pressure is a value obtained by measuring the load when the extrusion load becomes balanced in the paste extrusion and dividing the measured load by the cross-sectional area of the cylinder used in the paste extrusion.

The first to tenth PTFE powders of the present disclosure are preferably stretchable. The term "stretchable" as used herein is determined based on the following criteria.

To 100 g of PTFE powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading. The extrusion speed, i.e. ram speed, is 20 inch/min (51 cm/min). The beading obtained by paste extrusion is heated at 230° C. for 30 minutes to remove the lubricant from the beading. Next, the beading (extruded body) is cut in an appropriate length and clamped at each end leaving a space of 1.5 inch (38 mm) between clamps, and heated to 300° C. in an air circulation furnace. Then, the clamps are moved apart from each other at a desired rate (stretch rate) until the separation distance corresponds to a desired stretch (total stretch) to perform the stretch test. This stretch method essentially follows a method disclosed in U.S. Pat. No. 4,576,869, except that the extrusion speed is different (51 cm/min instead of 84 cm/min). "Stretch" is an increase in length due to stretching, usually expressed as a ratio to the original length. In the production method, the stretching rate is 1,000%/sec, and the total stretching is 2,400%. This means that a stretched beading with a uniform appearance can be obtained without cutting in this stretching test.

The first to tenth PTFE powders of the present disclosure preferably have a stress relaxation time of 50 seconds or more, more preferably 80 seconds or more, still more preferably 100 seconds or more, and particularly preferably 120 seconds or more. The stress relaxation time is a value measured by the following method.

Both ends of the stretched body (stretched beading) produced under the above condition (A) are tied to a fixture to form a tightly stretched beading sample having an overall length of 8 inches (20 cm). The fixture is placed in an oven through a (covered) slit on the side of the oven, while keeping the oven at 390° C. The time it takes for the beading sample to break after it is placed in the oven is taken as the stress relaxation time.

The first to tenth PTFE powders of the present disclosure may have a 0.1% mass loss temperature of 400° C. or lower. PTFE powder having a 0.1% mass loss temperature of 400° C. or lower can be obtained by using a hydrocarbon surfactant. The 0.1% mass loss temperature is a value measured by the following method.

Approximately 10 mg of PTFE powder, which has no history of heating to a temperature of 300° C. or more, is precisely weighed and stored in a dedicated aluminum pan, and the 0.1% mass loss temperature is measured using TG/DTA (thermogravimetric—differential thermal analyzer). The 0.1% mass loss temperature is the temperature corresponding to the point at which the weight of the aluminum pan is reduced by 0.1% by mass by heating the aluminum pan under the condition of 10° C./min in the temperature range from 25° C. to 600° C. in the air atmosphere.

The first to tenth PTFE powders of the present disclosure may have a 1.0% mass loss temperature of 492° C. or lower. PTFE having a 1.0% mass loss temperature of 492° C. or lower can be obtained by using a hydrocarbon surfactant. The 1.0% mass loss temperature is a value measured by the following method.

Approximately 10 mg of PTFE powder, which has no history of heating to a temperature of 300° C. or more, is precisely weighed and stored in a dedicated aluminum pan, and the 0.1% mass loss temperature is measured using TG/DTA (thermogravimetric—differential thermal analyzer). The 1.0% mass loss temperature is the temperature corresponding to the point at which the weight of the aluminum pan is reduced by 1.0% by mass by heating the aluminum pan under the condition of 10° C./min in the temperature range from 25° C. to 600° C. in the air atmosphere.

The first to tenth PTFE powders of the present disclosure preferably have an average particle size (average secondary particle size) of 100 to 2,000 μm.

The lower limit of the average secondary particle size is more preferably 200 μm or more, and still more preferably 300 μm or more. The upper limit of the average secondary particle size is preferably 1,000 μm or less, more preferably 800 μm or less, and particularly preferably 700 μm or less. The average particle size is a value measured in conformity with JIS K 6891.

The PTFE in the first to tenth PTFE powders of the present disclosure may have all the characteristics of PTFE described in the production method of the present disclosure described above. In particular, high-molecular-weight PTFE is preferable.

Further, the PTFE is preferably a modified PTFE containing 99.0% by mass or more of a polymerized unit based on TFE and 1.0% by mass or less of a polymerized unit based on a modifying monomer. In particular, the modifying monomer preferably contains at least one selected from the group consisting of hexafluoropropylene, perfluoro(alkyl vinyl ether) and (perfluoroalkyl)ethylene from the viewpoint of reactivity with TFE. The modifying monomer more preferably contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, the perfluoro(alkyl vinyl ether) unit and the (perfluoroalkyl) ethylene unit is preferably in the range of 0.00001 to 1% by mass based on PTFE. The lower limit of the total amount is more preferably 0.0001% by mass, still more preferably 0.001% by mass, and the upper limit thereof is more preferably 0.50% by mass, still more preferably 0.40% by mass, and further preferably 0.30% by mass, still further preferably 0.10% by mass, particularly preferably 0.05% by mass, and most preferably 0.01% by mass.

In the case of evaluating the thermal instability index (TII), stretchability criterion, extrusion pressure, stress relaxation time, 0.1% mass loss temperature, 1.0% mass loss temperature, elastic modulus, average particle size (average secondary particle size) and the like of the first to fourth PTFE powders of the present disclosure, the PTFE powders obtained by a heat treatment (drying) at 240° C. were used for evaluation.

In the first to tenth PTFE powders of the present disclosure, the term "substantially free from a fluorine-containing surfactant" means that the amount of the fluorine-containing surfactant is 10 ppm or less based on PTFE. The content of the fluorine-containing surfactant is preferably 1 ppm or less, more preferably 100 ppb or less, still more preferably 10 ppb or less, further preferably 1 ppb or less, and particularly preferably the fluorine-containing surfactant is equal to or below the detection limit as measured by liquid chromatography-mass spectrometry (LC/MS/MS).

The amount of the fluorine-containing surfactant can be determined by a known method. For example, it can be determined by LC/MS/MS analysis. First, the resulting powder is extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The resulting powder is subjected to Soxhlet extraction with methanol, and the extracted liquid is subjected to LC/MS/MS analysis for quantitative measurement.

That is, the content of the fluorine-containing surfactant can be quantified by, for example, LC/MS/MS analysis. First, extraction is performed by adding the obtained powder to methanol, and the obtained extracted liquid is subjected to LC/MS/MS analysis. In order to further improve the extraction efficiency, treatment by Soxhlet extraction, ultrasonic treatment or the like may be performed. The molecular weight information is extracted from the LC/MS/MS spectrum obtained to confirm agreement with the structural formula of the candidate fluorine-containing surfactant. Thereafter, aqueous solutions having five or more different concentration levels of the confirmed fluorine-containing surfactant are prepared, LC/MS/MS analysis is performed for aqueous solutions of each concentration level, and the relationship between the content and the area for the content is plotted to draw a calibration curve. Then, using the calibration curve, the area of the LC/MS/MS chromatogram of the fluorine-containing surfactant in the extracted liquid can be converted into the content of the fluorine-containing surfactant.

The fluorine-containing surfactant is the same as those exemplified in the production method described above. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant include compounds represented by the general formula ($N^0$), and specific examples thereof include compounds represented by the general formula ($N^1$), compounds represented by the general formula ($N^2$), compounds represented by the general formula (N), compounds represented by the general formula ($N^4$), and compounds represented by the general formula ($N^5$). More specific examples thereof include a perfluorocarboxylic acid (I) represented by the general formula (I), an ω—H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω—H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the general formula (XIII).

The present disclosure also provides a polytetrafluoroethylene stretched body (hereinafter, also referred to as "first PTFE stretched body of the present disclosure") having a breaking strength of 29.0N or more, and substantially free from a fluorine-containing surfactant.

The first PTFE stretched body of the present disclosure may have a thermal instability index (TII) of 20 or more. Such a PTFE stretched body can be obtained by using a hydrocarbon surfactant. The TII is measured in conformity with ASTM D 4895-89.

The present disclosure further provides to a polytetrafluoroethylene stretched body having a breaking strength of 29.0N or more and a thermal instability index (TII) of 20 or more, "the second PTFE stretched body of the present disclosure".

The second PTFE stretched body of the present disclosure is preferably substantially free from a fluorine-containing surfactant.

The first and second PTFE stretched bodies of the present disclosure contain PTFE. The PTFE may have all the configurations of PTFE described in the production method of the present disclosure.

The PTFE in the first and second PTFE stretched body of the present disclosure may have all the characteristics of PTFE described in the production method of the present disclosure described above. In particular, high-molecular-weight PTFE is preferable.

Further, the PTFE is preferably a modified PTFE containing 99.0% by mass or more of a polymerized unit based on TFE and 1.0% by mass or less of a polymerized unit based on a modifying monomer. In particular, the modifying monomer preferably contains at least one selected from the group consisting of hexafluoropropylene, perfluoro(alkyl vinyl ether) and (perfluoroalkyl)ethylene from the viewpoint of reactivity with TFE. The modifying monomer more preferably contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, the perfluoro(alkyl vinyl ether) unit and the (perfluoroalkyl) ethylene unit is preferably in the range of 0.00001 to 1% by mass based on PTFE. The lower limit of the total amount is more preferably 0.0001% by mass, and still more preferably 0.001% by mass. The upper limit thereof is more preferably 0.50% by mass, still more preferably 0.40% by mass, further preferably 0.30% by mass, still further preferably 0.10% by mass, particularly preferably 0.05% by mass, and most preferably 0.01% by mass.

The first and second PTFE stretched bodies of the present disclosure preferably contain 99.0% by mass or more of PTFE and 1.0% by mass or less of components other than PTFE, more preferably 99.5% by mass or more of PTFE and 0.5% by mass or less of components other than PTFE, still more preferably 99.9% by mass or more of PTFE and 0.1% by mass or less of components other than PTFE, and particularly preferably substantially 100.0% by mass of PTFE.

In the first and second PTFE stretched bodies of the present disclosure, the term "substantially free from a fluorine-containing surfactant" means that the amount of the fluorine-containing surfactant is 10 ppm or less based on PTFE. The content of the fluorine-containing surfactant is preferably 1 ppm or less, more preferably 100 ppb or less, still more preferably 10 ppb or less, further preferably 1 ppb or less, and particularly preferably the fluorine-containing surfactant is equal to or below the detection limit as measured by liquid chromatography-mass spectrometry (LC/MS/MS).

The amount of the fluorine-containing surfactant can be determined by a known method. For example, it can be determined by LC/MS/MS analysis. First, the resulting refined stretched body is extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The obtained refined stretched body is subjected to Soxhlet extraction with methanol, and the extracted liquid is subjected to LC/MS analysis for quantitative measurement.

That is, the content of the fluorine-containing surfactant can be quantified by, for example, LC/MS/MS analysis. First, extraction is performed by adding the obtained refined stretched body to methanol, and the obtained extracted liquid is subjected to LC/MS/MS analysis. In order to further improve the extraction efficiency, treatment by Soxhlet extraction, ultrasonic treatment or the like may be performed. The molecular weight information is extracted from the LC/MS/MS spectrum obtained to confirm agreement with the structural formula of the candidate fluorine-containing surfactant. Thereafter, aqueous solutions having five or more different concentration levels of the confirmed fluorine-containing surfactant are prepared, LC/MS/MS analysis is performed for aqueous solutions of each concentration level, and the relationship between the content and the area for the content is plotted to draw a calibration curve. Then, using the calibration curve, the area of the LC/MS/MS chromatogram of the fluorine-containing surfactant in the extracted liquid can be converted into the content of the fluorine-containing surfactant.

The fluorine-containing surfactant is the same as those exemplified in the production method of the present disclosure described above. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant include compounds represented by the general formula ($N^0$), and specific examples thereof include compounds represented by the general formula ($N^1$), compounds represented by the general formula ($N^2$), compounds represented by the general formula (N), compounds represented by the general formula ($N^4$), and compounds represented by the general formula ($N^5$). More specific examples thereof include a perfluorocarboxylic acid (I) represented by the general formula (I), an ω—H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω—H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the general formula (XIII).

The first and second PTFE stretched bodies of the present disclosure may have a thermal instability index (TII) of 25 or more, 30 or more, 35 or more, and 40 or more.

The first and second PTFE stretched bodies of the present disclosure preferably have a breaking strength of 29.0N or more. The breaking strength is more preferably 30.0N or more, still more preferably 32.0N or more, more preferably 35.0N or more, still more preferably 37.0N or more, and further preferably 40.0N or more. The higher the breaking strength, the better, but the upper limit of the breaking strength may be, for example, 100.0N or less, or 80.0N. The breaking strength is a value determined by the following method.

The breaking strength of the stretched body is determined by clamping the stretched body by movable jaws having a gauge length of 5.0 cm and performing a tensile test at 25° C. at a rate of 300 mm/min, in which the strength at which the stretched body breaks is taken as the breaking strength.

The first and second PTFE stretched bodies of the present disclosure preferably have a stress relaxation time of 50 seconds or more, more preferably 80 seconds or more, still more preferably 100 seconds or more, further preferably 110 seconds or more, and particularly preferably 120 seconds or more. The stress relaxation time is a value measured by the following method.

Both ends of the stretched body are tied to a fixture to form a tightly stretched beading sample having an overall length of 8 inches (20 cm). The fixture is placed in an oven through a (covered) slit on the side of the oven, while keeping the oven at 390° C. The time it takes for the beading sample to break after it is placed in the oven is taken as the stress relaxation time.

The first and second PTFE stretched bodies of the present disclosure preferably have a peak temperature between 325 to 350° C. Further, the stretched body of the present disclosure preferably has a peak temperature between 325 and 350° C. and between 360 and 390° C.

The peak temperature is a temperature corresponding to the maximum value in the heat-of-fusion curve when the stretched body is heated at a rate of 10° C./min using a differential scanning calorimeter (DSC).

The first and second PTFE stretched bodies of the present disclosure are also preferably in the form of a film, a tube, fibers, or rods.

The first and second PTFE stretched bodies of the present disclosure preferably have a porosity in the range of 30% to 99%. The porosity is preferably 60% or more, more preferably 70% or more. Too small proportion of PTFE in the stretched body may result in insufficient strength of the stretched body, so the porosity is preferably 98% or less, preferably 95% or less, and more preferably 90% or less.

The porosity of the stretched body can be calculated from the following formula using the apparent density p of the stretched body.

$$\text{Porosity } (\%)=[(2.2-\rho)/2.2]\times 100$$

In the formula, 2.2 is the true density ($g/cm^3$) of PTFE.

Regarding the density p of the stretched body, when the stretched body is in the form of a film or a sheet, a mass of the sample cut into a specific size is measured by a precision scale, and the density of the sample is calculated from the measured mass and the film thickness of the sample by the following formula.

$$\rho=M/(4.0\times 12.0\times t)$$

ρ=density (film density)($g/cm^3$)

M=mass (g)

t=film thickness (cm)

The above measurement and calculation are performed at three points, and the average value thereof is taken as the film density.

As for the film thickness, five stretched bodies are stacked and the total film thickness is measured using a film thickness meter, and the value obtained by dividing the value by five is taken as the thickness of one film.

Regarding the density p of the stretched body, when the stretched body has a cylindrical shape, a mass of the sample cut into a certain length is measured by a precision scale, and the density of the sample is calculated from the measured mass and the outer diameter of the sample by the following formula.

$$\rho = M/(r \times r = \pi) \times L$$

$\rho$=density (g/cm$^3$)

M=mass (g)

r=radius (cm)

L=length (cm)

$\pi$=pi

The outer diameter of the stretched body is measured using a laser displacement sensor. The radius is the value obtained by dividing the value by 2.

The above measurement and calculation are performed at three points, and the average value thereof is taken as the density.

The PTFE stretched body of the present disclosure can be produced by, for example, paste-extruding and rolling PTFE obtained by the production method of the present disclosure, followed by non-sintering or semi-sintering and stretching it in at least one direction (preferably roll-stretched in the rolling direction and then stretched in the transverse direction by a tenter). As the drawing conditions, a speed of 5 to 1,000%/sec and a drawing magnification of 500% or more are preferably employed. Stretching allows easy formation of fibrils of PTFE, resulting in a stretched body including nodes and fibers.

EXAMPLES

The present disclosure is described with reference to examples, but the present disclosure is not intended to be limited by these examples.

The parameters in the examples were determined by the following methods.

pH Value

As the pH value, the value measured by HORIBA pH/ION METER F-72 at 25° C. was adopted.

Solid Concentration of PTFE Aqueous Dispersion (Fluoropolymer Aqueous Dispersion)

In an air dryer, 1 g of PTFE aqueous dispersion (fluoropolymer aqueous dispersion) was dried under a condition of 150° C. for 60 minutes, and the ratio of the mass of the non-volatile matter to the mass of the aqueous dispersion (1 g) was expressed by percentage and taken as the solid concentration thereof.

Ammonium Laurate Content in PTFE Aqueous Dispersion

The obtained PTFE aqueous dispersion was centrifuged using a high-speed centrifuge, and the obtained supernatant was measured by a high performance liquid chromatography (HPLC) analyzer to determine the content of ammonium laurate in the PTFE aqueous dispersion. The equipment used is as follows.

High Performance Liquid Chromatography (HPLC) Analyzer Body: Alliance Separation Module 2695 manufactured by Waters Detector: Waters 2487 detector manufactured by Waters Average Primary Particle Size The average primary particle size was determined by dynamic light scattering. Using the obtained PTFE powder, an aqueous dispersion of PTFE powder with a solid concentration being adjusted to about 1.0% by mass was prepared. The average primary particle size was determined from 70 measurement processes using ELSZ-1000S (available from Otsuka Electronics Co., Ltd.) at 25° C. The refractive index of the solvent (water) was 1.3328 and the viscosity of the solvent (water) was 0.8878 mPa·s.

Standard Specific Gravity (SSG)

Using a sample molded in conformity with ASTM D 4895-89, the SSG was determined by the water replacement method in conformity with ASTM D 792.

Thermal Instability Index (TII)

The TII was measured in conformity with ASTM D 4895-89.

HFP Content

The HFP content was determined from the infrared absorbance measured by producing a thin film disk by press molding the PTFE powder, in which the ratio of the absorbance at 982 cm-1/the absorbance at 935 cm-1 was multiplied by 0.3.

Extrusion Pressure

To 100 g of the obtained PTFE powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The extrusion speed, i.e. ram speed, is 20 inch/min (51 cm/min). The extrusion pressure is a value obtained by measuring the load when the extrusion load becomes balanced in the paste extrusion and dividing the measured load by the cross-sectional area of the cylinder used in the paste extrusion.

Stretching Test

The beading obtained by paste extrusion is heated at 230° C. for 30 minutes to remove the lubricant from the beading. Next, the beading (extruded body) is cut in an appropriate length and clamped at each end leaving a space of 1.5 inch (38 mm) between clamps, and heated to 300° C. in an air circulation furnace. Then, the clamps are moved apart from each other at a desired rate (stretch rate) until the separation distance corresponds to a desired stretch (total stretch) to perform the stretch test. This stretch method essentially follows a method disclosed in U.S. Pat. No. 4,576,869, except that the extrusion speed is different (51 cm/min instead of 84 cm/min). "Stretch" is an increase in length due to stretching, usually expressed as a ratio to the original length. In the production method, the stretching rate is 1,000%/sec, and the total stretching is 2,400%. In this way, a stretched beading is obtained.

Breaking Strength A

The stretched beading obtained in the stretching test (produced by stretching the beading) was subjected to a tensile test at 25° C. at a rate of 300 mm/min, and the strength at the time of breaking was determined as the breaking strength A.

Breaking Strength B

The stretched beading obtained by the same method except that the clamp spacing was changed to 2.0 inch (51 mm) and the stretch rate was changed to 100%/sec in the stretching test was subjected to a tensile test at a rate of 300 mm/min at 25° C., and the strength at the time of breaking was determined as the breaking strength B.

Stress Relaxation Time

Both ends of the stretched beading obtained in the stretching test are tied to a fixture to form a tightly stretched beading sample having an overall length of 8 inches (20 cm). The fixture is placed in an oven through a (covered) slit on the side of the oven, while keeping the oven at 390° C. The time it takes for the beading sample to break after it was placed in the oven was determined as the stress relaxation time.

Peak Temperature

Regarding each of the PTFE powders obtained in Examples, a heat-of-fusion curve was drawn under a condition of a temperature-increasing rate of 10° C./min using a thermogravimetric—differential thermal analyzer (TG/DTA), and the temperature corresponding to the maximum value of the endothermic peak appearing in the heat-of-fusion curve was taken as the peak temperature thereof.

Breaking Strength C

The resulting wet PTFE powder was dried at 285° C. for 18 hours to obtain a PTFE powder. The resulting PTFE powder was extruded by the same method as the extrusion pressure measuring method to obtain beadings. The resulting beading was obtained by the same method as in the stretching test to obtain a stretched beading. The resulting stretched beading was subjected to a tensile test at a rate of 300 mm/min at 25° C., and the strength at the time of breaking was determined as the breaking strength C.

Breaking Strength D

The resulting wet PTFE powder was dried at 285° C. for 18 hours to obtain a PTFE powder. The resulting PTFE powder was extruded by the same method as the extrusion pressure measuring method to obtain beadings. The stretched beading was obtained by the same method as the measurement of breaking strength C except that the clamp spacing was changed to 2.0 inch (51 mm) and the stretch rate was changed to 100%/sec in the stretching test. The resulting stretched beading was subjected to a tensile test at a rate of 300 mm/min at 25° C., and the strength at the time of breaking was determined as the breaking strength D.

Manganese Content in PTFE Powder

About 5 g of the obtained PTFE powder was collected in a platinum dish and decomposed by heating in an electric furnace at 600° C. for 1 hour. To the resulting residue, about 2 ml of high-purity concentrated hydrochloric acid was added, heated and dissolved, and a sample solution was obtained. To the resulting sample solution, 30 ml of dilute hydrochloric acid was added and the resultant was concentrated by heating on a water bath to give a solution of about 20 ml. The obtained solution was quantitatively analyzed using inductively coupled plasma emission spectrometry (ICP-AES) to determine the manganese content in the PTFE powder.

Preparation Example 1

To 16 g of deionized water, 0.273 g of lauric acid was added, and 2.77 g of a 2.8% aqueous solution of ammonia was gradually added with stirring to obtain an aqueous solution A.

Preparation Example 2

To 100 g of deionized water, 10 g of lauric acid was added, and 25 g of a 10% aqueous solution of ammonia was gradually added with stirring to obtain an aqueous solution B. The pH at this time was 9.6.

Example 1

To a reactor made of SUS with an internal volume of 3 L and equipped with a stirrer, 1,748 g of deionized water, 90 g of paraffin wax, 19.0 g of an aqueous solution A, and 0.5 g of ammonium oxalate were added. The pH of the aqueous medium at this time was 9.0. The reactor was sealed and the system was purged with nitrogen to remove oxygen. The reactor was heated up to 70° C., 2.0 g of HFP was added thereto, and the pressure was further raised by TFE to 2.70 MPaG. The reaction was performed by continuously charging a 0.5% by mass potassium permanganate aqueous solution as a polymerization initiator into the reactor. TFE was charged so as to keep the reaction pressure constant at 2.70 MPaG. When 80 g of TFE was charged, the stirring was stopped and the pressure was released until the reaction pressure was adjusted to the atmospheric pressure. The reactor was immediately charged with TFE, the reaction pressure was adjusted to 2.70 MPaG, and stirring was restarted to continue the reaction.

The aqueous solution B was immediately started to be continuously charged into the reactor. When 590 g of TFE was charged, the stirring was stopped and the pressure was released until the reactor was adjusted to the atmospheric pressure. By the end of the reaction, 72.4 g of potassium permanganate aqueous solution and 30 g of aqueous solution B were charged. The aqueous dispersion was collected from the reactor and cooled so that the paraffin wax was separated, whereby a PTFE aqueous dispersion was obtained. The pH of the resulting PTFE aqueous dispersion was 8.3.

The resulting PTFE aqueous dispersion was diluted with water to a concentration of 10%, coagulated under high-speed stirring conditions, and separated from water to obtain a wet PTFE powder. The obtained wet PTFE powder was dried at 240° C. for 18 hours. The physical properties of the resulting PTFE powder are shown in Tables 1 and 2 below.

Example 2

The reaction was performed in the same manner as in Example 1, and stirring was stopped when 680 g of TFE was charged. By the end of the reaction, 56.0 g of potassium permanganate aqueous solution and 26.2 g of aqueous solution B were charged. The pH of the resulting PTFE aqueous dispersion was 8.8.

The dispersion was coagulated and dried in the same manner as in Example 1. The physical properties of the resulting PTFE powder are shown in Tables 1 and 2 below.

Preparation Example 3

To 100 g of deionized water, 9.9 g of lauric acid was added, and with stirring, 14 g of a 10% aqueous solution of ammonia was charged to obtain an aqueous solution C. The pH at this time was 9.5.

Example 3

Reactants were charged into the reactor in the same manner as in Example 1 except that 0.273 g of lauric acid was used instead of the aqueous solution A. The pH of the aqueous medium at this time was 6.7.

Thereafter, the reaction was performed in the same manner as in Example 1. The reaction was continued in the same manner except that the aqueous solution C was continuously charged into the reactor instead of the aqueous solution B during the reaction. When 800 g of TFE was charged, stirring was stopped and the same operation as in Example 1 was performed. By the end of the reaction, 52.2 g of potassium permanganate aqueous solution and 25.5 g of aqueous solution C were charged.

The pH of the resulting PTFE aqueous dispersion was 8.2. The content of ammonium laurate in the resulting PTFE aqueous dispersion was 55.5 ppm. The obtained PTFE aqueous dispersion was coagulated and dried in the same manner as in Example 1. The manganese content in the resulting PTFE powder was 24.3 ppm. The physical properties of the resulting PTFE powder are shown in Tables 1 and 2 below.

Preparation Example 4

To 16 g of deionized water, 0.273 g of myristic acid was added, and 2.77 g of a 2.8% aqueous solution of ammonia was gradually added with stirring to obtain an aqueous solution D.

Preparation Example 5

To 94 g of deionized water, 4.3 g of lauric acid was added, and 8.8 g of a 10% aqueous solution of ammonia was gradually added with stirring to obtain an aqueous solution E.

Example 4

To a reactor made of SUS with an internal volume of 3 L and equipped with a stirrer, 1,728 g of deionized water, 90 g of paraffin wax, 19.0 g of an aqueous solution D, and 0.5 g of ammonium oxalate were added. The pH of the aqueous medium at this time was 10.0. The reactor was sealed and the system was purged with nitrogen to remove oxygen. The reactor was heated up to 70° C., 1.8 g of HFP was added thereto, and the pressure was further raised by TFE to 2.70 MPaG. The reaction was performed by continuously charging a 0.5% by mass potassium permanganate aqueous solution as a polymerization initiator into the reactor. TFE was charged so as to keep the reaction pressure constant at 2.70 MPaG. When 65 g of TFE was charged, the stirring was stopped and the pressure was released until the reaction pressure was adjusted to the atmospheric pressure. The reactor was immediately charged with TFE, the reaction pressure was adjusted to 2.70 MPaG, and stirring was restarted to continue the reaction.

The aqueous solution E was immediately started to be continuously charged into the reactor. When 380 g of TFE was charged, the stirring was stopped and the pressure was released until the reactor was adjusted to the atmospheric pressure. By the end of the reaction, 52.0 g of potassium permanganate aqueous solution and 20 g of aqueous solution E were charged. The aqueous dispersion was collected from the reactor and cooled so that the paraffin wax was separated, whereby a PTFE aqueous dispersion was obtained. The pH of the resulting PTFE aqueous dispersion was 9.8.

The resulting PTFE aqueous dispersion was diluted with water to a concentration of 13%, coagulated under high-speed stirring conditions, and separated from water to obtain a wet PTFE powder. The obtained wet PTFE powder was dried at 210° C. for 18 hours. The physical properties of the resulting PTFE powder are shown in Table 1 below.

Preparation Example 6

To 16 g of deionized water, 0.179 g of undecanoic acid was added, and 1.89 g of a 2.8% aqueous solution of ammonia was gradually added with stirring to obtain an aqueous solution F.

Example 5

Reactants were charged into the reactor in the same manner as in Example 4 except that 18.0 g of the aqueous solution F was used instead of the aqueous solution D. The pH of the aqueous medium at this time was 9.8.

Thereafter, the reaction was performed in the same manner as in Example 4. The reaction was continued in the same manner except that the aqueous solution C was continuously charged into the reactor instead of the aqueous solution B during the reaction. The reaction was continued in the same manner except that the aqueous solution C was continuously charged into the reactor instead of the aqueous solution E during the reaction. When 770 g of TFE was charged, stirring was stopped and the same operation as in Example 4 was performed. By the end of the reaction, 53.0 g of potassium permanganate aqueous solution and 25.0 g of aqueous solution C were charged.

The pH of the resulting PTFE aqueous dispersion was 9.5. The obtained PTFE aqueous dispersion was coagulated and dried in the same manner as in Example 1. The physical properties of the resulting PTFE powder are shown in Tables 1 and 2 below.

TABLE 1

| unit | Solid concentration % by mass | Average primary particle size nm | SSG — | TII — | HFP content % by mass |
|---|---|---|---|---|---|
| Example 1 | 24.1 | 223 | 2.175 | 50 | 0.003 |
| Example 2 | 27.1 | 220 | 2.170 | 44 | 0.002 |
| Example 3 | 30.5 | 218 | 2.175 | 42 | 0.002 |
| Example 4 | 17.2 | 202 | 2.173 | 50 | 0.002 |
| Example 5 | 29.8 | 228 | 2.176 | 42 | 0.002 |

TABLE 2

| unit | Extrusion pressure MPa | Breaking strength A N | Breaking strength B N | Breaking strength C N | Breaking strength D N | Stress relaxation time sec |
|---|---|---|---|---|---|---|
| Example 1 | 26.9 | 33.0 | 23.0 | | | 120 |
| Example 2 | 28.6 | 36.0 | 30.0 | | | 122 |
| Example 3 | 26.7 | 32.3 | 23.5 | 40.6 | 35.4 | 200 |
| Example 5 | 22.3 | 37.1 | 31.2 | | | 116 |

The invention claimed is:

1. A method for producing a fluoropolymer:

comprising polymerizing a fluoromonomer in an aqueous medium in the presence of an anionic hydrocarbon surfactant and a polymerization initiator to obtain a fluoropolymer, wherein the anionic hydrocarbon surfactant comprises a salt of a carboxylic acid hydrocarbon surfactant, wherein the polymerization initiator is a redox initiator, and the polymerization of the fluoromonomer is carried out in an aqueous medium having a pH of 7.0 or higher.

2. The method according to claim 1, wherein the polymerization is performed substantially in the absence of the hydrocarbon surfactant in the form of an organic acid.

3. The method according to claim 1, wherein the redox initiator is a combination of an oxidizing agent which is a salt and a reducing agent which is a salt.

4. The method according to claim 1, wherein the redox initiator is at least one selected from the group consisting of potassium permanganate/ammonium oxalate, potassium bromate/ammonium sulfite, and ammonium cerium nitrate/ammonium oxalate.

5. The method according to claim 1, wherein in the polymerization, the fluoromonomer is polymerized substantially in the absence of a fluorine-containing surfactant.

6. The method according to claim 1, wherein the polymerization comprises adding a composition containing the hydrocarbon surfactant after the initiation of polymerization.

7. The method according to claim 6, wherein the composition is an aqueous solution having a pH of 5.0 or more.

8. The method according to claim 1, wherein the fluoropolymer is a polytetrafluoroethylene.

9. The method according to claim 8, wherein the polytetrafluoroethylene is stretchable.

* * * * *